US012230097B2

(12) United States Patent
Saffari et al.

(10) Patent No.: US 12,230,097 B2
(45) Date of Patent: Feb. 18, 2025

(54) LOTTERY GAMES ON AN ELECTRONIC GAMING MACHINE

(71) Applicant: IGT, Las Vegas, NV (US)

(72) Inventors: Ali Saffari, Reno, NV (US); Thomas Mikulich, Las Vegas, NV (US); Chris Gumiela, Las Vegas, NV (US); Kirk Kover, Las Vegas, NV (US); William R. Wells, Carson City, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 17/708,995

(22) Filed: Mar. 30, 2022

(65) Prior Publication Data

US 2022/0292915 A1 Sep. 15, 2022

Related U.S. Application Data

(63) Continuation of application No. 15/342,799, filed on Nov. 3, 2016, now abandoned, which is a
(Continued)

(51) Int. Cl.
*G07F 17/32* (2006.01)
*G06Q 20/10* (2012.01)
(Continued)

(52) U.S. Cl.
CPC ......... *G07F 17/3225* (2013.01); *G06Q 20/10* (2013.01); *G06Q 20/36* (2013.01);
(Continued)

(58) Field of Classification Search
CPC ............................ G07F 17/3225; G07F 17/329
See application file for complete search history.

(56) References Cited

U.S. PATENT DOCUMENTS 3,662,105 A 5/1972 Hurst
4,071,689 A 1/1978 Talmage
(Continued)

FOREIGN PATENT DOCUMENTS

EP 0744786 11/1996
EP 1074955 2/2001
(Continued)

OTHER PUBLICATIONS

International Application No. PCT/US2010/059551, International Search Report dated Jun. 22, 2011.
(Continued)

*Primary Examiner* — Justin L Myhr
*Assistant Examiner* — Carl V Larsen
(74) *Attorney, Agent, or Firm* — Neal, Gerber & Eisenberg LLP

(57) ABSTRACT

Method and apparatus are described which are used to provide enhanced functionality on gaming devices associated with the play of wager-based games. A secondary processor, separate from a game controller on the gaming device, can be used to provide the enhanced functionality. In one embodiment, the secondary processor can be used to control a display interface on a video display, such as a video display used to play a wager-based game on the gaming device. The display interface can be used to purchase items, such as a lottery ticket, under control of the secondary processor. After purchase, the lottery ticket can be dispensed from the gaming device using a printer. After the lottery ticket is dispensed, it can be reinserted into the gaming device and validated. If any winnings are associated with the lottery ticket, it can be credited to the electronic gaming machine.

19 Claims, 31 Drawing Sheets

Related U.S. Application Data continuation of application No. 14/949,982, filed on Nov. 24, 2015, now Pat. No. 9,489,799, which is a continuation of application No. 14/710,549, filed on May 12, 2015, now Pat. No. 9,245,419, which is a continuation-in-part of application No. 14/608,149, filed on Jan. 28, 2015, now Pat. No. 10,249,129, which is a continuation of application No. 14/027,112, filed on Sep. 13, 2013, now Pat. No. 8,968,086, which is a continuation-in-part of application No. 13/327,584, filed on Dec. 15, 2011, now Pat. No. 8,814,681, which is a continuation-in-part of application No. 12/943,789, filed on Nov. 10, 2010, now Pat. No. 8,088,014.

(60) Provisional application No. 62/002,599, filed on May 23, 2014, provisional application No. 61/801,122, filed on Mar. 15, 2013, provisional application No. 61/708,519, filed on Oct. 1, 2012, provisional application No. 61/303,106, filed on Feb. 10, 2010.

(51) Int. Cl.
*G06Q 20/36* (2012.01)
*G07F 9/02* (2006.01)
*G07F 17/42* (2006.01)

(52) U.S. Cl.
CPC .......... *G07F 9/026* (2013.01); *G07F 17/3202* (2013.01); *G07F 17/3209* (2013.01); *G07F 17/3211* (2013.01); *G07F 17/3216* (2013.01); *G07F 17/3223* (2013.01); *G07F 17/323* (2013.01); *G07F 17/3239* (2013.01); *G07F 17/3241* (2013.01); *G07F 17/3244* (2013.01); *G07F 17/3251* (2013.01); *G07F 17/3255* (2013.01); *G07F 17/329* (2013.01); *G07F 17/42* (2013.01)

(56) References Cited

U.S. PATENT DOCUMENTS

| | | |
|---|---|---|
| 4,072,930 A | 2/1978 | Lucero |
| 4,283,709 A | 8/1981 | Lucero |
| 4,339,709 A | 7/1982 | Brihier |
| 4,339,798 A | 7/1982 | Hedges |
| 4,527,798 A * | 7/1985 | Siekierski ............... G06F 7/588 |
| | | 708/250 |
| 4,553,222 A | 11/1985 | Kurland |
| 4,856,787 A | 8/1989 | Itkis |
| 5,038,022 A | 8/1991 | Lucero |
| 5,042,809 A | 8/1991 | Richardson |
| 5,048,831 A | 9/1991 | Sides |
| 5,091,713 A | 2/1992 | Horne et al. |
| 5,179,517 A | 1/1993 | Sarbin |
| 5,221,838 A | 6/1993 | Gutman |
| 5,259,613 A | 11/1993 | Marnell |
| 5,342,047 A | 8/1994 | Heidel et al. |
| 5,371,345 A | 12/1994 | Lestrange |
| 5,412,404 A | 5/1995 | Candy |
| 5,429,361 A | 7/1995 | Raven |
| 5,450,938 A | 9/1995 | Rademacher |
| 5,457,306 A | 10/1995 | Lucero |
| 5,470,079 A | 11/1995 | LeStrange et al. |
| 5,483,049 A | 1/1996 | Schulze, Jr. |
| 5,531,309 A | 7/1996 | Kloss et al. |
| 5,559,312 A | 9/1996 | Lucero |
| 5,605,506 A | 2/1997 | Hoorn et al. |
| 5,611,730 A | 3/1997 | Weiss et al. |
| 5,618,045 A | 4/1997 | Kagan |
| 5,643,086 A | 7/1997 | Alcorn |
| 5,655,961 A | 8/1997 | Acres et al. |
| 5,676,231 A | 10/1997 | Legras |
| 5,702,304 A | 12/1997 | Acres |
| 5,718,632 A | 2/1998 | Hayashi |
| 5,741,183 A | 4/1998 | Acres |
| 5,759,102 A | 6/1998 | Pease |
| 5,761,647 A | 6/1998 | Boushy |
| 5,768,382 A | 6/1998 | Schneier |
| 5,769,269 A | 6/1998 | Peters et al. |
| 5,769,716 A | 6/1998 | Saffari |
| 5,770,533 A | 6/1998 | Franchi |
| 5,779,545 A | 7/1998 | Berg |
| 5,788,573 A | 8/1998 | Baerlocher |
| 5,795,228 A | 8/1998 | Trumbull |
| 5,796,389 A | 8/1998 | Bertram |
| 5,797,085 A | 8/1998 | Beuk |
| 5,809,482 A | 9/1998 | Strisower |
| 5,811,772 A | 9/1998 | Lucero |
| 5,816,918 A | 10/1998 | Kelly |
| 5,818,019 A | 10/1998 | Irwin, Jr. |
| 5,833,536 A | 11/1998 | Davids |
| 5,833,540 A | 11/1998 | Miodunski |
| 5,836,819 A | 11/1998 | Ugawa |
| 5,844,808 A | 12/1998 | Konsmo et al. |
| 5,851,148 A | 12/1998 | Brune |
| 5,871,398 A | 2/1999 | Schneier |
| D406,612 S | 3/1999 | Johnson |
| 5,885,158 A | 3/1999 | Torango |
| 5,908,354 A | 6/1999 | Okuniewicz |
| 5,919,091 A | 7/1999 | Bell |
| 5,951,397 A | 9/1999 | Dickinson |
| 5,952,640 A | 9/1999 | Lucero |
| 5,954,583 A | 9/1999 | Green |
| 5,957,776 A | 9/1999 | Hoehne |
| 5,959,277 A | 9/1999 | Lucero |
| 5,967,896 A | 10/1999 | Jorasch |
| 5,971,271 A | 10/1999 | Wynn |
| 5,984,779 A | 11/1999 | Bridgeman |
| 5,999,808 A | 12/1999 | Ladue |
| 6,001,016 A | 12/1999 | Walker |
| 6,003,013 A | 12/1999 | Boushy |
| 6,003,651 A | 12/1999 | Waller |
| 6,010,404 A | 1/2000 | Walker |
| 6,012,832 A | 1/2000 | Saunders |
| 6,012,983 A | 1/2000 | Walker |
| 6,019,283 A | 2/2000 | Lucero |
| 6,038,666 A | 3/2000 | Hsu |
| 6,048,269 A | 4/2000 | Burns |
| 6,050,895 A | 4/2000 | Luciano |
| 6,062,981 A | 5/2000 | Luciano |
| 6,068,552 A | 5/2000 | Walker |
| 6,077,163 A | 6/2000 | Walker |
| 6,089,975 A | 7/2000 | Dunn |
| 6,099,408 A | 8/2000 | Schneier |
| 6,104,815 A | 8/2000 | Alcorn |
| 6,106,396 A | 8/2000 | Alcorn |
| 6,110,041 A | 8/2000 | Walker et al. |
| 6,113,492 A | 9/2000 | Walker |
| 6,113,493 A | 9/2000 | Walker |
| 6,113,495 A | 9/2000 | Walker |
| 6,135,884 A | 10/2000 | Hedrick |
| 6,135,887 A | 10/2000 | Pease |
| 6,139,431 A | 10/2000 | Walker |
| 6,141,711 A | 10/2000 | Shah |
| 6,142,369 A | 11/2000 | Jonstromer |
| 6,146,276 A | 11/2000 | Okuniewicz |
| 6,149,522 A | 11/2000 | Alcorn |
| 6,161,059 A | 12/2000 | Tedesco |
| 6,162,121 A | 12/2000 | Morro |
| 6,162,122 A | 12/2000 | Acres |
| 6,174,234 B1 | 1/2001 | Seibert, Jr. |
| 6,182,221 B1 | 1/2001 | Hsu |
| 6,183,362 B1 | 2/2001 | Boushy |
| 6,190,256 B1 | 2/2001 | Walker |
| 6,206,283 B1 | 3/2001 | Bansal |
| 6,210,279 B1 | 4/2001 | Dickinson |
| 6,223,166 B1 | 4/2001 | Kay |
| 6,227,972 B1 | 5/2001 | Walker |
| 6,244,958 B1 | 6/2001 | Acres |
| 6,247,643 B1 | 6/2001 | Lucero |
| 6,249,885 B1 | 6/2001 | Johnson et al. |

(56) References Cited

U.S. PATENT DOCUMENTS

| | | |
|---|---|---|
| 6,251,014 B1 | 6/2001 | Stockdale |
| 6,253,119 B1 | 6/2001 | Dabrowski |
| 6,264,560 B1 | 7/2001 | Goldberg |
| 6,264,561 B1 | 7/2001 | Saffari |
| 6,267,671 B1 | 7/2001 | Hogan |
| 6,270,410 B1 | 8/2001 | Demar |
| 6,280,328 B1 | 8/2001 | Holch |
| 6,285,868 B1 | 9/2001 | Ladue |
| 6,286,756 B1 | 9/2001 | Stinson et al. |
| 6,293,866 B1 | 9/2001 | Walker |
| 6,302,790 B1 | 10/2001 | Brossard |
| 6,307,956 B1 | 10/2001 | Black |
| 6,319,125 B1 | 11/2001 | Acres |
| 6,341,353 B1 | 1/2002 | Herman |
| 6,354,749 B1 | 3/2002 | Pfaffenberger, II |
| 6,368,216 B1 | 4/2002 | Hedrick |
| 6,371,852 B1 | 4/2002 | Acres |
| 6,378,073 B1 | 4/2002 | Davis |
| 6,379,246 B1 | 4/2002 | Dabrowski et al. |
| 6,383,076 B1 | 5/2002 | Tiedeken |
| 6,409,595 B1 | 6/2002 | Uihlein |
| 6,409,602 B1 | 6/2002 | Wiltshire |
| 6,443,843 B1 | 9/2002 | Walker |
| 6,450,885 B2 | 9/2002 | Schneier |
| 6,488,585 B1 | 12/2002 | Wells |
| 6,496,928 B1 | 12/2002 | Deo |
| 6,530,835 B1 | 3/2003 | Walker |
| 6,533,659 B2 | 3/2003 | Seymour et al. |
| 6,548,967 B1 | 4/2003 | Dowling et al. |
| 6,556,450 B1 | 4/2003 | Rasmussen et al. |
| 6,561,903 B2 | 5/2003 | Walker |
| 6,581,161 B1 | 6/2003 | Byford |
| 6,582,310 B1 | 6/2003 | Walker |
| 6,585,598 B2 | 7/2003 | Nguyen |
| 6,628,939 B2 | 9/2003 | Paulsen |
| 6,634,550 B1 | 10/2003 | Walker et al. |
| 6,638,170 B1 | 10/2003 | Crumby |
| 6,648,761 B1 | 11/2003 | Izawa et al. |
| 6,676,522 B2 | 1/2004 | Rowe et al. |
| 6,682,421 B1 | 1/2004 | Rowe |
| 6,685,567 B2 | 2/2004 | Cockerille |
| 6,702,670 B2 | 3/2004 | Jasper et al. |
| 6,739,975 B2 | 5/2004 | Nguyen |
| 6,758,393 B1 | 7/2004 | Luciano |
| 6,800,029 B2 | 10/2004 | Rowe |
| 6,846,238 B2 | 1/2005 | Wells |
| 6,854,645 B1 | 2/2005 | Somers, Jr. et al. |
| 6,869,362 B2 | 3/2005 | Walker |
| 6,880,079 B2 | 4/2005 | Kefford |
| 6,896,618 B2 | 5/2005 | Benoy |
| 6,897,624 B2 | 5/2005 | Lys et al. |
| 6,905,411 B2 | 6/2005 | Nguyen et al. |
| 6,924,903 B2 | 8/2005 | Brooks et al. |
| 6,935,957 B1 | 8/2005 | Yates et al. |
| 6,969,319 B2 | 11/2005 | Rowe et al. |
| 6,997,803 B2 | 2/2006 | LeMay et al. |
| 7,004,388 B2 | 2/2006 | Kohta |
| 7,004,837 B1 | 2/2006 | Crowder et al. |
| 7,014,563 B2 | 3/2006 | Stephan et al. |
| 7,051,221 B2 | 5/2006 | Clabes et al. |
| 7,099,035 B2 | 8/2006 | Brooks et al. |
| D529,966 S | 10/2006 | LeSourd et al. |
| 7,153,210 B2 | 12/2006 | Yamagishi |
| 7,167,724 B2 | 1/2007 | Yamagishi |
| D536,389 S | 2/2007 | LeSoud et al. |
| D536,742 S | 2/2007 | Kaminkow et al. |
| 7,178,941 B2 | 2/2007 | Roberge et al. |
| 7,202,613 B2 | 4/2007 | Morgan et al. |
| 7,213,812 B2 | 5/2007 | Schubert et al. |
| 7,270,605 B2 | 9/2007 | Russell et al. |
| 7,275,991 B2 | 10/2007 | Burns |
| 7,290,072 B2 | 10/2007 | Quraishi et al. |
| 7,309,965 B2 | 12/2007 | Dowling et al. |
| 7,311,598 B2 | 12/2007 | Kaminkow et al. |
| 7,311,604 B2 | 12/2007 | Kaminkow et al. |
| 7,322,885 B1 * | 1/2008 | Luciano, Jr. ............ G07F 17/32 463/17 |
| 7,331,520 B2 | 2/2008 | Silva |
| 7,335,106 B2 | 2/2008 | Johnson |
| 7,337,330 B2 | 2/2008 | Gatto |
| 7,341,522 B2 | 3/2008 | Yamagishi |
| 7,385,359 B2 | 6/2008 | Dowling et al. |
| 7,390,257 B2 | 6/2008 | Paulsen et al. |
| 7,416,485 B2 | 8/2008 | Walker |
| 7,419,428 B2 | 9/2008 | Rowe |
| 7,442,125 B2 | 10/2008 | Paulsen et al. |
| 7,467,999 B2 | 12/2008 | Walker |
| 7,477,889 B2 | 1/2009 | Kim |
| 7,510,474 B2 | 3/2009 | Carter, Sr. |
| 7,529,868 B2 | 5/2009 | Brooks et al. |
| 7,545,522 B1 | 6/2009 | Lou |
| 7,550,931 B2 | 6/2009 | Lys et al. |
| 7,552,341 B2 | 6/2009 | Chen |
| 7,594,855 B2 | 9/2009 | Meyerhofer |
| 7,611,409 B2 | 11/2009 | Muir et al. |
| 7,641,554 B2 | 1/2010 | Paulsen et al. |
| 7,642,730 B2 | 1/2010 | Dowling et al. |
| 7,644,861 B2 | 1/2010 | Alderucci |
| 7,646,029 B2 | 1/2010 | Mueller et al. |
| 7,689,167 B2 | 3/2010 | Sengupta et al. |
| 7,693,306 B2 | 4/2010 | Huber |
| 7,699,703 B2 | 4/2010 | Muir |
| 7,704,147 B2 | 4/2010 | Quraishi et al. |
| 7,753,789 B2 | 7/2010 | Walker et al. |
| 7,758,420 B2 | 7/2010 | Saffari |
| 7,764,026 B2 | 7/2010 | Dowling et al. |
| 7,771,271 B2 | 8/2010 | Walker et al. |
| 7,785,193 B2 | 8/2010 | Paulsen et al. |
| 7,803,053 B2 | 9/2010 | Atkinson et al. |
| 7,846,017 B2 | 12/2010 | Walker et al. |
| 7,850,522 B2 | 12/2010 | Walker et al. |
| 7,883,417 B2 | 2/2011 | Bruzzese |
| 7,950,996 B2 | 5/2011 | Nguyen et al. |
| 7,988,550 B2 | 8/2011 | White |
| 7,997,972 B2 | 8/2011 | Nguyen et al. |
| 8,016,666 B2 | 9/2011 | Angell et al. |
| 8,023,133 B2 | 9/2011 | Kaneko |
| 8,038,527 B2 | 10/2011 | Walker et al. |
| 8,057,303 B2 | 11/2011 | Rasmussen |
| 8,075,408 B2 | 12/2011 | Hwang |
| 8,079,904 B2 | 12/2011 | Griswold |
| 8,083,592 B2 | 12/2011 | Wells |
| 8,088,014 B2 | 1/2012 | Wells |
| 8,096,872 B2 | 1/2012 | Walker et al. |
| 8,118,668 B2 | 2/2012 | Gagner et al. |
| 8,144,356 B2 | 3/2012 | Meyerhofer |
| 8,157,642 B2 | 4/2012 | Paulsen |
| 8,192,276 B2 | 6/2012 | Walker et al. |
| 8,219,129 B2 | 7/2012 | Brown |
| 8,220,019 B2 | 7/2012 | Stearns et al. |
| 8,241,123 B2 | 8/2012 | Kelly et al. |
| 8,241,124 B2 | 8/2012 | Kelly et al. |
| 8,282,465 B2 | 10/2012 | Giobbi |
| 8,282,490 B2 | 10/2012 | Arezina |
| 8,286,856 B2 | 10/2012 | Meyerhofer et al. |
| 8,371,937 B2 | 2/2013 | Wells |
| 8,376,840 B1 * | 2/2013 | Adiraju ............ G07F 17/3239 463/16 |
| 8,393,955 B2 | 3/2013 | Arezina et al. |
| 8,419,548 B2 | 4/2013 | Gagner |
| 8,460,091 B2 | 6/2013 | Wells et al. |
| 8,469,800 B2 | 6/2013 | Lemay et al. |
| 8,479,908 B2 | 7/2013 | Wells et al. |
| 8,512,144 B2 | 8/2013 | Johnson |
| 8,550,903 B2 | 10/2013 | Lyons |
| 8,579,711 B2 | 11/2013 | Nguyen et al. |
| 8,597,108 B2 | 12/2013 | Nguyen |
| 8,597,111 B2 | 12/2013 | Lemay et al. |
| 8,602,875 B2 | 12/2013 | Nguyen |
| 8,608,569 B2 | 12/2013 | Carrico |
| 8,613,659 B2 | 12/2013 | Nelson |
| 8,613,668 B2 | 12/2013 | Nelson et al. |
| 8,616,968 B2 | 12/2013 | Tripp |
| 8,622,836 B2 | 1/2014 | Nelson et al. |

(56) References Cited

U.S. PATENT DOCUMENTS

| | | |
|---|---|---|
| 8,696,430 B2 | 4/2014 | Wells |
| 8,696,449 B2 | 4/2014 | Wells |
| 8,721,434 B2 | 5/2014 | Nelson et al. |
| 8,734,236 B2 | 5/2014 | Arezina et al. |
| 8,814,681 B2 | 8/2014 | Wells et al. |
| 8,814,706 B2 | 8/2014 | Wells et al. |
| 8,827,813 B2 | 9/2014 | Lemay et al. |
| 8,827,814 B2 | 9/2014 | Lemay et al. |
| 8,876,595 B2 | 11/2014 | Nelson et al. |
| 8,882,589 B2 | 11/2014 | Wells |
| 8,932,140 B2 | 1/2015 | Gagner et al. |
| 8,956,222 B2 | 2/2015 | Lemay et al. |
| 8,961,306 B2 | 2/2015 | Lemay |
| 8,968,086 B2 | 3/2015 | Wells et al. |
| 9,011,236 B2 | 4/2015 | Nelson et al. |
| 9,367,835 B2 | 6/2016 | Nelson et al. |
| 11,967,208 B2 | 4/2024 | Page et al. |
| 2001/0036866 A1 | 11/2001 | Stockdale et al. |
| 2001/0039204 A1 | 11/2001 | Tanskanen |
| 2001/0044337 A1 | 11/2001 | Rowe |
| 2002/0016829 A1 | 2/2002 | Defosse |
| 2002/0020603 A1 | 2/2002 | Jones |
| 2002/0025850 A1* | 2/2002 | Hafezi ............... G07F 17/3234 463/29 |
| 2002/0061778 A1 | 5/2002 | Acres |
| 2002/0077182 A1 | 6/2002 | Swanberg |
| 2002/0082070 A1 | 6/2002 | Macke et al. |
| 2002/0087641 A1 | 7/2002 | Levosky |
| 2002/0090986 A1 | 7/2002 | Cote et al. |
| 2002/0094869 A1 | 7/2002 | Harkham |
| 2002/0107066 A1 | 8/2002 | Seelig |
| 2002/0111206 A1 | 8/2002 | Van Baltz et al. |
| 2002/0111209 A1 | 8/2002 | Walker |
| 2002/0115487 A1 | 8/2002 | Wells |
| 2002/0128932 A1 | 9/2002 | Yung et al. |
| 2002/0132663 A1 | 9/2002 | Cumbers |
| 2002/0145035 A1 | 10/2002 | Jones |
| 2002/0147047 A1 | 10/2002 | Letovsky |
| 2002/0147049 A1 | 10/2002 | Carter, Sr. |
| 2002/0163570 A1 | 11/2002 | Phillips |
| 2002/0169623 A1 | 11/2002 | Call et al. |
| 2002/0173354 A1 | 11/2002 | Winans |
| 2002/0183046 A1 | 12/2002 | Joyce et al. |
| 2002/0187826 A1* | 12/2002 | Seymour ............. G07F 17/3216 463/16 |
| 2002/0196342 A1 | 12/2002 | Walker |
| 2003/0003988 A1 | 1/2003 | Walker |
| 2003/0008707 A1 | 1/2003 | Walker et al. |
| 2003/0027632 A1 | 2/2003 | Sines |
| 2003/0032485 A1 | 2/2003 | Cockerille |
| 2003/0045354 A1 | 3/2003 | Giobbi |
| 2003/0054868 A1 | 3/2003 | Paulsen et al. |
| 2003/0054880 A1 | 3/2003 | Lam et al. |
| 2003/0054881 A1 | 3/2003 | Hedrick |
| 2003/0064805 A1 | 4/2003 | Wells |
| 2003/0064815 A1 | 4/2003 | Burnside et al. |
| 2003/0074106 A1 | 4/2003 | Butler |
| 2003/0074259 A1 | 4/2003 | Slyman et al. |
| 2003/0078094 A1 | 4/2003 | Gatto |
| 2003/0081824 A1 | 5/2003 | Mennie |
| 2003/0083126 A1 | 5/2003 | Paulsen |
| 2003/0083943 A1 | 5/2003 | Adams |
| 2003/0092477 A1 | 5/2003 | Luciano et al. |
| 2003/0104865 A1 | 6/2003 | Itkis |
| 2003/0109302 A1 | 6/2003 | Rist |
| 2003/0109307 A1 | 6/2003 | Boyd |
| 2003/0130026 A1* | 7/2003 | Breckner ............ G07F 17/3237 463/20 |
| 2003/0141359 A1 | 7/2003 | Dymovsky |
| 2003/0144052 A1 | 7/2003 | Walker |
| 2003/0148812 A1 | 8/2003 | Paulsen |
| 2003/0162591 A1 | 8/2003 | Nguyen et al. |
| 2003/0171145 A1 | 9/2003 | Rowe |
| 2003/0172037 A1 | 9/2003 | Jung |
| 2003/0186734 A1* | 10/2003 | LeMay ............... G07F 17/3262 463/16 |
| 2003/0186739 A1 | 10/2003 | Paulsen et al. |
| 2003/0190958 A1 | 10/2003 | Paulsen |
| 2003/0195037 A1 | 10/2003 | Vuong et al. |
| 2003/0199321 A1 | 10/2003 | Williams |
| 2003/0203756 A1 | 10/2003 | Jackson |
| 2003/0224852 A1 | 12/2003 | Walker |
| 2003/0228900 A1 | 12/2003 | Yamagishi |
| 2003/0228907 A1 | 12/2003 | Gatto et al. |
| 2004/0014514 A1 | 1/2004 | Yacenda |
| 2004/0014526 A1 | 1/2004 | Kulas |
| 2004/0016797 A1 | 1/2004 | Jones |
| 2004/0023721 A1 | 2/2004 | Giobbi |
| 2004/0039635 A1 | 2/2004 | Linde |
| 2004/0043814 A1 | 3/2004 | Angell |
| 2004/0082385 A1 | 4/2004 | Silva et al. |
| 2004/0085293 A1 | 5/2004 | Soper |
| 2004/0106454 A1 | 6/2004 | Walker |
| 2004/0127277 A1 | 7/2004 | Walker |
| 2004/0129773 A1 | 7/2004 | Lute, Jr. |
| 2004/0132532 A1 | 7/2004 | Brosnan et al. |
| 2004/0142742 A1* | 7/2004 | Schneider ........... G07F 17/3237 463/25 |
| 2004/0146975 A1 | 7/2004 | Yaver et al. |
| 2004/0147314 A1 | 7/2004 | Lemay |
| 2004/0153748 A1 | 8/2004 | Fabrizi et al. |
| 2004/0166917 A1 | 8/2004 | Lam et al. |
| 2004/0166932 A1 | 8/2004 | Lam et al. |
| 2004/0171423 A1 | 9/2004 | Silva et al. |
| 2004/0185935 A1 | 9/2004 | Yamagishi |
| 2004/0190042 A1 | 9/2004 | Ferlitsch et al. |
| 2004/0192434 A1 | 9/2004 | Walker |
| 2004/0199284 A1 | 10/2004 | Hara |
| 2004/0209690 A1 | 10/2004 | Bruzzese |
| 2004/0225565 A1 | 11/2004 | Selman |
| 2004/0235554 A1* | 11/2004 | Defrees-Parrott ...... A63F 3/081 463/17 |
| 2004/0238319 A1 | 12/2004 | Hand |
| 2004/0254006 A1 | 12/2004 | Lam et al. |
| 2004/0254013 A1 | 12/2004 | Quraishi et al. |
| 2004/0259640 A1 | 12/2004 | Gentles |
| 2004/0266395 A1 | 12/2004 | Pailles |
| 2005/0003890 A1 | 1/2005 | Hedrick et al. |
| 2005/0014554 A1 | 1/2005 | Walker |
| 2005/0020354 A1 | 1/2005 | Nguyen et al. |
| 2005/0041161 A1 | 2/2005 | Dowling et al. |
| 2005/0043086 A1 | 2/2005 | Schneider |
| 2005/0049049 A1 | 3/2005 | Griswold et al. |
| 2005/0054438 A1 | 3/2005 | Rothschild |
| 2005/0059485 A1 | 3/2005 | Paulsen |
| 2005/0061605 A1 | 3/2005 | Bell et al. |
| 2005/0070257 A1 | 3/2005 | Saarinen |
| 2005/0076242 A1 | 4/2005 | Breuer |
| 2005/0099824 A1 | 5/2005 | Dowling et al. |
| 2005/0101383 A1 | 5/2005 | Wells |
| 2005/0130728 A1 | 6/2005 | Nguyen |
| 2005/0153776 A1 | 7/2005 | LeMay et al. |
| 2005/0159203 A1 | 7/2005 | Bond |
| 2005/0184868 A1 | 8/2005 | Mercado |
| 2005/0216120 A1 | 9/2005 | Rosenberg et al. |
| 2005/0227770 A1 | 10/2005 | Papulov |
| 2005/0240484 A1 | 10/2005 | Yan |
| 2005/0248299 A1 | 11/2005 | Chemel et al. |
| 2005/0255911 A1 | 11/2005 | Nguyen et al. |
| 2005/0261057 A1 | 11/2005 | Bleich et al. |
| 2005/0275626 A1 | 12/2005 | Mueller et al. |
| 2005/0277471 A1 | 12/2005 | Russell et al. |
| 2005/0282631 A1 | 12/2005 | Bonney et al. |
| 2005/0287852 A1 | 12/2005 | Sugawara |
| 2006/0018450 A1 | 1/2006 | Sandberg-Diment |
| 2006/0025196 A1* | 2/2006 | Webb ................. G07F 17/3244 463/16 |
| 2006/0025206 A1 | 2/2006 | Walker |
| 2006/0025222 A1 | 2/2006 | Sekine |
| 2006/0035707 A1 | 2/2006 | Nguyen |
| 2006/0036482 A1* | 2/2006 | Huang ............... G06Q 30/0231 705/14.27 |
| 2006/0040741 A1 | 2/2006 | Griswold |

(56) References Cited

U.S. PATENT DOCUMENTS

| | | |
|---|---|---|
| 2006/0046819 A1 | 3/2006 | Nguyen et al. |
| 2006/0046823 A1 | 3/2006 | Kaminkow |
| 2006/0046834 A1 | 3/2006 | Sekine |
| 2006/0046842 A1 | 3/2006 | Mattice |
| 2006/0046849 A1 | 3/2006 | Kovacs |
| 2006/0046855 A1 | 3/2006 | Nguyen et al. |
| 2006/0049624 A1 | 3/2006 | Brosnan et al. |
| 2006/0063594 A1 | 3/2006 | Benbrahim et al. |
| 2006/0073869 A1 | 4/2006 | LeMay et al. |
| 2006/0073888 A1 | 4/2006 | Nguyen et al. |
| 2006/0079333 A1 | 4/2006 | Morrow |
| 2006/0089174 A1 | 4/2006 | Twerdahl |
| 2006/0154722 A1* | 7/2006 | Walker ............... G07F 17/3255 463/25 |
| 2006/0160621 A1 | 7/2006 | Rowe et al. |
| 2006/0165060 A1 | 7/2006 | Dua |
| 2006/0166725 A1* | 7/2006 | Saffari ............... G07F 17/3248 463/2 |
| 2006/0166732 A1 | 7/2006 | Lechner et al. |
| 2006/0166741 A1 | 7/2006 | Boyd et al. |
| 2006/0173781 A1 | 8/2006 | Donner |
| 2006/0178190 A9 | 8/2006 | Okuniewicz |
| 2006/0189382 A1 | 8/2006 | Muir |
| 2006/0189391 A1 | 8/2006 | Bird et al. |
| 2006/0217172 A1 | 9/2006 | Roireau |
| 2006/0219777 A1 | 10/2006 | Aror et al. |
| 2006/0221386 A1 | 10/2006 | Brooks et al. |
| 2006/0223627 A1 | 10/2006 | Nozaki |
| 2006/0226598 A1 | 10/2006 | Walker |
| 2006/0246981 A1 | 11/2006 | Walker et al. |
| 2006/0247037 A1 | 11/2006 | Park |
| 2006/0252501 A1* | 11/2006 | Little ............... G07F 17/3239 463/25 |
| 2006/0258439 A1 | 11/2006 | White |
| 2006/0266598 A1 | 11/2006 | Baumgartner et al. |
| 2006/0271433 A1 | 11/2006 | Hughes |
| 2006/0279781 A1 | 12/2006 | Kaneko |
| 2006/0281554 A1 | 12/2006 | Gatto et al. |
| 2006/0287072 A1 | 12/2006 | Walker |
| 2006/0287095 A1 | 12/2006 | Mattice et al. |
| 2006/0287098 A1 | 12/2006 | Morrow et al. |
| 2007/0010318 A1 | 1/2007 | Rigsby et al. |
| 2007/0017979 A1 | 1/2007 | Wu et al. |
| 2007/0021198 A1 | 1/2007 | Muir |
| 2007/0021215 A1 | 1/2007 | Russell et al. |
| 2007/0050443 A1 | 3/2007 | Ewing et al. |
| 2007/0055440 A1* | 3/2007 | Denker ............... H04L 63/0853 701/532 |
| 2007/0060285 A1* | 3/2007 | White ............... A63F 3/06 463/18 |
| 2007/0060302 A1 | 3/2007 | Fabbri |
| 2007/0060372 A1 | 3/2007 | Yamagishi |
| 2007/0077983 A1* | 4/2007 | Amada ............... A63F 3/0615 463/17 |
| 2007/0084978 A1 | 4/2007 | Martin et al. |
| 2007/0111796 A1 | 5/2007 | Giamio et al. |
| 2007/0117608 A1 | 5/2007 | Roper et al. |
| 2007/0117623 A1 | 5/2007 | Nelson |
| 2007/0119681 A1 | 5/2007 | Blake et al. |
| 2007/0123335 A1 | 5/2007 | Okada |
| 2007/0129136 A1 | 6/2007 | Walker et al. |
| 2007/0129150 A1 | 6/2007 | Crowder et al. |
| 2007/0129151 A1 | 6/2007 | Crowder et al. |
| 2007/0155469 A1 | 7/2007 | Johnson |
| 2007/0155512 A1* | 7/2007 | Wells ............... G07F 17/32 463/46 |
| 2007/0159301 A1 | 7/2007 | Hirt |
| 2007/0174809 A1 | 7/2007 | Brown |
| 2007/0189026 A1 | 8/2007 | Chemel et al. |
| 2007/0190494 A1 | 8/2007 | Rosenberg |
| 2007/0202941 A1 | 8/2007 | Miltenberger et al. |
| 2007/0218971 A1 | 9/2007 | Berube |
| 2007/0218985 A1 | 9/2007 | Okada |
| 2007/0218991 A1 | 9/2007 | Okada |
| 2007/0238505 A1 | 10/2007 | Okada |
| 2007/0243925 A1 | 10/2007 | LeMay et al. |
| 2007/0243934 A1 | 10/2007 | Little et al. |
| 2008/0020838 A1 | 1/2008 | Slattery |
| 2008/0026811 A1* | 1/2008 | White ............... G07F 17/32 463/17 |
| 2008/0026816 A1 | 1/2008 | Sammon |
| 2008/0026823 A1 | 1/2008 | Wolf et al. |
| 2008/0026844 A1 | 1/2008 | Wells |
| 2008/0039972 A1 | 2/2008 | Walker |
| 2008/0045345 A1 | 2/2008 | Bird |
| 2008/0070671 A1 | 3/2008 | Okada |
| 2008/0076506 A1 | 3/2008 | Nguyen et al. |
| 2008/0076512 A1 | 3/2008 | Aida |
| 2008/0076528 A1 | 3/2008 | Nguyen et al. |
| 2008/0076572 A1 | 3/2008 | Nguyen et al. |
| 2008/0085753 A1 | 4/2008 | Okada |
| 2008/0113767 A1 | 5/2008 | Nguyen et al. |
| 2008/0113802 A1* | 5/2008 | Johnson ............... G07F 17/3227 463/40 |
| 2008/0119284 A1* | 5/2008 | Luciano, Jr. ............... G07F 17/3248 463/25 |
| 2008/0132314 A1* | 6/2008 | Robb ............... G07F 17/329 463/25 |
| 2008/0139306 A1 | 6/2008 | Lutnick |
| 2008/0166997 A1 | 7/2008 | Sun et al. |
| 2008/0182644 A1 | 7/2008 | Lutnick et al. |
| 2008/0194329 A1 | 8/2008 | Page et al. |
| 2008/0200251 A1 | 8/2008 | Alderucci et al. |
| 2008/0207296 A1 | 8/2008 | Lutnick et al. |
| 2008/0207335 A1 | 8/2008 | DiMichele |
| 2008/0213026 A1 | 9/2008 | Grabiec |
| 2008/0215391 A1 | 9/2008 | Dowling et al. |
| 2008/0234028 A1 | 9/2008 | Meyer et al. |
| 2008/0242408 A1 | 10/2008 | Hwang |
| 2008/0261682 A1 | 10/2008 | Phillips |
| 2008/0268934 A1 | 10/2008 | Mattice et al. |
| 2008/0270302 A1 | 10/2008 | Beenau et al. |
| 2008/0274795 A1 | 11/2008 | Carpenter et al. |
| 2008/0293483 A1 | 11/2008 | Pickus |
| 2008/0293494 A1 | 11/2008 | Adiraju et al. |
| 2008/0300046 A1 | 12/2008 | Gagner et al. |
| 2008/0300061 A1 | 12/2008 | Zheng |
| 2008/0305860 A1 | 12/2008 | Linner |
| 2008/0305862 A1 | 12/2008 | Walker et al. |
| 2008/0305873 A1 | 12/2008 | Zheng |
| 2008/0311971 A1 | 12/2008 | Dean |
| 2008/0313636 A1 | 12/2008 | Goldstein et al. |
| 2008/0318655 A1 | 12/2008 | Davies |
| 2009/0011821 A1 | 1/2009 | Griswold |
| 2009/0023490 A1 | 1/2009 | Moshal |
| 2009/0029770 A1 | 1/2009 | Nagano |
| 2009/0054149 A1 | 2/2009 | Brosnan et al. |
| 2009/0058884 A1 | 3/2009 | Li |
| 2009/0061992 A1* | 3/2009 | Boykin ............... G07F 17/3267 463/25 |
| 2009/0069094 A1 | 3/2009 | Brosnan et al. |
| 2009/0070081 A1 | 3/2009 | Saenz et al. |
| 2009/0082079 A1 | 3/2009 | Kuhn et al. |
| 2009/0082093 A1 | 3/2009 | Okada |
| 2009/0094081 A1 | 4/2009 | Wittern et al. |
| 2009/0098943 A1 | 4/2009 | Weber et al. |
| 2009/0104960 A1 | 4/2009 | Kelly et al. |
| 2009/0124329 A1 | 5/2009 | Palmisano |
| 2009/0124350 A1 | 5/2009 | Iddings et al. |
| 2009/0125429 A1 | 5/2009 | Takayama |
| 2009/0131134 A1 | 5/2009 | Baerlocher et al. |
| 2009/0137318 A1 | 5/2009 | Russo et al. |
| 2009/0138638 A1 | 5/2009 | Russo et al. |
| 2009/0149253 A1 | 6/2009 | Kelly |
| 2009/0149261 A1 | 6/2009 | Chen et al. |
| 2009/0156291 A1* | 6/2009 | Inamura ............... G07F 17/32 463/20 |
| 2009/0172980 A1 | 7/2009 | Heather et al. |
| 2009/0174346 A1 | 7/2009 | Hwang et al. |
| 2009/0186680 A1 | 7/2009 | Napolitano |
| 2009/0197673 A1 | 8/2009 | Bone et al. |
| 2009/0197684 A1 | 8/2009 | Arezina |
| 2009/0227317 A1 | 9/2009 | Spangler |

(56) References Cited

U.S. PATENT DOCUMENTS

| | | |
|---|---|---|
| 2009/0233705 A1 | 9/2009 | LeMay et al. |
| 2009/0233715 A1 | 9/2009 | Ergen |
| 2009/0247281 A1 | 10/2009 | Voutes |
| 2009/0247287 A1* | 10/2009 | Voutes .................. G07F 17/329 463/25 |
| 2009/0270159 A1 | 10/2009 | Kato et al. |
| 2009/0270167 A1 | 10/2009 | Ajiro et al. |
| 2009/0270176 A1 | 10/2009 | Motyl |
| 2009/0275397 A1 | 11/2009 | Van Baltz et al. |
| 2009/0276640 A1 | 11/2009 | Wu |
| 2009/0294243 A1 | 12/2009 | Charych et al. |
| 2009/0307505 A1 | 12/2009 | Robertson et al. |
| 2009/0313084 A1 | 12/2009 | Chugh |
| 2009/0325686 A1 | 12/2009 | Davis et al. |
| 2010/0012715 A1 | 1/2010 | Williams |
| 2010/0016073 A1 | 1/2010 | Goldstein et al. |
| 2010/0016075 A1 | 1/2010 | Thomas |
| 2010/0020546 A1 | 1/2010 | Kukita |
| 2010/0048297 A1 | 2/2010 | Dasgupta |
| 2010/0062840 A1 | 3/2010 | Herrmann |
| 2010/0069160 A1 | 3/2010 | Barrett |
| 2010/0075748 A1* | 3/2010 | Boesen ............... G07F 17/3239 463/29 |
| 2010/0075753 A1 | 3/2010 | Atkinson |
| 2010/0081500 A1 | 4/2010 | Phillips et al. |
| 2010/0087241 A1 | 4/2010 | Nguyen |
| 2010/0087249 A1 | 4/2010 | Rowe |
| 2010/0093421 A1 | 4/2010 | Nyman |
| 2010/0093429 A1 | 4/2010 | Mattice |
| 2010/0105454 A1 | 4/2010 | Weber et al. |
| 2010/0113061 A1 | 5/2010 | Holcman |
| 2010/0113161 A1 | 5/2010 | Walker |
| 2010/0120518 A1 | 5/2010 | Borissov et al. |
| 2010/0124983 A1* | 5/2010 | Gowin ................ G07F 17/3223 463/40 |
| 2010/0124990 A1 | 5/2010 | Crowder |
| 2010/0127634 A1 | 5/2010 | Dowling et al. |
| 2010/0130278 A1 | 5/2010 | Shimabukuro |
| 2010/0130284 A1 | 5/2010 | Luciano, Jr. |
| 2010/0173691 A1 | 7/2010 | Wolfe |
| 2010/0174650 A1 | 7/2010 | Nonaka |
| 2010/0178986 A1 | 7/2010 | Davis et al. |
| 2010/0197404 A1 | 8/2010 | Lum et al. |
| 2010/0203961 A1 | 8/2010 | Burke et al. |
| 2010/0219234 A1 | 9/2010 | Forbes |
| 2010/0227670 A1 | 9/2010 | Arezina et al. |
| 2010/0234099 A1 | 9/2010 | Rasmussen |
| 2010/0250787 A1 | 9/2010 | Miyata |
| 2010/0255902 A1* | 10/2010 | Goldstein ........... G07F 17/3241 463/30 |
| 2010/0285866 A1 | 11/2010 | Bleich et al. |
| 2010/0304848 A1 | 12/2010 | Detlefsen |
| 2010/0323785 A1 | 12/2010 | Motyl |
| 2010/0323789 A1 | 12/2010 | Gabriele |
| 2010/0331079 A1 | 12/2010 | Bytnar |
| 2011/0015976 A1 | 1/2011 | Lempel et al. |
| 2011/0028199 A1 | 2/2011 | Luciano et al. |
| 2011/0032070 A1 | 2/2011 | Bleile |
| 2011/0059800 A1 | 3/2011 | Anderson et al. |
| 2011/0065496 A1 | 3/2011 | Gagner et al. |
| 2011/0065497 A1 | 3/2011 | Patterson, Jr. |
| 2011/0076963 A1 | 3/2011 | Hatano |
| 2011/0086691 A1 | 4/2011 | Luciano et al. |
| 2011/0086696 A1 | 4/2011 | Macewan |
| 2011/0098104 A1 | 4/2011 | Meyerhofer |
| 2011/0112892 A1 | 5/2011 | Tarantino |
| 2011/0117987 A1* | 5/2011 | Aoki ....................... G07F 17/32 463/20 |
| 2011/0118008 A1 | 5/2011 | Taylor |
| 2011/0119098 A1 | 5/2011 | Miller |
| 2011/0136576 A1 | 6/2011 | Kammler et al. |
| 2011/0151966 A1* | 6/2011 | Hawkins ............. G07F 17/3244 463/25 |
| 2011/0207530 A1 | 8/2011 | Chudek et al. |
| 2011/0207531 A1 | 8/2011 | Gagner |
| 2011/0208418 A1 | 8/2011 | Looney et al. |
| 2011/0242565 A1 | 10/2011 | Armstrong |
| 2011/0287823 A1 | 11/2011 | Guinn et al. |
| 2011/0295668 A1 | 12/2011 | Charania |
| 2011/0306400 A1 | 12/2011 | Nguyen |
| 2011/0306401 A1 | 12/2011 | Nguyen |
| 2011/0314153 A1 | 12/2011 | Bathiche |
| 2012/0015735 A1 | 1/2012 | Abouchar |
| 2012/0046110 A1 | 2/2012 | Amaitis |
| 2012/0066048 A1 | 3/2012 | Foust et al. |
| 2012/0067944 A1 | 3/2012 | Ross |
| 2012/0072111 A1 | 3/2012 | Davis |
| 2012/0084131 A1 | 4/2012 | Bergel et al. |
| 2012/0094757 A1 | 4/2012 | Vago |
| 2012/0122584 A1 | 5/2012 | Nguyen |
| 2012/0122585 A1 | 5/2012 | Nguyen |
| 2012/0129586 A1 | 5/2012 | Lutnick |
| 2012/0129611 A1 | 5/2012 | Rasmussen |
| 2012/0142403 A1 | 6/2012 | Prather et al. |
| 2012/0142412 A1 | 6/2012 | Carson, Jr. et al. |
| 2012/0149561 A1 | 6/2012 | Ribi et al. |
| 2012/0187187 A1 | 7/2012 | Duff |
| 2012/0190455 A1 | 7/2012 | Briggs |
| 2012/0221474 A1 | 8/2012 | Eicher et al. |
| 2012/0225710 A1* | 9/2012 | Paelinck ............. G07F 17/3225 463/25 |
| 2012/0252556 A1 | 10/2012 | Doyle et al. |
| 2012/0276990 A1 | 11/2012 | Arezina |
| 2012/0290336 A1 | 11/2012 | Rosenblatt |
| 2012/0300753 A1 | 11/2012 | Brown |
| 2012/0315984 A1 | 12/2012 | Carrico et al. |
| 2012/0315993 A1 | 12/2012 | Dumont et al. |
| 2012/0324135 A1 | 12/2012 | Goodman |
| 2013/0013389 A1 | 1/2013 | Vitti et al. |
| 2013/0017884 A1 | 1/2013 | Price |
| 2013/0023339 A1 | 1/2013 | Davis |
| 2013/0053133 A1 | 2/2013 | Schueller |
| 2013/0053136 A1 | 2/2013 | Lemay et al. |
| 2013/0053148 A1 | 2/2013 | Nelson et al. |
| 2013/0065668 A1 | 3/2013 | Lemay et al. |
| 2013/0065678 A1 | 3/2013 | Nelson et al. |
| 2013/0065686 A1 | 3/2013 | Lemay et al. |
| 2013/0130777 A1 | 5/2013 | Lemay et al. |
| 2013/0130778 A1 | 5/2013 | Anderson et al. |
| 2013/0130790 A1 | 5/2013 | Wells |
| 2013/0137509 A1 | 5/2013 | Weber et al. |
| 2013/0137510 A1 | 5/2013 | Weber |
| 2013/0137516 A1 | 5/2013 | Griswold et al. |
| 2013/0165199 A1 | 6/2013 | Lemay |
| 2013/0165208 A1 | 6/2013 | Nelson |
| 2013/0165209 A1 | 6/2013 | Lemay |
| 2013/0165210 A1 | 6/2013 | Nelson |
| 2013/0165232 A1 | 6/2013 | Nelson |
| 2013/0196755 A1 | 8/2013 | Nelson |
| 2013/0203482 A1* | 8/2013 | Singer .................. G07F 17/323 463/25 |
| 2013/0225279 A1 | 8/2013 | Patceg et al. |
| 2013/0244756 A1 | 9/2013 | Wells |
| 2013/0244772 A1 | 9/2013 | Weber |
| 2013/0252712 A1 | 9/2013 | Wells et al. |
| 2013/0252713 A1 | 9/2013 | Nelson |
| 2013/0260868 A1* | 10/2013 | Caputo ............... G07F 17/3211 463/25 |
| 2013/0260889 A1 | 10/2013 | Lemay |
| 2013/0316808 A1 | 11/2013 | Nelson |
| 2013/0324237 A1 | 12/2013 | Adiraju et al. |
| 2014/0031119 A1 | 1/2014 | Wells et al. |
| 2014/0031125 A1 | 1/2014 | Wells et al. |
| 2014/0045586 A1 | 2/2014 | Allen et al. |
| 2014/0080578 A1 | 3/2014 | Nguyen |
| 2014/0087849 A1 | 3/2014 | Page et al. |
| 2014/0094272 A1 | 4/2014 | Kelly et al. |
| 2014/0121006 A1* | 5/2014 | Johnson ............. G07F 17/3244 463/25 |
| 2014/0200065 A1 | 7/2014 | Anderson |
| 2014/0200067 A1 | 7/2014 | Wells |
| 2014/0221099 A1 | 8/2014 | Johnson |
| 2014/0248941 A1 | 9/2014 | Nelson |

(56) References Cited

U.S. PATENT DOCUMENTS

| | | | |
|---|---|---|---|
| 2014/0315620 A1 | 10/2014 | Wells | |
| 2014/0357353 A1 | 12/2014 | Popovich | |
| 2015/0072749 A1* | 3/2015 | Elkhoury | G07F 17/329 463/17 |
| 2015/0141132 A1 | 5/2015 | Wells et al. | |
| 2015/0243122 A1 | 8/2015 | Saffari et al. | |
| 2015/0332548 A1 | 11/2015 | Walker et al. | |
| 2021/0304558 A1 | 9/2021 | Palmisano | |

FOREIGN PATENT DOCUMENTS

| | | |
|---|---|---|
| EP | 1895483 | 3/2008 |
| EP | 2009602 | 12/2008 |
| JP | 56168275 | 12/1981 |
| WO | WO97/27576 | 7/1997 |
| WO | WO2007/142980 | 12/2007 |
| WO | WO2007/146316 | 12/2007 |
| WO | WO2009/026320 | 2/2009 |

OTHER PUBLICATIONS

International Application No. PCT/US2010/059551, Written Opinion dated Jun. 22, 2011.

\* cited by examiner

```
700
```

| Loosen existing candle mounting screws to mechanically disconnect the housing of the candle device from the top surface of the cabinet of the gaming machine while leaving the wiring bundle in place and attached such that the candle remains operably connected to the gaming machine    710 |
|---|

↓

| Raise up existing candle to slide the candle mount underneath the candle    720 |
|---|

↓

| Pass wire(s) from the radio in the candle mount through the open end or the aperture of platform portionthat allows the candle wires to enter the gaming machine    730 |
|---|

↓

| Secure candle and candle mount to cabinet of gaming machine    740 |
|---|

↓

| Couple the wires for the radio to a controller separate from the game controller    750 |
|---|

Figure 2

PLEASE CHECK TICKET FOR CORRECT DRAWING DATES(S), NUMBERS(S) AND AMOUNT

RULES

THIS TICKET IS VALID ONLY FOR THE DRAWING DATES(S) PRINTED ON THE FRONT
All tickets, transactions and claims are subject to the laws of the State of Michigan, the rules, Regulations, and all directives of the Michigan Lottery, and any changes thereto.

KEEP ALL WINNING TICKETES IN A SAFE PLACE, ALL PRIZES MUST BE CLAIMED WITHIN ONE YEAR OF DRAWING DATE. ANY CLAIM FOR A PRIZE MUST BE ACCOMPANIED BY AN AUTHENTIC WINNING TICKET WHICH CAPABLE OF BEING VALIDATED.

Winning tickets may be presented to an authorized Lottery retailer or any official Lottery office. Tickets which are illegible, altered, counterfeit, defective, unregistered, or which fail any part of the Lottery's validation test are ineligible for prize payment.

**If you bet more than you can afford to lose, you've got a problem.
Call 1-800-270-7117 for confidential help.**

Signature of Claimant _____

THE MICHIGAN LOTTERY SUPPORTS EDUCATION.

For drawing results, call the Michigan Lottery Link 1-800-822-8888(Toll Free), or visit the Michigan Lottery Website at: www.michiganlottery.com

CP

DDP-Rev. -03/14    *Heat Sensitive paper- Keep away from heat.*

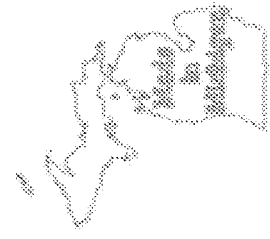

Figure 23B

LOTTERY GAMES ON AN ELECTRONIC GAMING MACHINE

PRIORITY CLAIM

This application is a continuation of, claims the benefit of and priority to U.S. patent application Ser. No. 15/342,799, filed on Nov. 3, 2016, which is a continuation of, claims the benefit of and priority to U.S. patent application Ser. No. 14/949,982, filed on Nov. 24, 2015, which is a continuation of, claims the benefit of and priority to U.S. patent application Ser. No. 14/710,549, filed on May 12, 2015, which claims the benefit of and priority to U.S. Provisional Patent Application No. 62/002,599, filed on May 23, 2014, and which is also a continuation-in-part of, claims the benefit of and priority to U.S. patent application Ser. No. 14/608,149, filed on Jan. 28, 2015, which is a continuation of, claims the benefit of and priority to U.S. patent application Ser. No. 14/027,112, filed on Sep. 13, 2013, which claims the benefit of and priority to U.S. Provisional Patent Application No. 61/708,519, filed on Oct. 1, 2012, and which also claims the benefit of and priority to U.S. Provisional Patent Application No. 61/801,122, filed on Mar. 15, 2013, and which is also a continuation-in part of, claims the benefit of and priority to U.S. patent application Ser. No. 13/327,584, filed on Dec. 15, 2011, which is a continuation-in-part of, claims the benefit of and priority to U.S. patent application Ser. No. 12/943,789, filed on Nov. 10, 2010, which claims the benefit of and priority to U.S. Provisional Patent Application No. 61/303,106, filed on Feb. 10, 2010, each of which are incorporated by reference in their entirety and for all purposes.

BACKGROUND

1. Field of the Invention

The invention relates to gaming devices that provide communication capabilities and enhanced gaming functions on an electronic gaming machine.

2. Description of the Related Art

Casinos derive a large portion of their revenues from electronic gaming machines, including mechanical and video slot machines. The operating costs associated with maintaining electronic gaming machines is an important factor to casino operators. To maximize their profitability, casino operators wish to minimize the electronic gaming machine operating costs.

A significant component of the operating costs is related to the performance of maintenance operations requiring access to the interior of a gaming machine. For instance, access to the interior of the gaming machine is needed to periodically remove cash from the gaming machine, such as coins in a drop box or bills stored in a bill stacker. As another example, access to the interior of the gaming machine is needed to periodically replenish paper used to print ticket vouchers for cashless gaming applications.

For security and regulatory purposes, electronic gaming machines include a number of locked enclosures that are monitored by an internal security system. The locked enclosures and security system help to prevent unauthorized access to resources within the electronic gaming machine that may be targets of theft or tampering, such as deposited money or gaming software. To address a maintenance issue that requires access to interior portions of the gaming machine, often two or more keys carried by separate individuals can be required. During the performance of the maintenance operation in the interior, one individual not performing the maintenance may be required to watch the other individual performing the maintenance operation. Thus, a significant contributor to the gaming machine operating costs is labor costs associated with maintenance.

In addition to labor costs, while the gaming machine is being maintained it is not available for game play. Thus, revenue is lost which also contributes to the operating costs. Further, some maintenance operations, such as replenishing blank tickets that can be used to print redeemable ticket vouchers involve material costs. Thus, some maintenance operations contribute both material costs and labor costs to the gaming machine operating costs.

Balanced against minimizing operating costs are providing functions that make the machines more convenient for a player to use and encourage repeated use of the machines. For instance, a bill validator on a gaming machine is not required and its use increases gaming machine operating costs. However, the availability of a bill validator makes a gaming machine more convenient for a player to use which outweighs the additional operating costs associated with the bill validator. As another example, loyalty programs and associated hardware that allow for player rewards and a personalization of a gaming session increases operating costs. Nevertheless, it has been found that these features make a game play session more satisfying to players such that the average amount of game play or the amount of repeat business from a typical player is increased. The increase in game play or repeat business outweighs the operating costs associated with providing these features.

Thus, in view of the above, apparatus and method are desired that either reduce gaming machine operating costs or provide new features with benefits to players that outweigh the additional operation costs associated with providing the new features.

SUMMARY

Broadly speaking, the embodiments disclosed herein describe relate to providing enhanced gaming functionality to wagered-based gaming devices, such as but not limited to mechanical slot reel, video slot machines and electronic game tables. The method and apparatus can be used on gaming devices that execute regulated gaming software related to one or more aspects of providing a wager-based game on the gaming device. In one embodiment, a picture in a picture (PIP) interface can be provided on a gaming device with a video display. The PIP interface can be controlled by a secondary processor, separate from the game controller on the gaming device. The secondary processor can be configured to communicate with peripheral devices on the gaming device, such as the game controller, printers, bill validators and card readers and remote devices, such as a back-end server.

The PIP interface can be used to purchase items, such as a lottery ticket, under control of the secondary processor. After purchase, the lottery ticket can be dispensed from the gaming device. In one embodiment, the lottery ticket can be purchased from available credits on the gaming device, such as the credits earned from playing a wager-based game. After the lottery ticket is dispensed, it can be reinserted into the gaming device and validated. If any winnings are associated with the lottery ticket, it can be credited to the electronic gaming machine.

The purchase of lottery tickets can be a part of lottery gaming services implemented in a casino environment. Other lottery gaming services can include the play of lottery games in a casino environment. For example, the system can be configured to offer lottery scratch off games to play on a slot machine or other gaming device. Like the purchase of the lottery tickets, the play of lottery scratch off games can be implemented using a PIP interface.

The lottery gaming services can be imported to EGMs and other gaming devices actively being utilized in a casino environment which don't have lottery gaming service capabilities. Thus, the method and apparatus can be applied as part of a retrofit of existing EGMs. In one embodiment, the method and apparatus can be implemented so that the software, existing on the game controller of the EGMs to which the retrofit is applied, doesn't need to be modified. The retrofit process can involve one or more of: 1) installing a secondary gaming device with a secondary processor on the EGM, 2) establishing new communication connections between the secondary processor and devices on the EGM, such as the game controller, player tracking unit, the printer, the bill validator and the card reader, 3) replacing or updating hardware and software on gaming devices on the EGM other than the game controller, 4) installing new devices on the EGM, 5) establishing new communication connections between the secondary processor and remote devices and 6) installing new back-end servers. Other aspects and advantages will become apparent from the following detailed description taken in conjunction with the accompanying drawings which illustrate, by way of example, the principles of the invention.

BRIEF DESCRIPTION OF THE DRAWINGS

The described embodiments will be readily understood by the following detailed description in conjunction with the accompanying drawings, wherein like reference numerals designate like structural elements, and in which:

FIG. 2 is a flow chart of a method of retrofitting an electronic gaming machine with a wireless communication device.

DETAILED DESCRIPTION OF THE DESCRIBED EMBODIMENTS

In the following detailed description, numerous specific details are set forth to provide a thorough understanding of the concepts underlying the described embodiments. It will be apparent, however, to one skilled in the art that the described embodiments can be practiced without some or all of these specific details. In other instances, well known process steps have not been described in detail in order to avoid unnecessarily obscuring the underlying concepts.

With respect to the following figures various method and apparatus used to provide lottery services on gaming devices, such as an electronic gaming machine (EGM) or electronic gaming table are described. The lottery services can be implemented on EGMs deployed in a casino environment. Thus, method and apparatus to retrofit an EGM to provide lottery services are described. In particular embodiments, the retrofit is implemented without modifying the regulated game software executed by the game controller on the EGM. Details of the method and apparatus for implementing the lottery services are described with respect to the following Figures.

With respect to FIGS. 1A, 1B, 1C, 1D and 2, method and apparatus for coupling a candle mount including a wireless communication interface to an electronic gaming machine (EGM) are described. In one embodiment, the wireless communication interface is coupled to a structure installed between a candle device and a cabinet of the EGM. The structure can provide a platform upon which the candle device is mounted to the EGM cabinet. The structure, also referred to as a radio candle mount can be installed during manufacture of the EGM or a part of a retrofit process of an existing EGM. The wireless communication interface can be used to send and receive information used play a lottery game or purchase a lottery ticket.

Figure 1A:
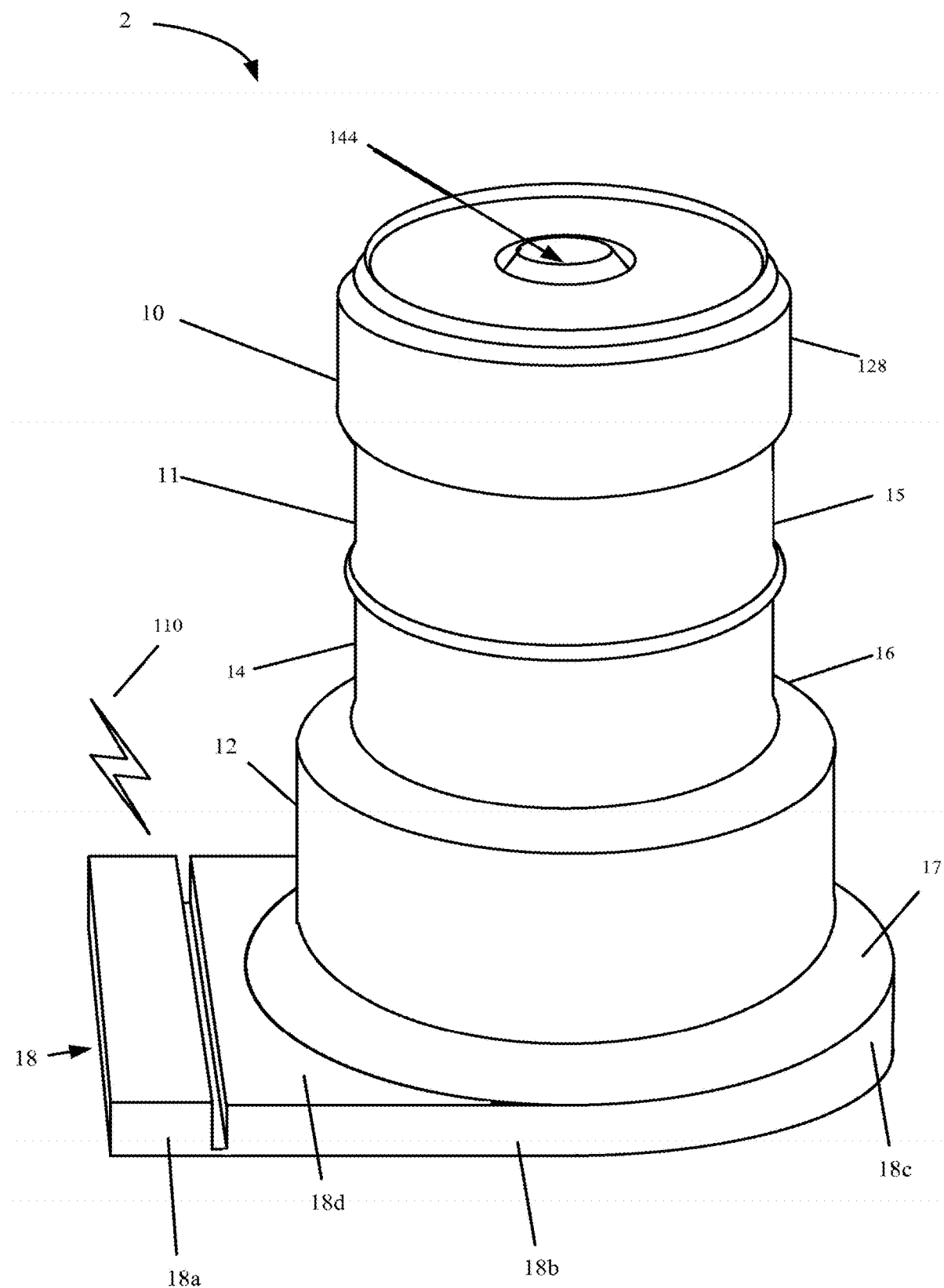
FIG. 1A is a perspective drawing of a candle device disposed on top of a radio candle mount in accordance with an embodiment.

In more detail, with respect to FIG. 1A, a candle device coupled to a radio candle mount is described. With respect to FIGS. 1B, 1C and 1D, details of the mechanical interfaces between a candle device, the radio candle mount and the EGM cabinet are discussed. A method of installing or retrofitting an EGM with a radio candle mount is described in FIG. 2. In regards to FIGS. 3-6, two types of secondary gaming devices which can be coupled to an EGM to utilize the wireless capabilities provided by the radio candle mount and other enhanced gaming services are discussed. For example, the secondary gaming devices can be used to output video content to a display used a part of process of purchasing or validating a lottery ticket on an EGM. One or more of the secondary gaming devices can be installed on the EGM as part of a retrofit process.

Figure 7:
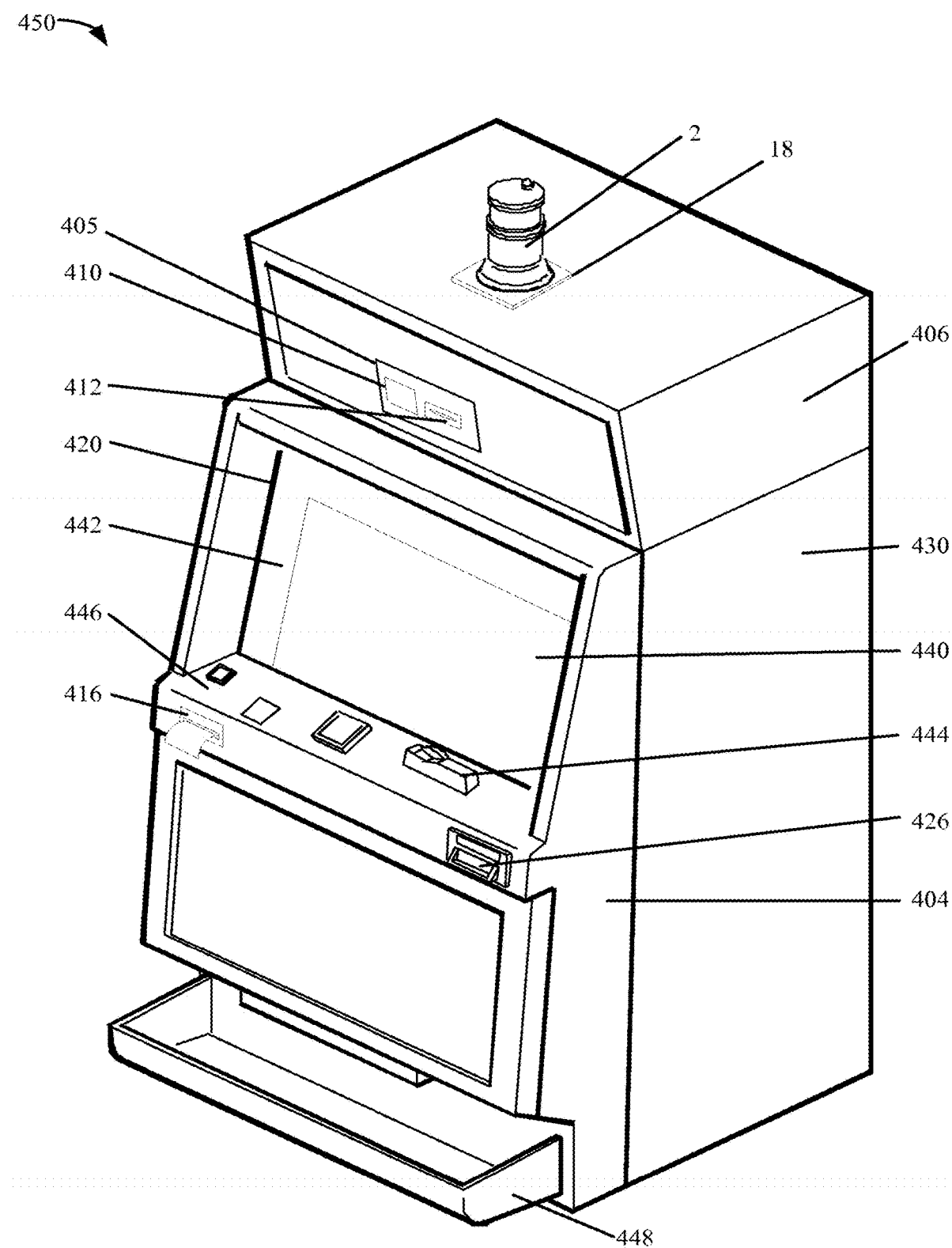
FIG. 7 is a perspective drawing showing exterior portions of an electronic gaming machine in accordance with the described embodiments.
Figure 8:
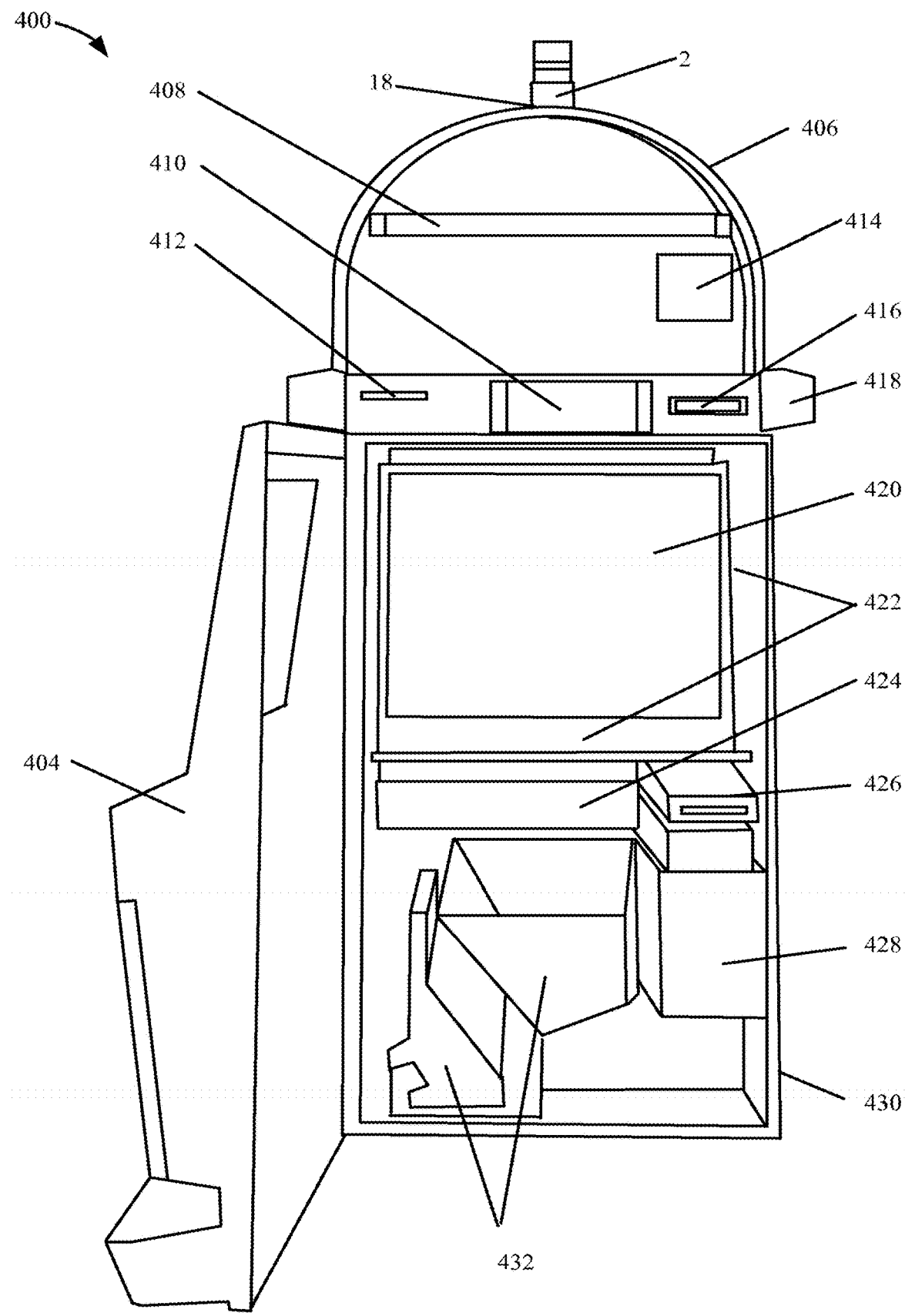
FIG. 8 is a perspective drawing showing exterior and interior portions of an electronic gaming machine in accordance with the described embodiments.

With respect to FIGS. 7 and 8, an exterior and interior views of an EGM with a radio candle mount and one or more of an externally or internally disposed secondary gaming devices coupled to the radio candle mount is described. The secondary gaming devices can be configured to provide lottery gaming services via the radio candle mount. One connection scheme between an EGM, secondary gaming device and radio candle mount is described with respect to FIG. 9. The operation of an EGM with the secondary devices and radio candle mount are also discussed with respect to FIGS. 7, 8 and 9. With respect to FIGS. 10 and 11, a gaming system including EGM's with the secondary gaming devices and one or more radio candle mounts are discussed. In one embodiment, the gaming system can include secondary devices which allow a touch screen video display to be used as an interface for providing enhanced gaming services, such as lottery ticket purchasing and validating services.

Figure 13A:
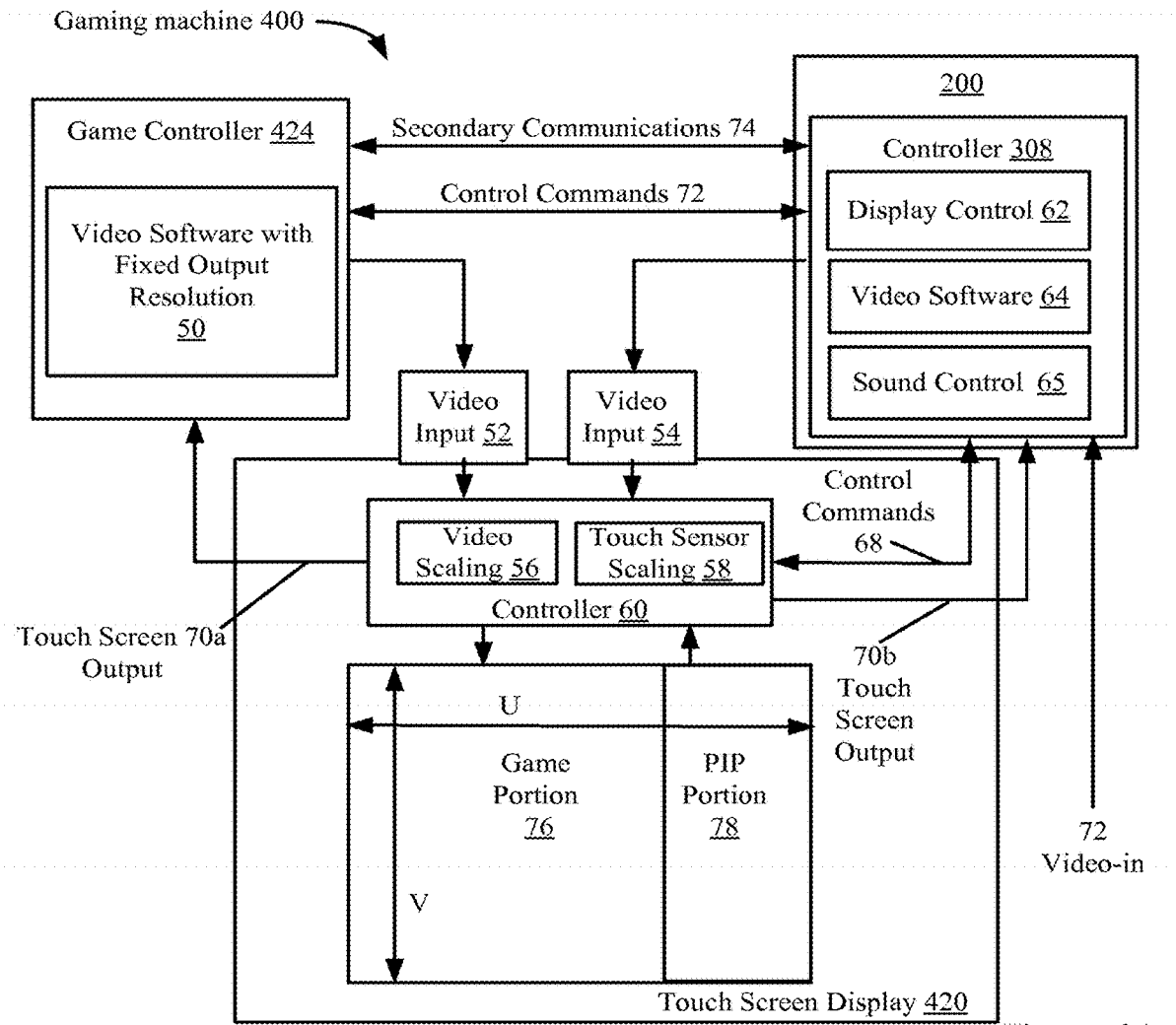
FIG. 13A is block diagram of a gaming machine including a dual port touch screen display communicatively coupled to a secondary gaming device in accordance with the described embodiments.
Figure 13B:
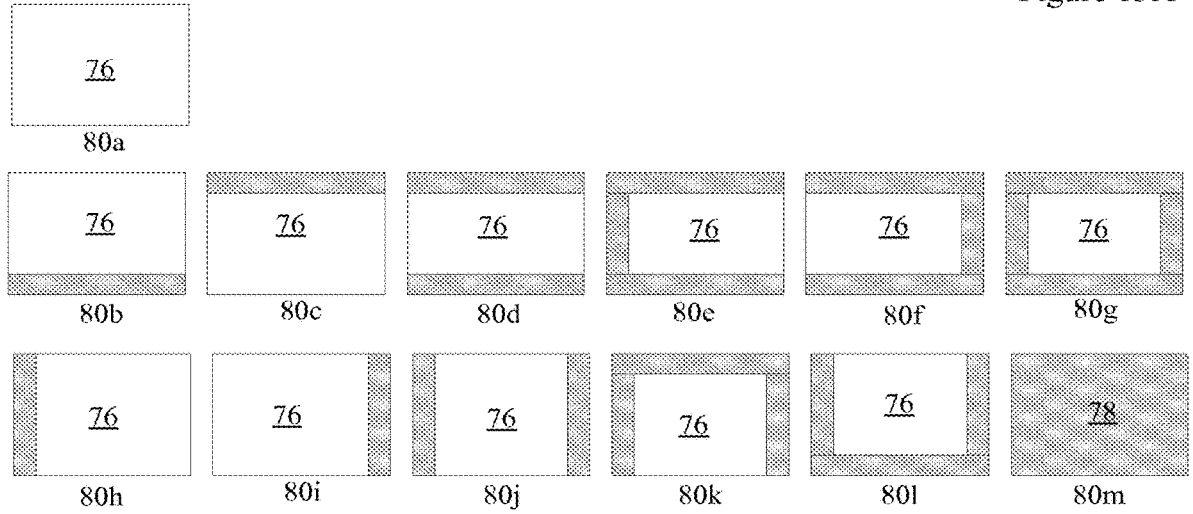
FIG. 13B is block diagram of picture in a picture modes for a dual port touch screen display in accordance with the described embodiments.

With respect to FIGS. 13A and 13B hardware and software used to provide secondary gaming content on an EGM are described. In particular, methods and apparatus used to provide picture in a picture capabilities are described. Finally, with respect to FIGS. 14-27A-2C, lottery gaming services are described.

Wireless Communication Interfaces

Player assistance and security events in a gaming establishment such as a casino or lottery location are very important to casino operators. Player jackpot confirmation, player requiring change, machine door openings, and machine failures are a few examples of important events that can require a response by a casino operator. In the gaming industry, a candle has been used to provide a visual indicator that may identify certain occurrences or servicing needs of that particular gaming machine, such as the player assistance and security events. On a gaming machine, it is often mounted on a top surface of the gaming cabinet so that it is easily visible. At a table game, it can be mounted on a pole to increase its visibility.

In this section, a method and apparatus for providing a wireless communication interface on an EGM are described. In one embodiment, the wireless communication interface can be incorporated into a radio candle mount. The radio candle mount 18 can be used to provide a mounting surface for the candle device 2. The candle device 2 and radio candle mount 18 can be secured to the EGM cabinet. The radio candle mount 18 can include a wireless communication interface, such as a radio. The EGM cabinet can include a hole which allows wires associated with the candle device 2 and radio candle mount 18 to be passed into an interior of the EGM and coupled to devices located within the EGM cabinet.

FIG. 1A is a perspective drawing of a candle device 2 disposed on top of a radio candle mount 18 in accordance with an embodiment. The candle device 2 can provide lighting capabilities for indicating a status of an EGM. In addition, as is described below with respect to FIGS. 3, 4 and 6, the candle device 2 can be configured to provide additional functions to an EGM and in more detail with respect to U.S. patent application Ser. No. 13/327,584 and its parent application previously incorporated by reference.

A candle device, such as candle device 2, can have many different form factors. The candle device 2 can include an upper housing 10 that fits over a clear shell 11 that forms a middle portion of the housing. In one embodiment, the shell 11 can be cylindrical but other shapes are possible and the example of a cylinder is provided for illustrative purposes only. The shell 11 can be formed from a light transmitting material, such that light emitted from lighting elements (e.g., LEDs) disposed within the housing can be transmitted through the shell 11 when the lights are activated. The shell 11 can fit into a base 12, which can serve as a lower portion of the housing.

In a particular embodiment, the upper housing 10, shell 11 and base 12 can be formed from a polycarbonate plastic. The upper housing 10 and base 12 can be metalized to provide a metal sheen if desired. In other embodiments, an opaque coating can be provided on portions of the housing, such as the upper housing 10 and the base 12. One or more divider rings, such as 14, can be placed over the cylindrical shell 11 to divide the shell into a number of stages, such as stages 15 and 16.

Each of the stages 15 and 16 can include lighting elements that are separately controlled. In one embodiment, the lighting elements can be used to provide candle functions, i.e., to convey information about the gaming machine to which it is coupled. For instance, stage 15 can be lit, stage 16 can be lit or both stage 15 and 16 can be simultaneously lit to convey information about the status of the gaming machine. If more than two stages are used, then additional combinations of lit stages are available to convey gaming machine status information.

In particular embodiments, the secondary gaming device 200, depending on the number of stages, can be from 5.5 inches to 7.5 inches in height. For instance, a device with two stages can be about 5.5 inches in height, a device with three stages can be about 6.5 inches in height and a device with four stages can be about 7.5 inches in height. The lighting elements in each stage can be independently controlled so each stage can be lit by itself or in combination with other stages. When the candle is coupled to an electronic gaming machine via a candle mount 18, the combinations of lit stages can be used to convey information associated with the electronic gaming machine, such as a need for service.

The diameter of the shell 11 can be about 2 inches. The outer diameter of the upper housing 10 can be greater to or equal to the diameter of shell 11, such as between 2 and 3 inches. The outer diameter of the base 12 can vary from about 2 inches to 3 inches. In particular embodiments, the base can be about 1 inch in height. The height of the upper housing 10 can be from about 0.5 to 4 inches. In a particular embodiment, the height can be about 2.25 inches. In some embodiments, the dimensions of the secondary gaming device 200 can be selected to conform to dimensions proscribed by regulations of a specific gaming jurisdiction. For instance, the regulations can specify a required height for a candle device.

The candle base 12 can include a mounting plate 20 (FIG. 2) that allows the secondary gaming device 200 to be secured to a gaming machine via a candle mount 18 with wireless communication capabilities. The candle base 12 circular cross section. In other embodiments, the candle base can be rectangular shaped or a general polygon. In one embodiment, the candle mount 18 can be sized such that the candle base 12 doesn't overhang beyond the top surface of the candle mount 18. In other embodiments, a portion of the candle base 12 can overhang the top surface of the candle mount.

In one embodiment, a portion 18c of the candle mount conforms to portion of the outer edge 17 of the candle base 12. The outer perimeter of the candle mount 18 does not have to conform to the outer edge of the candle base. For example, the candle base 12 can be rectangularly shaped with a length and width that are greater than a maximum diameter of the candle base 12. As another example, the radius of the circular portion 18c can be greater than the maximum radius associated with base 12 such that portions of the top surface 18d of candle mount 18 are visible around the outer edge of the candle base 12 or the radius can be smaller than the maximum radius such that the base overhangs a top surface 18d of the candle mount 18, In one embodiment, the radio candle mount 18 can include two portions: a radio portion 18a and a platform portion 18b, which are described in more detail below. The housing of the candle mount 18 can be injection molded plastic in one embodiment. According to another embodiment, the housing of the platform portion 18b can be formed of metal, such as sheet metal, while the housing of the radio portion 18a is formed of a radio transparent material, such as plastic or ceramic.

In the embodiment shown in FIG. 1A, the radio portion 18a and the platform portion 18b can be formed as an integral part. According to another embodiment, the radio portion 18a and the platform portion 18b are formed as separate parts that can either remain separate or can be attached to one another. When formed as separate parts, it may be possible to install the radio candle mount as part of a retrofit process where disconnecting the candle 12 is not required.

The radio portion 18a can include a wireless communication radio device and one or more antennas for wireless communication involving one or more different wireless communication protocols. The radio device and the antenna (s) can be enclosed within a housing. The antenna(s) can be used to transmit and receive wireless signals 110. In general, one or more antennas can be provided at different locations within the candle mount 18. The antenna(s) can be provided for communicating with mobile devices and/or remote servers, such as for communicating via Bluetooth™, Wi-Fi™ or WiMAX related communication protocols.

In the example of FIG. 1A, a top of the radio portion 18a is shown as being level with the top of surface 18d of the other section. In other embodiments, the top of the radio portion can be at a different height and at a different orientation. Further, the radio portion 18a is shown as rectangularly shaped, but is not limited to this shaped. In one embodiment, the section 18b for receiving the base can include a recessed portion for receiving the candle base 12. Thus, the candle base 12 may rest on a portion with a level which is lower than the level of top surface 18d. In additional embodiments, the radio portion 18a can be sealed such that the antennas and communications components are not accessible without destroying the housing associated with the radio portion 18a. The radio portion 18a can include security mechanisms for detecting whether the radio portion 18a has been accessed or modified in some manner.

Figure 1B:
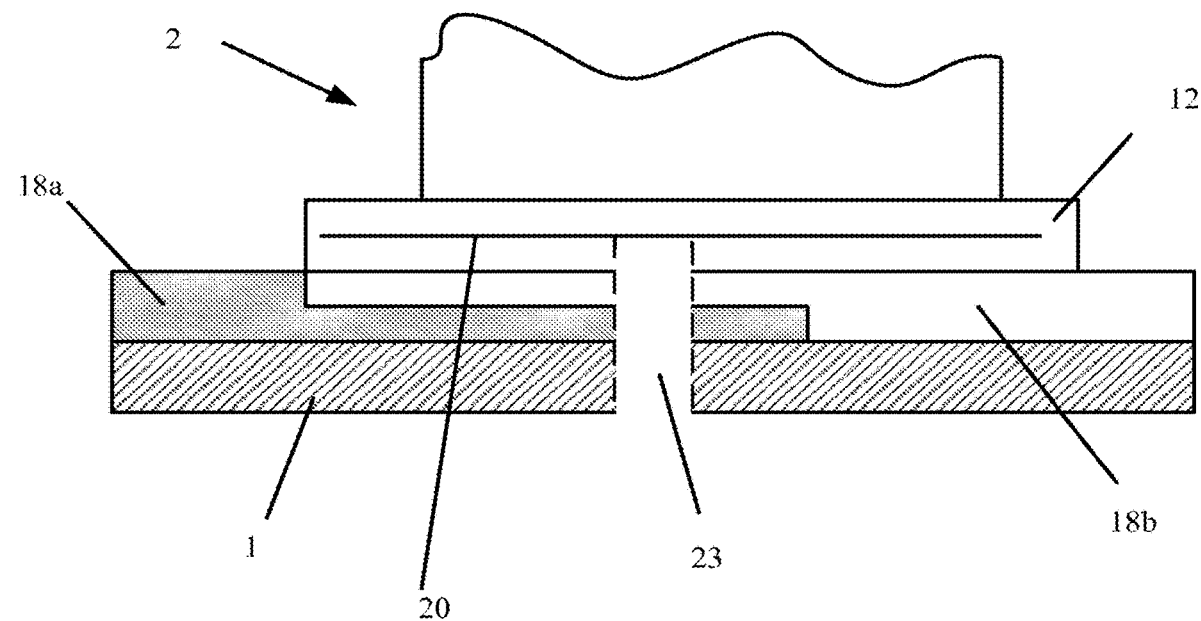
FIG. 1B is a side cross-sectional view of a radio candle mount in accordance with an embodiment.

FIG. 1B is a side cross-sectional view of an embodiment of the candle mount 18. In some embodiments, the radio portion 18a and the platform portion 18b can be snapped or locked into place with one another. In one embodiment, a horseshoe or U-shaped platform portion 18b and a horseshoe-shaped radio portion 18a can overlap such that the mounting screws (not shown) can pass through as screw hole 23 in the platform portion 18b, the radio portion 18a, and the base 12 of the secondary gaming device 200 to the mounting plate 20, as shown in FIG. 1B. Once in place, the mounting screws can secure the candle to the platform and prevent the sections, 18a and 18b, from being separated from one another. Multiple screw holes, such as 23, and mounting screws can be utilized to secure the device and the example in FIG. 1B is provided for purposes of illustration only (e.g., see FIGS. 1C and 1D).

The candle mount 18 (and candle device 2) can be secured to a surface, such as an exterior surface of a gaming cabinet of a gaming machine 1. Traditionally, a secondary gaming device 200 can be mounted to the top of the gaming machine cabinet 1 to increase its visibility. According to an embodiment shown in FIG. 1C, an aperture 22 in the platform portion 18b and in the cabinet of the gaming machine 1 can allow a wiring bundle, including power and/or data connections for the secondary gaming device 200, such as a wiring bundle 121 extended from base 12, to be passed through the platform portion 18b and an exterior surface of the gaming machine cabinet 1 and into the interior of the gaming machine cabinet 1.

Figure 4:
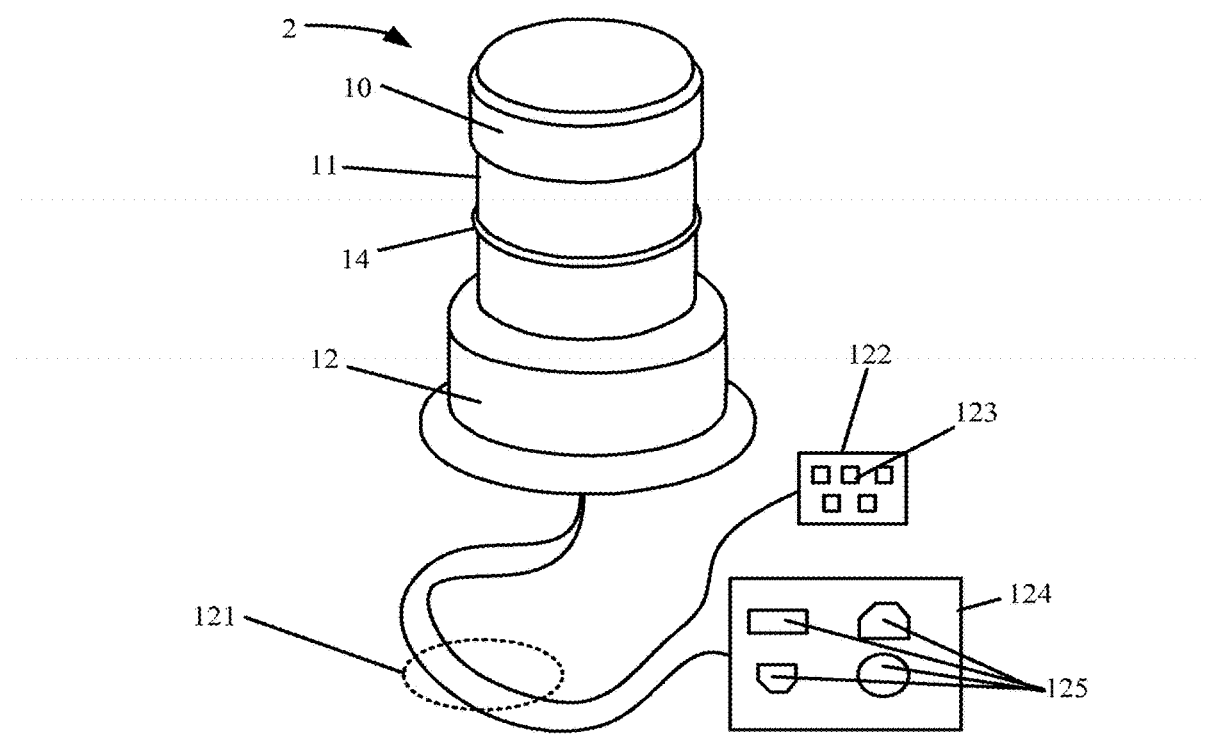
FIG. 4 is a perspective drawing of a candle device including a wiring harness in accordance with the described embodiments.

As shown in FIG. 4, a wiring bundle 121 can extend from the base 12. This wiring bundle 121 can then be passed through the candle mount 18. Wiring 131 from the radio on the radio portion 18b can also be passed through the platform portion 18b and into the interior of the cabinet of the gaming machine 1. According to another embodiment shown in FIG. 1D, the platform portion 18b can be horseshoe or U-shaped such that the wiring bundle 121 from the candle device 2 and the wiring 131 from the radio can pass through the open end of the horseshoe to the cabinet of the gaming machine 1.

As described in more detail with reference to FIG. 2, an existing electronic gaming machine with a candle device can be retrofitted with a wireless communication device. According to this embodiment, existing candle mounting screws can be loosened to remove the housing of the candle device 2 from the top surface of the cabinet of the gaming machine 1 while leaving the wiring bundle 121 in place such that the secondary gaming device 200 remains operably connected to the gaming machine 1. A first platform portion 18b can be slid under the secondary gaming device 200 and around the existing candle wires 121 without having to disconnect them and thread them through the aperture 22 in the cabinet of the gaming machine 1, thereby saving substantial installation time and eliminating potential damage to the existing connections from undoing and then reconnecting them. The wire 131 from the radio can also be passed through the open end of the horseshoe-shaped platform portion 18b, and the radio portion 18a and the platform portion 18b can fit together so that the horseshoe is closed. The two pieces can fit together in any suitable manner, such as snapping or other locking together.

The mounting plate 20 within the candle base 12 can allow the mounting screws to be tightened from inside the cabinet of the gaming machine 1 to secure the secondary gaming device 200 to the gaming machine 1. According to another embodiment, the holes 23 that receive the mounting screws to secure the secondary gaming device 200 pass all the way through the base 12 such that the mounting screws can be tightened externally from the top surface of the candle base 12.

The candle mount 18 can include apertures which align with the positions of the existing mounting screws associated with the candle base 12. In one embodiment, the candle mount can include apertures at different positions to accommodate different candle designs where only a portion of the apertures are utilized for a particular candle designs. For example, a first candle design can utilize one or more mounting screws in first positions and a second candle design can utilize one or more mounting screws in second positions where candle mount can include apertures which accommodate the mounting screws with either design.

Figure 1C:
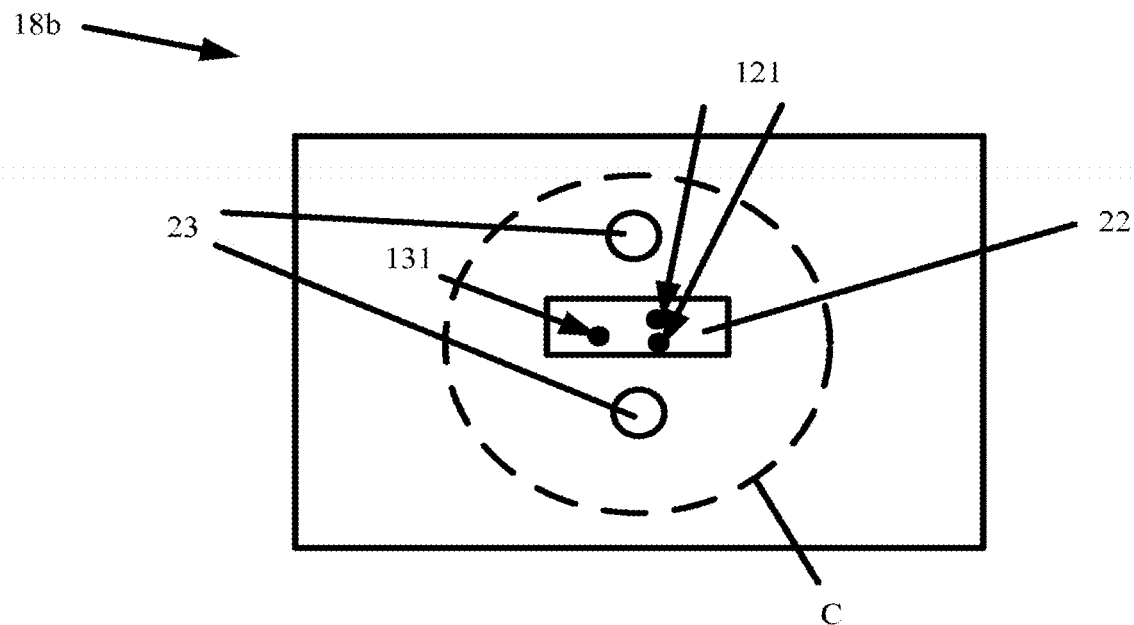
FIG. 1C is a top view of a platform portion of a candle mount in accordance with an embodiment.
Figure 1D:
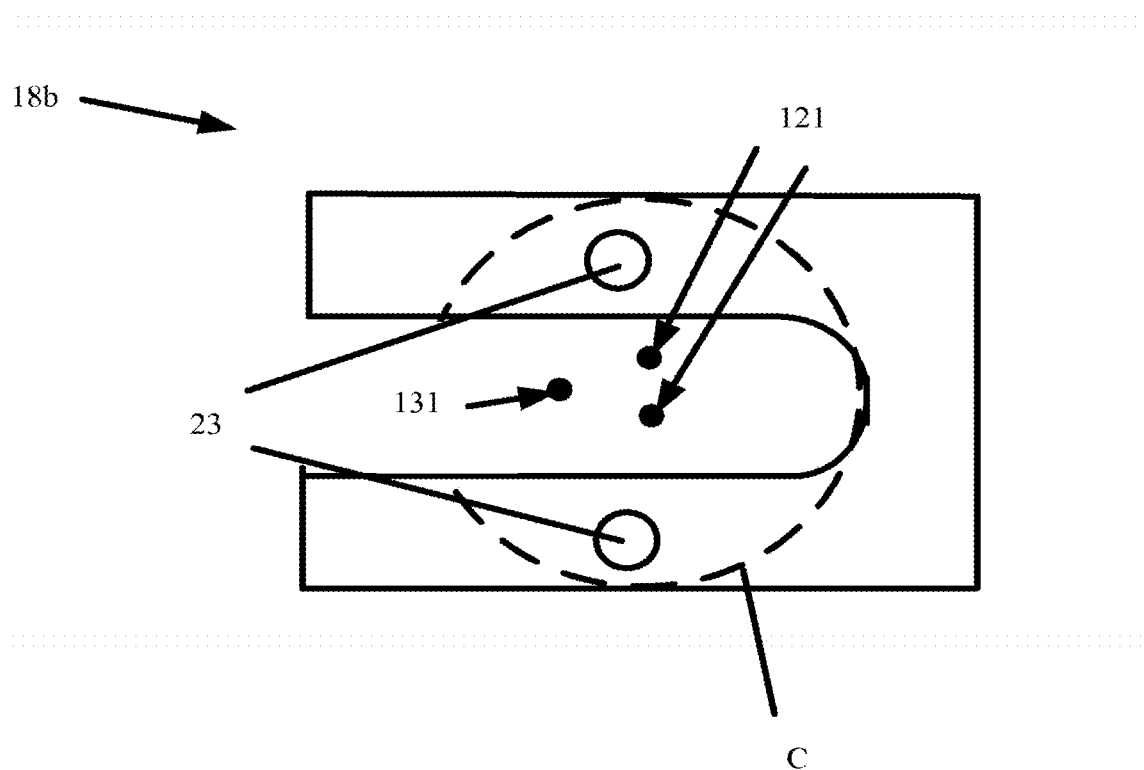
FIG. 1D is a top view of a platform portion of a candle mount in accordance with another embodiment.

The candle mount 18 can be made for a candle having a base of any shape. As shown in the embodiments of FIGS. 1C and 1D, the top surface of the candle mount 18 is configured for receiving a candle device 2 having a round base as depicted by circle C. However, in other embodiments, the top surface of the candle mount 18 can be configured for receiving a candle device 2 having a square base. In another example, the base can be rectangular or have an irregular shaped base.

Methods of Installing a Radio Candle Mount

As noted above, an existing electronic gaming machine with a candle device can be retrofitted with a wireless communication device. FIG. 2 is a flow chart of a method 600 of retrofitting an electronic gaming machine with a wireless communication device. According to this embodiment, in 610, existing candle mounting screws can be loosened to mechanically disconnect the housing of the candle device from the top surface of the cabinet of the gaming machine while leaving the wiring bundle in place and attached such that the candle remains operably connected to the gaming machine. The existing candle can then be raised up to slide the candle mount underneath the candle in 620. In one embodiment, the candle amount can be formed in two or more sections. For example as described above, horseshoe-shaped platform portion can be slid under the candle and around the existing candle wires without having to disconnect them and thread them through the aperture in the cabinet of the EGM, thereby saving substantial installation time and eliminating potential damage to the existing connections from undoing and then reconnecting them.

According to another embodiment, the platform is integrally formed or manufactured as a single piece for installation with an aperture which allows the wiring harness from the candle to pass through. Thus, the platform portion of the candle mount does not have an open end but instead has an aperture through which the wiring bundle can pass. In this embodiment, the wires from the candle to the electronic gaming machine would have to be disconnected in order to thread the wiring bundle through the aperture in the candle mount when an EGM with an installed candle is being modified. In the case of a new gaming machine, the wiring bundle for the candle can be threaded through the aperture before the candle device is coupled to the EGM.

In 630, the wire(s) from the radio in the candle mount can be passed through the open end or the aperture that allows the candle wires to enter the gaming machine. In an embodiment with a horseshoe-shaped platform portion, the radio portion and the platform portion of the candle mount can be fit together so that the horseshoe is closed. The two pieces can fit together in any suitable manner, such as snapping or other locking together and are not limited to being horseshoe-shaped. In addition, more than two pieces can be used.

In 640, the candle with the mount sandwiched underneath the candle can be secured to the cabinet of the gaming machine. In one embodiment, one or more fasteners associated with the candle device can be passed through the candle mount. The fasteners can be configured to be secured from an interior of the EGM, such that access to the interior of the EGM is normally required to release the fasteners. In another embodiments, one or more fasteners may be used which can be adjusted from an exterior of the EGM.

In 650, the wires from the radio can be used to establish a communication pathway to a controller. The controller may be an EGM controller used to generate a game on the EGM or may be a controller associated with a secondary device, such one of the devices described with respect to FIGS. 3, 4 and 5 or a player tracking controller (not shown). In one embodiment, the radio candle mount can be configured to connect to multiple controllers on separate devices. The controller on controllers can use the radio (or radios) to communicate with remote devices, such as a remote server.

Secondary Gaming Devices with Wireless Communication Capabilities

In this section, two secondary gaming devices are described which can be configured to provide wireless communications via the radio candle mount. In various embodiments, the secondary devices can be mounted to and extend from the EGM cabinet such that a portion of the secondary device is visible. For example, a candle device configured to provide wireless communications via the radio in the radio candle mount is described as follows with respect to FIGS. 3 and 4. In another embodiment, a secondary gaming device configured for installation within an interior cabinet of the EGM is described with respect to FIG. 4.

Figure 3:
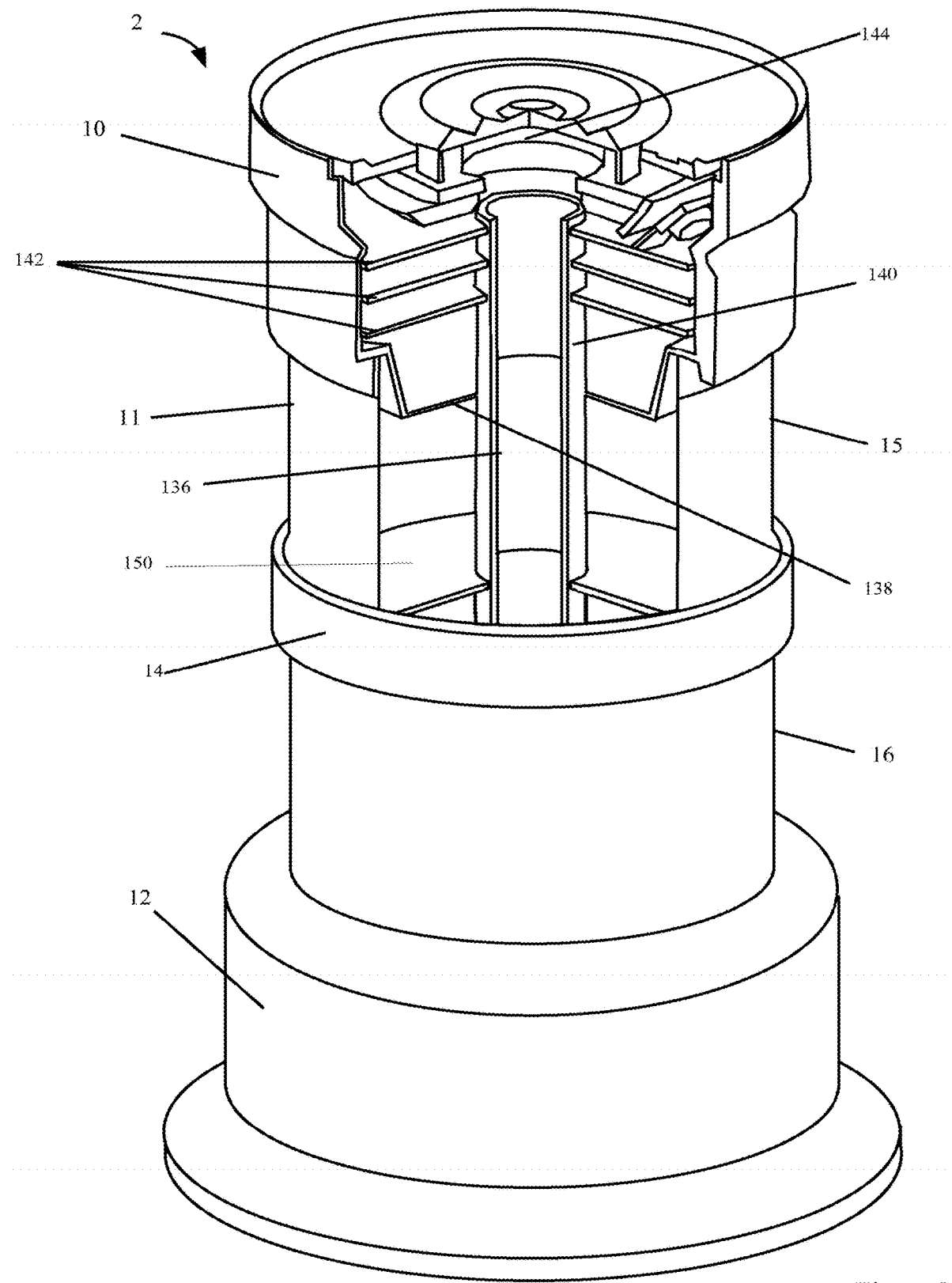
FIG. 3 is a perspective drawing of a candle device including an internal cross section in accordance with the described embodiments.

FIG. 3 is a perspective drawing of a candle 2 including a partial cut-away of a top portion of the housing 10. As described with respect to FIG. 1, the candle 2 includes two stages, 15 and 16, separated by the divider 14. In one embodiment, the candle controller includes 3 PCBs 142, disposed in different horizontal planes. In other embodiments, the candle controller can include one or more PCBs. When multiple PCBs are utilized, one or more connectors between the PCBs can be used to transfer data between the boards. The PCBs can include one or more processors and memory which are used to execute programs for generating additional services on an EGM.

The upper housing 10 includes a bottom portion 138. The bottom portion includes an aperture that allows a center conduit 136 to extend through the bottom portion 138 and into an interior portion of the upper housing 10. The bottom portion 138 separates the enclosure from the two lighting stages 15 and 16 disposed beneath the enclosure. The central conduit can be anchored to the base 12 of the candle 12.

In one embodiment, the one or more PCBs, such as 142, can be coupled to an outer surface 140 of the central conduit 136. For instance, the PCBs can be glued to the outer surface 140. In addition, the one or more PCBs can also be coupled to upper housing 10. In this configuration, an attempt to move the upper housing 10 relative to the central conduit 136, such via twisting or pulling the upper housing 10, can damage the one or more PCBs and possibly render the circuitry on the one or more PCBs non-functional. When the one or more PCBs are coupled to the central conduit 136, a sensor can be provided for detecting stresses in the central conduit. Thus, stresses resulting from attempts to twist or pull the upper housing 10 the upper housing relative to the central conduit. The sensor can be used to trigger an alarm with a stress above a certain threshold is detected. In general, the candle device can include one or more sensors for detecting tampering with the candle device.

Power and data connections can run through the center conduit from the housing 10 such that connections are formed with the one or more PCBs in the housing. The power connection can be used to supply power to a candle controller. The data connections can allow for bi-directional communication between the candle controller and one or more devices coupled to an EGM, such as value input devices, value output devices, displays, etc. or remote devices, such as one or more servers. One of the data connections can allow the candle to send and receive data from the wireless communication interface associated with the radio candle mount. Further, the data connections can allow for bi-directional communications between peripheral devices disposed in different portions of the candle 2, such as lighting elements in each of the stages 15 and 16 and peripheral devices located in the base 12.

The central conduit 136 can include apertures that allow power and/or data connections to extend through the side of the conduit. For instance, an aperture can be provide in the central conduit at each of the stages 15 and 16 to allow power and data connections to extend from the conduit 136 to peripheral devices located in each stage, such as the lighting elements located in each stage. In addition, the power and data connections routed through the center conduit 136 can be connected to a wiring harness that extends from the base 12.

The end of the wiring harness can include one or more connection interfaces. The one or more connection interfaces can couple the candle to an external power source and external communication links. The communication links can allow the controller to communicate with and receive data from devices, such as a game controller, a value input device or a value output device disposed within a gaming machine cabinet to which the candle device 2 is mounted. Details of the wiring harness are discussed below with respect to FIG. 4. A traditional candle device may have fewer capabilities and a simpler wiring harness and connectors. For example, most traditional candles aren't configured for wireless communications or interacting with devices other than a game controller on the EGM.

Each lighting stage, such as stages 15 and 16, can include a number of lighting elements. The lighting elements in each stage can be enclosed to prevent light from lighting elements from one stage from bleeding into another stage. For example, the divider 150 can be composed of an opaque material that prevents light from stage 15 from bleeding into stage 16 when the lighting elements in stage 15 are activated. In some embodiments, each stage can include lighting elements of different colors where each of the colored lighting elements can be activated alone or in combination with lighting elements of different colors to change the color of each stage. The colors of each stage used in a candle 2 can vary from jurisdiction to jurisdiction. Thus, a candle with stages configurable with different colors can allow the candle to be used in multiple jurisdictions.

In one embodiment, a speaker assembly 144 can be mounted to the housing 10. The speaker assembly 144 can provide sound generation capabilities for the candle device 2. In the example shown in FIG. 3, the speaker assembly 144 forms a top portion of the upper housing 10 and part of a secure enclosure for the candle controller. In alternate embodiments, a speaker assembly, such as 144, can be located in an interior portion of the candle device 2 where it is mounted in proximity of an inner surface of the housing for the candle device 2. The inner surface of the housing can include apertures that allow sound emitted from the speaker assembly to be transmitted through the housing. For instance, a cap with apertures can be placed over the speaker assembly 144. In various embodiments, the candle device 2 can be provided without a sound generation device or can be provided with multiple sound generation devices.

In some embodiments, the candle device 2 can be coupled to a remote image capture device. For instance, image capture device can be mounted to a player tracking unit installed within a gaming machine cabinet, a card reader installed within the gaming machine cabinet or at some other location on the gaming machine cabinet, such as within a top box. A wired or wireless communication connection can be implemented between a controller within the candle device 2 and the image capture device. Next details of the candle wiring harness are described.

FIG. 4 is a perspective drawing of a candle 2 including a wiring harness 121. The wiring harness 121 can extend from the base 12 and through the candle mount 18. As shown in FIG. 4, the wiring harness can include a number of wires coupled to connectors, such as 122 and 124. The connectors can include data and/or power interfaces, such as 123 and 125. Via the data and/or power interfaces, a candle controller, lighting elements and other peripheral device disposed within the interior of the candle 2 can receive power and send and/or receive data.

In one embodiment, the candle 2 can be configured to receive external power and then condition the received power. The conditioned power can then be output and received by another device via one of the connectors. For instance, a powered USB interface can be provided on one of the connectors 122 and 124. The power conditions functions can also be provided by the secondary gaming device 200 described below with respect to FIG. 4.

Figure 5:
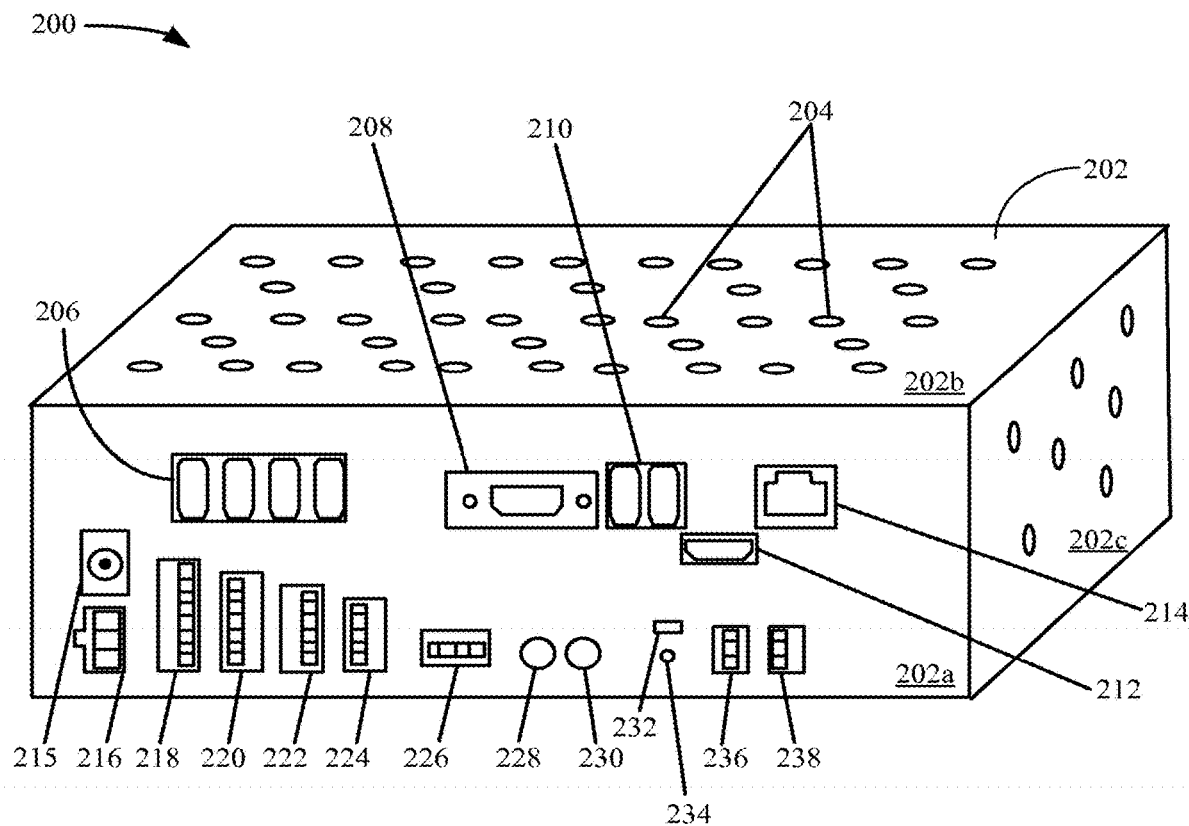
FIG. 5 is a perspective drawing of a secondary gaming device including numerous power and communication interfaces in accordance with the described embodiments.

In various embodiments, all or a portion of the functions described with respect to candle device 2 can also be provided by the secondary gaming device 200 which is configured for internal installation within the gaming machine cabinet (see FIG. 5). Because of the candle device's form factor, the candle device 2 may utilize less common parts, such as circular PCBs. The secondary device 200, unconstrained by the candle device's form factor, as it is mounted within the interior of the EGM, allows it to use more standard parts, such as rectangular PCB board.

In a particular embodiment, the wiring harnesses can include a primary connector 122 and a secondary connector 124. The primary connector 122 can be used to connect a legacy power and data connections on a gaming machine. It is shown as a single component but can comprise multiple components. The legacy power and data connectors can vary from gaming machine to gaming machine and the primary connector 122 can take different forms to allow for compatibility with different gaming machines. As an example, the primary connector 122 includes five apertures 123 for compatibility with legacy communication and data connections on different gaming machines. The compatibly provided by the legacy power and data connectors can allow an existing candle device on a gaming machine to be replaced with the candle device 2.

The secondary connectors 124 can be used to add new data and power connections on a gaming machine and to reconfigure existing data and power connections on a gaming machine. The secondary connector 124 can include power and/or data interfaces, such as but not limited to four different communication and/or data connections 125. The form factor of the secondary connectors including the number and types of connections that can provided can be varied and are provided for the purposes of illustration only. Examples of power and/or data connections that may be included in a secondary connector include but are not limited to USB, DVI, HDMI, Ethernet, an audio jack, composite video, fiber optic, RS-232, RS-422, RS-485, component video, VGA, RGB, digital audio, IEEE-1394, IEC, PS/2, PCI express, PCI, PCI-X, RJ45, RJ11, ATA, SCART and S-Video. One configuration of secondary connectors compatible with many types of EGMs is described below with respect to FIG. 5.

In one embodiment, the candle 2 can include a power switching device 150. The power switching device 150 can be configured to allow power to be cut and then restored for one or more gaming devices on the gaming machine. In one embodiment, the candle device 2 can be configured to cycle power for the entire gaming machine. The power cycling can be implemented in response to a command received from an external device. The commands can be encrypted and other protocols can be used to prevent an unauthorized person from sending the command to the candle device 2. In one embodiment, a mobile application can be configured to generate an authorization message to begin the power cycling on the gaming machine via the candle device 2.

FIG. 5 is a perspective drawing of a secondary gaming device 200 including numerous power and communication interfaces in accordance with the described embodiments. The secondary gaming device includes a housing 202. In one embodiment, the housing 202 is box shaped with six planar sides. The housing 202 can be other shapes and the example of a box is provided for the purposes of illustration only.

In one embodiment, the length, width and height dimensions of the housing 202 can be about 8 inches (L) by 3.5 inches (W) by 2.5 inches (H) for a volume of 70 cubic inches. An internal volume of 100 cubic inches or less provides adequate area for the power and data connectors and volume for the internal circuitry coupled to the connectors including a processor and memory. The volume allows for the housing 200 to fit in the excess space in the interior cabinet of a variety of different types of EGMs (e.g., FIG. 8 shows an interior of an EGM). In a retrofit installation, the excess space can be a location within the EGM cabinet not occupied by the existing EGM components at the time of installation of device 200. The location and the orientation in which the secondary gaming device 200 is installed in the EGM can vary from EGM to EGM depending on the internal configuration of the EGM.

In one embodiment, all of the power and data connectors can be located on one planar surface of the housing. For example, the housing 202 is box-shaped and all of the connectors are located on surface 202*a*. Thus, no connectors are located on the side opposite 202*a*, side 202*b* and its opposite side and side 202*c* and its opposite side. This feature can simplify the installation process as all the power connectors are accessible and visible at the same time which can be important when installing the device 200 in a cramped interior of an EGM cabinet. In another embodiment, the power and data connectors can be distributed across only two surfaces, such as surface 202*a* and 202*c* for example or between surface 202*a* and its opposite side.

One advantage of locating the power and data connectors on only one or only two surfaces of the housing is that it allows the housing to be mounted in a variety of orientations. For example, for housing 202, one or more of the remaining sides can be used for mounting purposes. For example, an attachment interface can be placed on any of sides 202*b* and its opposite, 202*c* and its opposite and 202*a* and its opposite. The orientation of the device 200 in an installed position can depend on the orientation of one or more surfaces in an interior of an EGM to which one or more sides of device 200 are coupled. For example, the device 200 can be mounted to a horizontal surface, a vertical surface, a combination of both a horizontal and a vertical surfaces or a slanted surface).

In one embodiment, a Velcro-type interface, such as Velcro-type tape with two adhesive sides, can be used to couple one or more sides of housing 202 to one or more surfaces within an EGM cabinet, such an interior surface of the cabinet or a surface associated with some other device within the EGM cabinet. In another embodiment, another type of fastener, such a mounting bracket can be used. With a Velcro-type interface, gaming device 200 can be easily swapped with another device if the device is faulty or needs to be upgraded.

The housing 200 can enclose the connectors, processors and memories. The components, such as the processors can generate heat. The housing 200 can include a number of vents, such as a grill of small holes 204, for cooling purposes. A cooling device, such as a fan may be located within the housing or coupled to an exterior portion of the housing. In another embodiment, the housing can be sealed and cooling mechanisms can be placed on the outside and/or inside of the housing, such as heat sinks with radiators or water cooled systems. Sealing the housing can protect the electronic components from dust and/other contaminants which can cause shorts and limit access to the interior housing, which may be beneficial for security purposes. When vents, such as 204 are used, the vents can be covered with a grill or a mesh to prevent dust intrusion.

In one embodiment, the housing 200 can be formed from two or more pieces. The pieces can be configured lock or snap together or be secured to one another via some other type of fastener. Security sensors can be placed within the housing 200. The security sensors can be configured to detect an access to an interior housing and/or manipulation of any of the internal components, such as a processor and/or memory disposed within the housing 200. A processor associated with the secondary device can monitor the security sensors. In addition, the processor can be configured to monitor security sensors or receive security related data associated with the EGM as is described as follows with respect to FIG. 6.

The housing 200 can include a number of apertures for power and data connectors. When device 200 is installed in an EGM, such as during a retrofit, new power and data pathways may be established between the device 200 and various other devices within the EGM cabinet using the power and data connectors. In some instances, the power and data pathways may be temporary in that they are only used during the installation process. In other instances, the power and data pathways may be more permanent in that the power and data pathways are utilized when the EGM is available for wager-based game play. The new power and data pathways may be wired or wireless pathways. All or a portion of the power and data connectors in any combination, which vary from EGM to EGM, may be used to establish the new power and data pathways. In one embodiment, the new power and data pathways can be utilized without modifying software executed by the game controller prior to installation of the secondary device 200.

In one embodiment, face 202*a* includes a number of serial data ports. For example, four USB ports 206 and five ports, 218, 220, 222, 224 and 226 which allow serial data communications using other serial communication protocols are provided. Other types of serial ports using different communications protocols can be provided and the secondary device 200 is not limited to a USB protocol. Devices, which can be coupled to these ports in different embodiments, are described in more detail as follows with respect to FIGS. 6, 9 and 11.

Ports 210 can be used to couple a keyboard and mouse to the secondary gaming device 200. In one embodiment, the keyboard and mouse can be used only during the installation process to install software and configure the secondary gaming device 200. In addition, the video port 208 can be used during the installation process. For example, port 208 can output video associated with a configuration interface generated by device 200.

A number of power related connectors are provided. For example, ports 215 and 216 can be used to receive power, such as a 12 DCV power. A power source, such as an AC power source can be converted to the DC voltage. Other voltages are possible and 12 Volts is provided for illustrative purposes only. The connection format is different for each port. For example, port 215 accepts a round connector while port 216 accepts a rectangular connector. Ports 236 and 238 can be used to supply power to other devices coupled to the ports. In addition, the USB ports 206 can be used to provide power to devices coupled to the secondary gaming device.

The secondary gaming device can include a number of video and audio ports. For example, port 208 is a video port which can be used to output video from the device 200. In one embodiment, port 208 may only be used when device 200 is installed, serviced or verified form regulatory purposes. In one embodiment, the port 208 is a VGA compatible. In other embodiments, different video interfaces can be used, such as DVI or a mini-Display-Port. Port 212 can be used to output video and audio signals. In one embodiment, it is HDMI compatible port. An example of a configuration using port 212 is described with respect to FIG. 11. Port 228 can be used to output audio signals. Port 230 can be used to receive audio signals, such as from a microphone. The USB ports 206 can be used to receive and send audio and video signals.

The secondary device can include a number of network connectors for communicating with remote devices, such as remote servers or portable electronic devices. For example, port 214 can be used to establish a network connection, such as an Ethernet connection. Further, one of the USB ports can be used to couple gaming device 200 to a wireless interface. For example, a radio candle mount, as described above, can be coupled to the secondary gaming device via one of the USB ports 206. The secondary gaming device 200 can be configured to utilize one or both of wireless and wired communication interfaces for network communications. Thus, the secondary device can contain multiple software and hardware modules for providing one or more of a wireless or wired interface between the gaming machine and existing casino and/or lottery systems One or more status related devices can be provided on secondary gaming device 200. For example, a light 232 can be provided which indicates the secondary gaming device is receiving power. In another embodiment, a light (not shown) can be provided which indicates the secondary gaming device is in a ready or operational state. A switch 234 can be provided for resetting or cycling power on the secondary gaming device. A pin can be inserted through an aperture to activate switch 234 and cycle power on the secondary gaming device. Next, details of internal components of a secondary gaming device are described with respect to FIG. 6.

Figure 6:
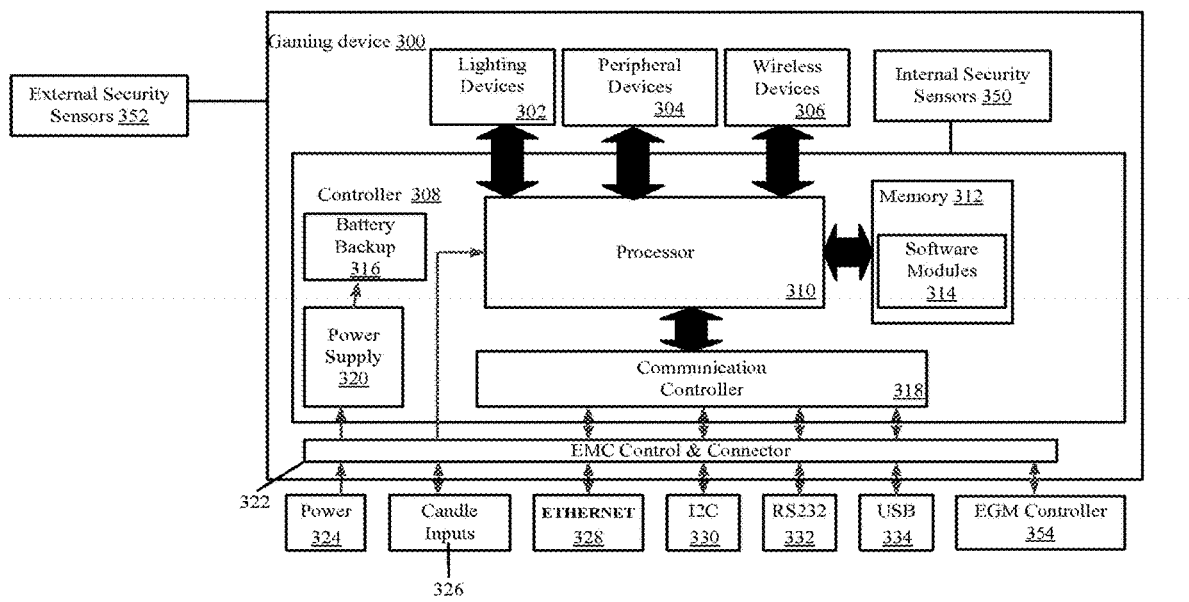
FIG. 6 is a block diagram of a gaming device in accordance with the described embodiments.

FIG. 6 is a block diagram of a secondary gaming device 300 according to an embodiment. All or a portion of the components of the secondary gaming device 300 described with respect to FIG. 6 may be applicable to the secondary gaming devices described above with respect to FIGS. 4 and 5. In one embodiment, the gaming device 300 can be configured to for operation within an interior of an EGM. In this embodiment, the secondary gaming device 300 may or may not include candle inputs 326.

In another embodiment, the secondary gaming device can be a candle device, such as candle device 2, shown in FIGS. 3 and 4, where all or a portion of controller 308 is located within the candle housing. In yet other embodiments, the secondary gaming device can include portions which are located within the interior of the EGM and portions which extend from or form an outer surface of the EGM cabinet. For example, the controller portion of the secondary gaming device can be located in the interior of the EGM and control devices mounted to the exterior of the EGM or the controller can be located in a housing on the exterior of the EGM and control devices at least partially within the interior of the EGM cabinet, such as a display, a value input device or a value output device.

In one embodiment, all or a portion of the inputs and outputs to the secondary gaming device 300 pass through an EMC control & connector component 322, providing electromagnetic compatibility limiting unwanted emissions from the controller 308 and limiting the susceptibility or immunity from unplanned electromagnetic disturbances. This type of connector may be required to conform to EMC standards such as FCC Parts A & B, IEC, and CSAA. To thwart the security of a gaming machine, individuals have been known to generate electromagnetic disturbances to gaming machine components. Further, an electrostatic potential can be build up on a person that is discharged into a gaming machine when the person touches the gaming machine.

The EMC control 322 can prevent unwanted electromagnetic occurrences generated on the secondary gaming device 300 from propagating to devices disposed within the interior of a gaming machine cabinet to which the gaming device 300 can be coupled. In the embodiment, where the secondary gaming device 300 is installed within an EGM cabinet (see FIG. 5), the EMC control and connector 322 may configured to block electromagnetic disturbances from propagating into the device via its various connectors. For example, when the secondary gaming device is installed internally and is coupled to an external candle device, the EMC control 322 can prevent electromagnetic disturbances from entering into the secondary device 300 from the connections between the secondary device and the candle device.

The power input 324 can be configured to provide the input voltage source for the candle power supply 320. In one embodiment, the power supply can be coupled to an AC power in line for the gaming machine. Typically, input voltages range from 12V to 24 VDC. When the gaming device 300 is used with a gaming machine, the power input 324 can come from an internal power supply within the EGM's cabinet. The power supply 320, which is coupled to the power input 324, provides the various output voltage sources for the internal circuits of the secondary gaming device 300. In one embodiment, the gaming device 300 can include voltage conversion circuitry, such as step down circuitry that enables devices requiring varying voltages less than the input voltage to be supplied with power. The stepped down voltages can be provided to devices internal to the secondary device 300 or to devices coupled to the secondary device via one of its power and/or data interfaces, such as a USB device coupled to the via interface 334.

In one embodiment, the power supply 320 can be coupled to a battery backup 316 and used to provide the charging voltage source for the battery backup circuit 316. Many gaming jurisdictions require certain devices, such as security monitoring circuitry on a gaming machine, to include a battery backup in case of casino or machine power failure. Further, the gaming jurisdictions can require a back-up transmission method for receiving data preserved and/or gathered during a power failure. The machine power failure could be a result of a main power grid failure or a local machine power failure that resulted from an attempted security breach (e.g., deliberately cutting power to the gaming machine) or other reasons. The security monitoring circuitry can be configured to detect and store any attempt to open an EGM door during the power failure which provides access to an interior of the EGM cabinet (e.g., see 404 in FIG. 7). The monitoring circuits are typically part of the gaming machine's components. In one embodiment, the monitoring circuits can be linked to the candle.

A battery backed-up transmission method can be configured to provide a way to communicate security information during or immediately upon a power-up. In one embodiment, the method can allow for limited communications even during the power-interruption, such as an alert that a security related event is now in progress or that power has been lost to the gaming machine. The power-up can process can be initiated any time a gaming machine loses power, such as after a gaming machine is moved within the casino, transferred to another location outside the casino or following a power failure. The battery backup 316 can be used to provide a power back-up for one or more of the memories within the candle and provides a timing wake-up input to the controller 308 to store and communicate any security information received during the power failure. The timing set point for the wake-up can be minutes or hours depending on jurisdictional or/and operator requirements.

In one embodiment, the controller can monitor internal security sensors 350. The internal security sensors can be configured to detect unauthorized access to a component of the secondary gaming device 300. For example, in some embodiments, the controller 308 can be enclosed within a housing and an internal security sensor can be configured to detect when the housing is accessed, such as via a locked port, taking the housing a part to access the interior or even damaging the housing to access the interior. In another example, the housing can include one or more external ports and the internal sensors can be configured to detect when a device is connected to or removed from one or more of the ports. In yet another example, the housing can include sensors for detecting when a component, such as a board including controller 308 or a memory device, is removed or installed on the secondary gaming device.

In yet other embodiments, the gaming device 300 can be configured to receive data from external security sensors, such as sensors within an EGM cabinet or sensors external to an EGM cabinet. An EGM controller, such as 354, on the EGM may also monitor one or more these security sensors. For instance, the EGM cabinet can include security sensors for detecting when an exterior door to the EGM cabinet is opened. As another example, the EGM controller 354 can be located within a locked enclosure and a security sensor can monitor when the locked enclosure is accessed. Further, security sensors can be provided for detecting when devices are connected to or removed from various power and communication interfaces. In yet another example, security sensors can detect when devices, such as the bill validator, the printer or a drop box for the bill validator is removed and replaced. These sensors can be monitored by one or both of the EGM controller 354 and the controller 308.

In one embodiment, a new security sensor can be added as part of a retrofit process. The EGM controller 354 may not include software for interacting with the new security sensor. Rather than updating the EGM controller 354 via a software modification, the controller 308 can be configured to handle monitoring of the new security independently of the EGM controller 354. For instance, an image capture device can be used as a security sensor to gather security information. The image capture device can be added as part of a retrofit process where the controller 308 is configured to monitor the image capture device independently of the EGM controller 354.

In one embodiment, all or a portion of the communication channels associated with an EGM can be routed through the secondary gaming device 300 with the communication controller 318. Pass through communication can include communications between an EGM controller 354 or other peripheral device on the EGM (e.g., player tracking unit, bill validator, printer, card reader, etc.) and a remote server that is passed through the gaming device 300. The pass through communications can be transmitted wirelessly, via a wired communication connection or combinations thereof. For example, a portion of the communications can be transmitted wirelessly and a portion can be transmitted via a wired communication connection. In some instances, particular communication types, such as from a particular device, may be transmitted via only one communication mode, such as wirelessly or wired communications. In other embodiments, the communication mode used for a particular communication type can be varied over time (e.g., using wireless at a first time, wired at a second time and then wireless at a third time). As described above, the radio candle mount can be used as a wireless interface for wireless communications.

These communications channels may support various communication protocols. Thus, the controller 308 can be configured to parse and generate messages associated with various communication protocols. For instance, the communication channels can be used to implement one or more of Ethernet 328, I2C 330, RS-232 332 and/or USB 334. Other communication protocols that may be used are RS-485, IEEE 1394 (Firewire), Netplex and other standard or proprietary serial or parallel communication protocols used in the gaming industry as well as the computing industry. If available, these channels can be implemented as wired or wireless embodiments. For instance, a wireless communication protocol, such as but not limited to wireless USB, Wi-Fi, WiMAX, NFC, RFID or Bluetooth can be implemented to allow for wireless communications between the secondary gaming device 300 and other devices within the EGM or external to the EGM. One or more different wireless interfaces can be used to implement these wireless communication protocols. Besides, wireless communications, wireless power transmission may also be supported in secondary gaming device 300.

Depending on the number of gaming systems to which a gaming machine is connected, some EGMs may utilize only a single external communication channel connection while others may utilize multiple channels. The communication controller 318 can be configured to provide the non-intrusive multiplexing and de-multiplexing of the wireless and wired communication interface data. Thus, the communication controller can be implemented with no change or interference to any protocol or related data from or to the gaming machine. The non-intrusiveness can allow an existing gaming machine to be equipped with a gaming device 300 utilized for external communications purposes without altering existing gaming software, such as regulated gaming software used by a gaming controller on a gaming machine or gaming system software used by back-end servers coupled to the gaming machine, as well as without interference between protocols or related data from or to the gaming machine. As described herein, the secondary gaming device 300 can provide other functions without altering existing gaming software and the example of communications is provided for the purposes of illustration only. In additional embodiments, the communication controller 318 can be configured to detect player messages from a player tracking unit and communicate with devices, such as servers associated with a player tracking system. Also, the communication controller 318 can be configured to communicate with portable electronic devices utilized by casino personnel and casino patrons alike.

Figure 9:
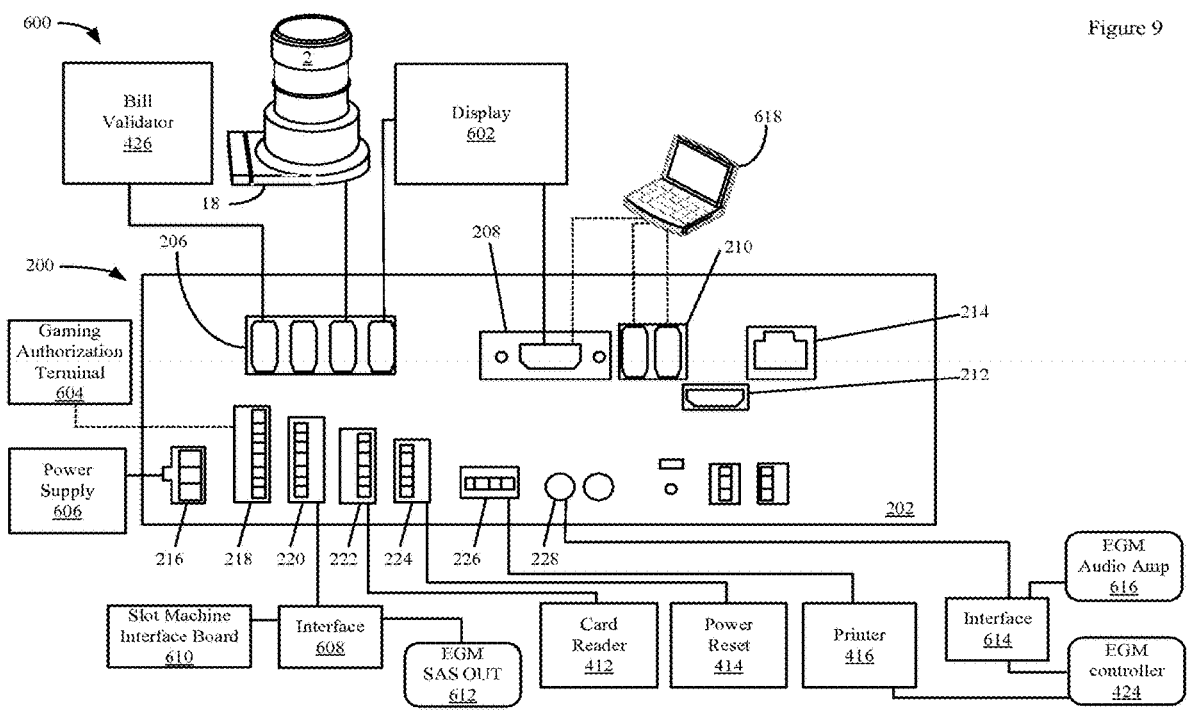
FIG. 9 is a connection diagram of a gaming device coupled to an electronic gaming machine in accordance with the described embodiments.

EGM Integration of Secondary Gaming Devices with Wireless Communication Capabilities With respect to FIGS. 7, 8 and 9, the integration of secondary gaming device with wireless communication capabilities, such as provided by the radio candle mount, are discussed. Further, the operation of an EGM configured to provide wager-based gaming is also discussed. In various embodiments, the EGM can be retrofitted with a secondary gaming device and/or a radio candle mount.

FIG. 7 is a perspective drawing showing exterior portions of an electronic gaming machine 450. A radio candle mount 18 is disposed between a candle 2 and a top portion 406 of an EGM cabinet. In this example, the top portion 406 is a top box. In various embodiments, EGMs can include or not include a top box. The radio candle mount 18 may have been installed when the EGM 450 was manufactured or as part a subsequent retrofit process. The candle 2 can be an enhanced candle as described with respect to FIGS. 3 and 4 or a more basic device. A controller associated with a secondary gaming device (e.g., see FIGS. 4, 5 and 6) or an EGM controller can coupled to and configured to use the one or more wireless interfaces associated with the radio candle mount 18.

The gaming machine 450 can be used to play a wager-based game. The wager-based game can be generated under control of a game controller disposed within a main cabinet 430. The door 404 can be opened to provide access to an interior of the EGM (e.g., see FIG. 8). As described above, one or more secondary gaming devices, such as described with respect to FIG. 5 can be disposed within the interior of the EGM.

The gaming machine can include a player tracking panel 405 (e.g., a display 410, a card reader 412 and/or a key pad (not shown)) for performing player tracking transactions, a monitor or reel area 420 for displaying the wager-based game, a player input panel 446 (generally having buttons) for making selections associated with the play of the wager-based game, such as for inputting game related decisions and wager amounts, a coin-in acceptor 444 for accepting coins, a bill acceptor 426 for accepting bills, printed tickets and/or cashless media, a coin-out device (hopper) for outputting coins and/or tokens to tray 448, and a ticket printer 416 for generating cashless or promotional tickets. In addition, the ticket printer 416 can be used to generate other types of printed documents, such as receipts, boarding passes, tax forms, lottery tickets, keno tickets, etc.

Many different types of EGMs including tables used for table games can be equipped or retrofit with the radio candle mount 18 and secondary gaming devices as described herein and the EGMs are not limited to the example shown in FIG. 7. The EGMs can have different combinations of devices than those shown in FIG. 7. For instance, some EGMs may not include a coin acceptor or a coin hopper. Further, different types of gaming machines, such as class II bingo type EGMs or lottery terminals can also be equipped with the radio candle mounts and/or secondary gaming devices described above.

The EGM 450 can have a game controller (not shown) disposed within a locked enclosure (see 424, FIG. 8). The game controller can be configured to control a wager-based game played on the gaming machine including receiving wagers on the outcome of a game. The game controller can include a random number generator that is used to determine outcomes. In addition, the game controller can be connected to a number of devices that are used during operation of the gaming machine. For instance, the game controller can be communicatively coupled to the candle 2, the monitor 420, the printer 416, the bill/ticket acceptor 426, the player input panel 405, the coin-in (acceptor) 444, the coin-out (hopper) 432 (see FIG. 8) and the audio system 418 (see FIG. 8).

The game controller can be configured to send commands to the peripheral devices that control their operation and receive data, such as acknowledgement of the commands from the peripheral devices in response. The game controller can execute regulated gaming software to perform these functions. The game controller can also access various network interfaces that allow the game controller to communicate with external devices. For example, the player tracking panel 405 can include a player tracking communication interface (see 608, FIG. 9), which can be used by the game controller to communicate with external devices.

In one embodiment, the monitor 420 can be a touch screen display. The display can be configured to receive video content from each of the game controller and a secondary gaming device described above. For example, first content from the game controller can be displayed on portion 440 of the display 420 and second content from a controller in the secondary gaming device can be displayed on portion 442 of the display 420. Video slot, poker, bingo, keno, lottery and blackjack are a few examples of games that can be displayed on monitor 420.

In one embodiment, the controller associated with the display 420 can be configured to receive sizing, scaling and positioning commands that allow content received from multiple sources to be displayed in different portions of the display. In another embodiment, a secondary gaming device (see 690, in FIG. 11) can include a controller for performing these functions. In yet another embodiment, a secondary gaming device, such as described above with respect to FIGS. 4 and 5 can perform this function.

The sizing, positioning and scaling commands can result in content sent to the display 420 to be output in a stretched or a compressed format relative to the native resolution in which content the content is generated. For example, video content output from a game controller in a native format can be stretched or compressed. As described above, one or more of the controllers on the EGM can be configured to generate translation functions for the video input and for the touch screen output that interpolates the video input to fit within a designated display area and interpolates the touch screen output to account for positioning and scaling commands received from an external device.

The touch screen display 420 can be the main display the gaming machine 450 where video content associated with a wager-based game generated by the game controller is displayed. The game controller can be configured to output the video content in a native resolution, such as 640 by 480.

The native resolution can vary from EGM to EGM. The video content can include indications of locations where a touch detected by a touch screen can cause the game controller to perform an action in response. For instance, in response to a detected touch, the game controller can change the video content output to the touch screen display.

In one embodiment, the touch screen display 420 can be a replacement display such that it replaces the display installed in the EGM during its manufacture. For example, the replacement display can be installed during a retrofit of an EGM. When used as replacement display, the touch screen display 420 can have a resolution that is greater than the native resolution in which the video content output by the game controller is generated. For instance, the touch screen display 420 can have resolution of 1280 by 960 while the native resolution of the content output by the game controller 424 is 640 by 480. When a display technology with a fixed pixel size, such as an LCD, is used as the replacement display, interpolation and/or smoothing can be utilized to scale the content output from the gaming controller to fit the resolution size of the display. These functions can be performed by a controller on the EGM, such as a controller associated with a secondary gaming device, which is installed as part of a retrofit. In another embodiment, one or more of these functions can be performed by a controller associated with the display 420.

As described above, a first controller can be configured to receive sizing, positioning and scaling related commands, which affect video content output to the display 420, such as video content from a plurality of different sources. In one embodiment, a secondary controller is configured to generate these sizing, positioning and scaling related commands and not the game controller. For instance, the secondary controller can be configured to select picture in a picture modes that allows the video content output from game controller to be displayed on different portions of the touch screen display at different resolutions where the native resolution output by the game controller and sent to the touch screen display is constant and is altered after it generated via one or more secondary controllers.

The sizing, scaling and positioning commands can be associated with picture-in-picture (PIP) capability of the display 420. Using the PIP capability, video content can be transmitted from a secondary gaming device and displayed as a PIP mode on the display 420. In one embodiment, the video can be transmitted via a USB interface (see 206, in FIG. 9). Via a secondary gaming device, the PIP capability can be used to output real-time or stored video for the player. The real-time video can be received from a remote source, such as a server located on an internal or external network (see 506, in FIG. 10)

In one embodiment, one or more secondary gaming device can control the PIP independently from the game controller. Thus, the game controller may not be aware that the video content that it is outputting is affected by PIP commands issued by the one or more secondary gaming devices or that the one or more secondary gaming devices is sending control commands to the display 420. Thus, the PIP capabilities can be provided in a retrofit situation without modifying the game software executed by the game controller prior to the retrofit.

In another embodiment, the game controller can be configured to transfer or allow control of the display 420 by a secondary gaming device. Thus, the game controller may be aware of the secondary gaming device and configured to communicate with it in some manner. As an example, the game controller can be configured to hand over control to a secondary gaming device to allow it to display a bonus game presentation or a wager-based game presentation on all or a portion of the touch screen display 420. Thus, game controller can engage in bi-directional communications with the secondary gaming device to indicate when the display is available and the secondary gaming device can communicate when it is finished using the display. When the secondary gaming device indicates it has completed displaying the bonus game presentation or outputting some other type of video content, the game controller can reassume control of the display 420. When the game controller controls the display, it may prevent a controller on a secondary gaming device from outputting content to the display 420.

FIG. 8 is a perspective drawing showing exterior and interior portions of an electronic gaming machine 400 in accordance with the described embodiments. The EGM 400 includes a different arrangement of components then shown in FIG. 7. For example, the printer 416 is located above display 420 in FIG. 8 as opposed to below display 420 as shown in FIG. 7. In addition, the EGM 400 presents different form factors. For example, top box 406 is rectangular shaped in FIG. 7 but includes a rounded portion as shown in FIG. 8.

A light source 408 and wiring panel 414 are disposed within an interior of top box 406. An aperture in a top of the EGM cabinet 430 on which the top box rests can allow data and/or power wires from the wiring panel to pass within an interior of cabinet portion 430. In addition, the aperture can accommodate data and/or power wires from a wiring harness associated with candle 2 and radio candle mount 18.

A support structure 422 surrounds display 420. In one embodiment, the display 420 can be an LCD. However, older EGMs can utilize CRT type displays. A locked enclosure 424 is positioned beneath the display 420. The locked enclosure 424 can include a game controller. When the enclosure is opened 424, an access port may be exposed which allows communications with the game controller and/or may allow the game controller to be removed. The locked enclosure 424 allows an interior of the EGM cabinet 430 to be accessed while still limiting access to the game controller in 424.

The locked enclosure can be monitored with various sensors which detect when the enclosure 424 is opened and/or a lock associated with the enclosure is actuated. As described above with respect to FIG. 5, the secondary gaming device 200 can include a locked port which allows access to an interior of a housing of the secondary gaming device and sensors for detecting when the interior of device 200 is accessed. Similarly, various sensors can be associated with the door 404 which detect when the door 400 is opened and/or a lock associated with the door 404 is actuated. The game controller in enclosure 424 can be configured to monitor security sensors associated with enclosure 424 and door 404. The secondary gaming device 200 can also be configured to monitor these sensors as well as its own security sensors.

A bill stacker 428 is positioned beneath the bill acceptor 426. The bill stacker 428 can receive currency, tickets and/or other media inserted into the bill acceptor. Typically, when the bill stacker 428 becomes full, the door 404 is opened and the bill stacker 428 is replaced with an empty bill stacker and the full bill stacker is taken to a room counting and auditing purposes.

A coin hopper 432 is position beneath the locked enclosure 424. The coin hopper 432 is configured to receive coins inserted via the coin slot 444 in door 404, count the coins and dispense coins into coin tray 448. In some embodiments, a portion of the coins from the hopper 432 are routed to a drop box which is periodically emptied.

In a retrofit, a secondary gaming device, such as 200 in FIG. 5, can be placed in an empty space in the EGM cabinet 430. For example, the secondary gaming device can be placed beneath the bill stacker 428. The placement location of the secondary gaming device can be selected to include enough space to accommodate the secondary gaming device, minimize the length of wiring paths and allow for wires to be routed from the devices to which the secondary gaming device is connected such that the wiring doesn't interfere with normal operations of the EGM. For example, it might not be desirable to route wires around or near the bill stacker 428 so that the bill stacker's removal and replacement doesn't pull out and disconnect the wires.

The internal arrange of devices can vary significantly from EGM to EGM. Thus, the secondary gaming device, such as 200, may be located in different locations and in different orientations depending on the internal configuration of the EGM. In one embodiment, a secondary gaming device, such as 200, can be placed in a top box 406 as part of a retrofit. In another embodiment, one secondary gaming device can be placed in the top box and another secondary gaming device can be placed in the EGM cabinet 430, such as beneath display 420. In yet another embodiment, the secondary gaming device can be mounted to an exterior surface of the cabinet, such as a candle 2 configured to provide enhanced gaming functionality and then communication connections can be routed through the interior of the EGM 400, such as through the top box 406 and EGM cabinet 430.

FIG. 9 is a connection diagram 600 of a secondary gaming device 200 coupled to an EGM. This configuration is provided for purposes of illustration only as different combinations of devices can be coupled to the secondary gaming device. For example, in some embodiments, the secondary gaming device 200 may not be connected to a card reader. In other embodiments, the secondary gaming device can be coupled to a camera (not shown). In yet other embodiments, the secondary gaming device can be connected to a candle device. In other embodiments, it may not be connected to candle device.

A first one of the USB ports 206 is connected to a value input device, which is a bill validator 426 in this example. The bill validator 426 can also be configured to communicate with the EGM controller 424. As described above, the EGM controller 424 can control a play of a wager-based game on the EGM including determining an outcome to the game, which may be a random outcome, and determining an award associated with the determined outcome. In various embodiments, the secondary gaming device 200 and the EGM controller can be configured to both communicate with and/or both control one or more of the devices on the EGM. For example, both the secondary gaming device 200 and the EGM controller can communicate and control a display, a printer or a bill acceptor. In other embodiments, the secondary gaming device or the EGM controller 424 may only communicate with and/or control a particular device. For example, the secondary gaming device can communicate with a wireless interface which is not communicatively coupled to EGM controller or the EGM controller can communicate with a bonus device, such as wheel, which is not communicatively coupled to the secondary gaming device.

In a retrofit, a communication connection can be interposed between a new communication pathway between the EGM controller and another device, such as the bill validator, or the new communication pathway can be added as a separate connection. For example, the EGM controller can communicate with a device, such as the bill validator, via one communication pathway coupled to a first port on the bill validator and the secondary gaming device can communicate with a device, such as the bill validator, via a second communication pathway coupled to a second port separate from the first port. As another example, both the EGM controller and the secondary gaming device can communicate with a device, such the bill validator, via a common port, where a connection was added during the retrofit which allowed the secondary gaming device to share the common port.

In a particular embodiment, the secondary gaming device may be able to interrupt a communication from the bill validator 426 to the EGM controller 424 or from the EGM controller 424 to the bill validator 426 and optionally generate a substitute communication. For example, the bill validator 426 can receive currency or a printed ticket and attempt to send the information to the EGM controller 424. The secondary gaming device 200 can be configured to interrupt the communication to the EGM controller 424 so that it doesn't reach the EGM 424 controller and instead process the communication and send a response to the bill validator. In another embodiment, the secondary gaming device 200 can be configured to route the interrupted communications to one or more remote devices via a network interface associated with the secondary gaming device. In some instances, when a signal is routed to a remote device, the remote device can be configured to generate a substitute signal.

In another embodiment, the secondary gaming device can be interposed between the EGM controller 424 and a printer 416 and can also be interposed between the EGM controller 424 and external Ticket-In/Ticket-Out (TITO) server. The EGM controller 424 can receive a cash out command and in response generate a command to print out a ticket for some amount of credits on the gaming device or dispense coins from a coin hopper on the gaming machine. The EGM controller 424 can send the amount to the TITO server that it intends to dispense. The secondary gaming device can intercept the request and in response generate an offer. The offer can be for a lottery ticket or some other item of value. The offer can be displayed on a display screen on the gaming device, such as display 420. The player can accept the offer. The offer can be for some portion of the cash out value. If the player does not accept the offer, the original message from the game controller 424 can be sent to the external device 150.

In general, the secondary gaming device 200 can be configured to interrupt communications between two logic devices and optionally generate substitute communications on any communication pathway on which it is interposed between the two logic devices. For example, the secondary gaming device 200 can be interposed on a communication pathway between a card reader and a player tracking controller. After it is interposed, the secondary gaming device can be configured to interrupt a communication from the card reader to the player tracking controller or from the player tracking controller to the card reader. The secondary gaming device can then generate a substitute communication. In one embodiment, the substitute signal can be generated based upon information contained in the interrupted communication. In another example, the secondary gaming device can be interposed between the player tracking controller and the EGM controller.

Also, the secondary gaming device 200 can be configured to route communications between two logic devices to alternate devices. The communication routing can involve changing the destination of communication from its original recipient. For example, a communication sent from a bill validator 426 to the EGM controller 424 can instead be sent to another destination, such that the EGM controller 424 doesn't receive the communication.

In another embodiment, the communication routing can involve cloning all or a portion of a communication and sending it to one or more additional sources. For example, a communication sent from a bill validator 426 to an EGM controller 424 can be cloned such that the EGM controller 424 receives the communication and one or more additional devices receive all or a portion of the communication. The routing and cloning functions can be invisible to the devices which have sent a communication. For example, when the bill validator 426 sends a communication to the EGM controller 424 or vice versa, the bill validator 426 and/or the EGM controller 424 may not know that the secondary gaming device 200 has rerouted or cloned the communication.

In one embodiment, the secondary gaming device 200 may only monitor communications to and/or from the bill validator 426. For example, the secondary gaming device 200 can receive information related to monetary transactions performed on the bill validator 426, such a transaction amount and even an image of a bill or scrip which has been accepted, and data related to the performance of the bill validator, such sensor data and or data from bill validator controller, which can indicate a status of the bill validator. The sensor data and/or data from the bill validator controller may be used to schedule maintenance for the bill validator 426. For example, if the bill validator is rejecting currency or scrip which is above a threshold value, the secondary gaming device can determine maintenance is needed. This decision may also be determined by a remote device, which has received the bill validator information via the secondary gaming device.

In another embodiment, the secondary gaming device 200 can be configured to send data to the bill validator via the connection between the bill validator and the secondary gaming device. For example, the secondary gaming device 200 can be configured to download new firmware to the bill validator. In another example, the secondary gaming device 200 can be configured to send commands to the bill validator, such as command to reboot itself or a command to adjust operation of a sensor on the bill validator. In general, the secondary gaming device 200 can be configured to directly communicate with a controller on any of the devices to which it is connected. The communications can involve sending commands and/or data including software, which affects operation of the device.

A second one of the USB ports 206 is coupled to the radio candle mount 18. Via this communication interface, the secondary gaming device 200 can be configured to send and/or receive wireless communications. In one embodiment, the secondary gaming device 200 can be also coupled to a candle device 2, via one of the USB ports. A third one of the USB ports is coupled to a display 602. In various embodiments, the display 602 can be a main display on the EGM on which all or portion of a wager-based game is output, a secondary display on which the EGM controller 424 displays secondary information, such as bonus information, a player tracking display on which a player tracking controller displays information or a separate display, which is controlled by the secondary gaming device, alone or in combination with a remote device. In other embodiments, other devices can be coupled to one of the USB ports 206. For example, a camera or other security device can be coupled to one of the USB devices.

In particular embodiments, one or more of the USB ports can be configured to only connect to a particular type of device. For example, the secondary gaming device 200 can be configured to only recognize the bill validator 426 when it is connected to the first USB port of the four USB ports. If a bill validator 426 is coupled to one of the other three USB ports, the secondary gaming device can be configured not to recognize the bill validator. Further, if another type of device is coupled to the first USB port, the secondary gaming device 200 can be configured not to communicate with the device. In other embodiments, a greater number of USB ports, a lesser number of USB ports or no USB ports can be included on the secondary gaming device.

Typically, part of the USB protocol includes allows different types of devices to use a standard port. For example, a USB compatible keyboard can be plugged into the same port as a USB compatible mouse. Thus, a restriction of a particular USB port to a particular USB compatible device is not usually associated with USB.

Five serial ports, 218, 220, 222, 224 and 226, of different sizes and orientations are disposed beneath the USB ports 206. In one embodiment, each of the non-USB serial ports can be configured to accept a particular type of device. The different ports sizes and orientations can be used to reduce installation mistakes, such as during a retrofit. If all the ports where the same size and the same orientation, then two different devices might be misconnected. For example, a printer 416 could be connected in the card reader port 222 and a card reader 412 could be connected in the printer port 226. The different sizes and/or different orientations (a vertical versus horizontal orientation) helps to ensure the devices are correctly connected. Even though the ports sizes are different, the same communication protocol can be used on all or portion of the non-USB ports. For example, two or more of ports, 218, 220, 222, 224 and 226, can utilize an RS-232 communication protocol.

In the example of FIG. 9, port 218 is a spare port. However, it can also be used to support regulatory functions, such as verifying software installed on the EGM. Thus, in one embodiment, a gaming authorization terminal 604 or other type of device configured to perform regulatory functions can be coupled to the secondary gaming device 200 via port 218. In another embodiment, another device, such as a connection to a button panel or button on the EGM can be established via port 218.

Port 220 is configured to receive slot accounting communications from an EGM controller 424. In the example, an interface 608 is interposed between the EGM SAS out 612 and a slot machine interface board (SMIB) 610. In one embodiment, the interface 608 can have two components—a microcontroller board, and the harnessing. The microcontroller board, which may include proprietary firmware, can be a passive or active device that monitors communication between the EGM and the SAS host controller for the purpose of relaying information to the secondary gaming device.

The SMIB 610, often coupled to a player tracking unit, is used to communicate EGM accounting information to a remote device. In this example, via the interface 608, the secondary gaming device 200 can be configured to receive accounting related information from the EGM controller 424 sent via SAS interface 612 and forward it to a remote device if desired. Further, the secondary gaming device may be able to send certain SAS enabled commands to the EGM controller 424, such as a command to add promotional credits to an EGM or print a promotional ticket. As described above, the secondary gaming device 200 can be configured to interrupt and generate substitute communications on this communication pathway.

SAS is one example of a communication protocol which an EGM controller, such as 424, can use to communicate with a remote device. The Slot Accounting System (SAS) protocol was initially designed to automate slot machine meter reporting and event logging, SAS has evolved over the years to include player tracking, bonusing, ticketing and cashless gaming. SAS can be considered a casino communications standard because of its availability to all manufacturers in the industry.

The Gaming Standards Association (GSA), representing a broad range of gaming industry manufacturers and operators, adopted SAS 6 as a recognized communications standard for the industry in July of 2002. The latest version of the protocol is SAS 6.02, which is fully backward compatible with all previous versions. SAS 6.02 complies with the latest Nevada Gaming Control Board Technical Standards for gaming machine accounting, as well as providing complete multi-game and multi-denomination accounting. In various embodiments, the secondary gaming device can be configured to support different versions of SAS and other gaming specific communication protocols, such as protocols related to slot accounting.

Port 222 is coupled to a card reader 412. The card reader 412 can be an existing card reader or one that is added during the retrofit. A microcontroller tap can be used for an existing card reader, such one on a player tracking unit coupled to an EGM. The microcontroller tap can plug in between the existing card reader and a SAS host controller. A new player card reader, which may be installed during a retrofit, can include a built-in port that directly connects to the secondary gaming device 200.

Typically, a card reader, such as 412, on an EGM communicates with and is controlled by a player tracking controller on the EGM. Via an interface, such as the microcontroller tap to the card reader 412, the secondary gaming device may be able to receive information from inserted cards and perform functions not supported by a player tracking controller.

As an example, most player tracking controllers only recognize magnetic striped cards associated with a player tracking club. Via the interface to the card reader 412, the secondary gaming device 200 may be able to recognize other types of cards, such as a credit and debit card inserted into the card reader. The information read from a credit or debit card might be used to perform a value transaction or merely identify a person which may not have a player tracking card. As described above, the secondary gaming device 200 can be configured to interrupt and generate substitute communications on this communication pathway. For example, when a credit card is inserted in the card reader, communications from the card reader 412 to a player tracking controller may be interrupted or cloned.

Port 224 can be coupled to a power reset device 414. A power reset device 414 can be used to cycle power for one or more devices on the EGM including the EGM controller 424. Additional details of a power reset device are described in U.S. patent application Ser. No. 13/890,285, titled, "REMOTE POWER RESET FEATURE ON A GAMING MACHINE," filed May 9, 2013, by Wells, et al., which is incorporated by reference and for all purposes.

Port 226 is coupled to a printer 416. The secondary gaming device can be configured for real-time remote monitoring of the health of the ticket printer (paper low, paper out, ticket jams, etc.), allowing for quick resolution by floor personnel. In particular embodiments, the secondary gaming device can monitor both Future Logic GEN2 Universal printers (Glendale, Calif.) connected via the second port on the printer and TransAct Epic950 Printers (Hamden, Conn.) connected via TransAct's eServer Port. Other types of printers can be monitored and these are provided for the purposes of illustration only.

Port 228 is coupled to an EGM audio amplifier 616 via interface 614. In this embodiment, the interface is interposed between the EGM controller 424 and the audio amplifier 616. Via the interface, the secondary gaming device 200 can be configured to output audio signals via speakers existing on the EGM. The speakers may also receive audio signals from the EGM controller 424. The audio signals from the secondary gaming device can be mixed with or output separately from the audio signals generated from the EGM controller 424.

A power supply 606 is shown coupled to port 216. In one embodiment, an AC voltage associated with the EGM's power supply can be converted to a DC voltage. The DC voltage can be input via power port 216.

A terminal 618 is shown coupled to ports 208 and 210. In one embodiment, the terminal can support video, a keyboard and a mouse or touchpad. Typically, the terminal may be coupled to ports 208 and 210 during installation, repair or maintenance. In one embodiment, these ports may only be used for these purposes. In other embodiments, the ports can be used to support other devices outside of installation, repair or maintenance. For example, port 208 can be used to output video signals to a display device 602 coupled to the EGM while the EGM is operational for game play. Next, details of gaming network with EGMs coupled to secondary gaming devices and/or radio candle mounts are described with respect to FIG. 10.

Casino and lottery operators wish to enhance entertainment and promotional value to the gaming machines and other gaming devices on the casino floor for their players. Due to the jurisdictional restrictions placed on game programs and machines due to gambling laws and the cost of program changes, if even possible, it is very difficult to provide active and real time changes to entertainment and promotional features. Using the gaming system described herein, a casino operator can have the ability to deliver entertainment and promotional value to the player without the need to change game program code, such as regulated gaming software, on the gaming machines or the system servers, such as a player tracking server, a wide area progressive server, the link progressive server or a ticket-in/ticket out server.

Figure 10:
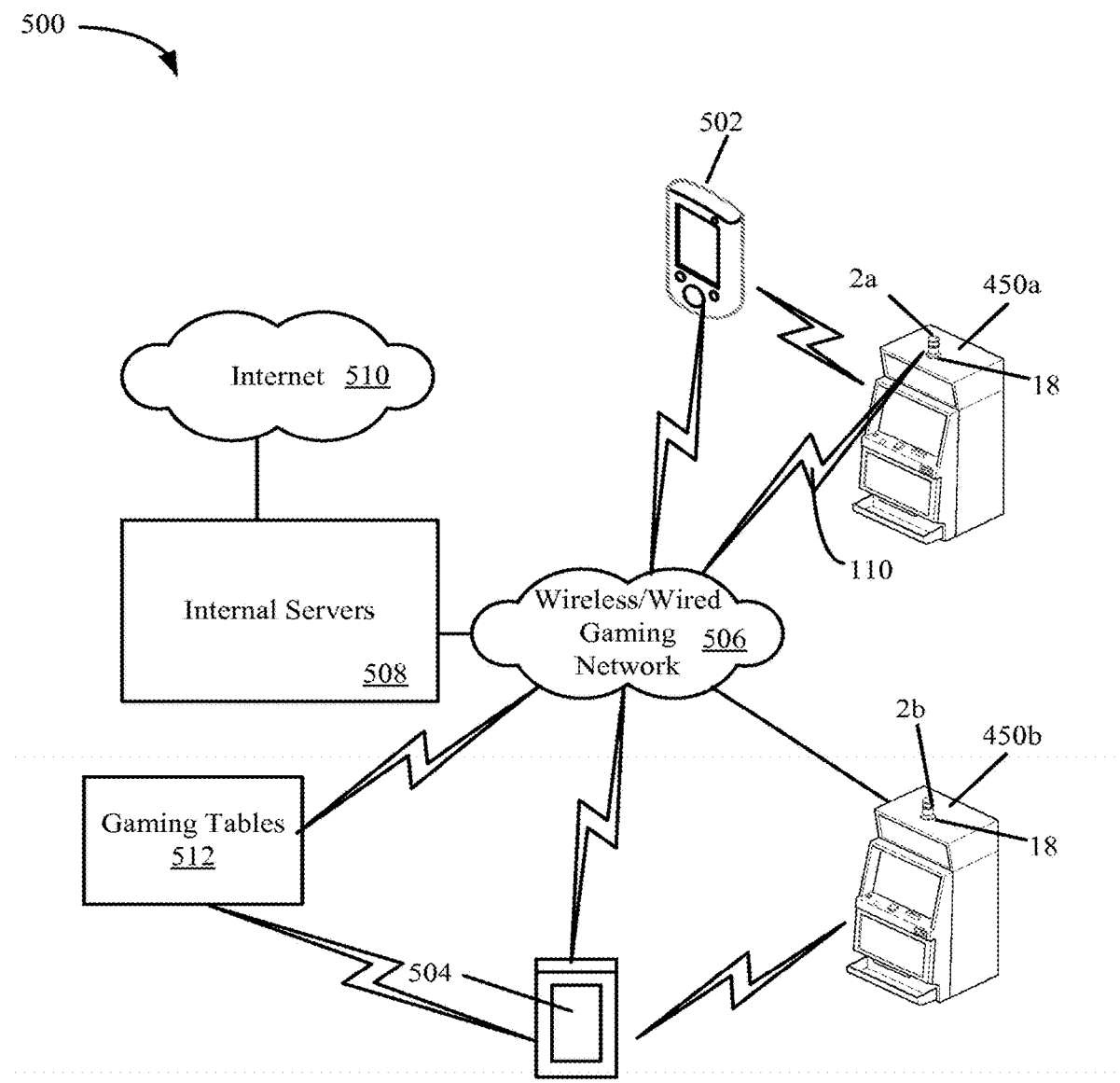
FIG. 10 is a diagram of a gaming system including gaming machines outfitted with candle devices and configured to communicate with mobile devices in accordance with the described embodiments.

FIG. 10 is a diagram that illustrates a gaming system 500 including EGMs outfitted with candle radio mounts that wirelessly communicate with servers in accordance with the described embodiments. In one embodiment, the gaming system can include one or more EGMs, such as 450a and 450b. The EGMs can be different models and types supplied by different gaming machine manufacturers. The EGMs can each be equipped with candle device, such as 2a and 2b, which can be secured to the gaming machines with candle radio mounts 18 where the candle radio mounts 18 are disposed between the candles 2a and 2b and a top of the EGM cabinet.

The candle radio mounts 18 can include one or more wireless communication interfaces as described above.

Using the wireless capabilities of each radio candle mount, a gaming network 506 can be provided. Via the gaming network 506, various gaming devices can utilize the candle radio mounts for communications. For example, as described with respect to FIG. 11, the gaming devices can communicate with a network switch 656. The network switch 656 can transmit and receive data from different devices in the gaming network 506. In one embodiment, the network 506 may allow peer-to-peer communications, such as between EGMs 2a and 2b and/or table games (not shown).

In one embodiment, the network switch can be configured to de-multiplex/de-encrypt the data stream from the gaming machines equipped with wireless and/or wired capabilities and send the resultant data streams to internal servers 508 to which particular wireless communications are addressed. For example, the internal servers 508 can be implemented on one or more devices with processors and memory to provide services, such as but not limited to progressive games, accounting, cashless transactions, player tracking, picture in a picture, hotel reservations, entertainment reservations, games including bonus games, software, health monitoring, maintenance, valet, transportation, sports book, and security associated with a casino operation.

In addition, communications can be provided to servers outside a local casino area network via the Internet 510. For example, access to social media sites including the ability to push or pull data from social media sites can be provided. In another example, airline servers which allow check-in and boarding pass generation including printing a boarding pass at the EGM can be provided. In yet another example, access to review sites, such as Yelp™. In general, the Internet 510 communications can enable services that depend on access to servers located on an external network. The Internet 510 communications can be firewalled and limited to prevent attacks, such as hacking attacking, from outside on the gaming network 506 on gaming devices within the gaming network 506.

In particular embodiments, wireless access points can be provided that allow a portable electronic device, such as 502 and 504, to communicate with other gaming devices in the gaming network 506. For instance, via a Bluetooth™ interface in the candle radio mounts, 18, a portable electronic device can be allowed to communicate with one or more of the internal gaming servers 508. As another example, wireless access points (e.g., see FIG. 11) providing support for one or more different wireless communication protocols can be distributed throughout a gaming environment, such as a casino, which allow communications with one or more of the internal gaming servers 508. In one embodiment, the servers 508 can support a hospitality application executing on the portable electronic device. For instance, MGM resorts International™ provides an "M life" players club application that can be executed on a player's portable electronic device, such as 502 or 504.

In another example, the EGMs, such as 1a and 1b, can include other devices capable of communicating with a portable electronic device. For example, an EGM can include a secondary device, such as a bill validator, which is configured to receive account information that enables electronic cash transaction from a portable electronic device. In one embodiment, the portable electronic device can include an NFC (Near field Communication) interface that can communicate account information via a NFC interface on the EGM, such as an NFC interface on a bill validator. As an example, the portable electronic device can execute an electronic wallet application that supports electronic purchases via an NFC interaction like PayPass™ by MasterCard™. The electronic wallet application can be used to initiate a transfer of funds that allows credits to be deposited onto the gaming machines.

As mentioned above, a few other examples of servers that can be coupled to the wireless gaming network 506 can include servers in other gaming establishments, servers associated with gaming regulators, third-party servers, servers providing game downloads and peripheral software updates, security server, servers providing hotel hospitality, travel, weather and lodging information and outside access to servers via the Internet. As an example of a server in another gaming establishment, one of the internal servers can be configured to contact a remote TITO (Ticket-in/Ticket-out) server in another gaming establishment to validate a printed ticket remotely issued outside of the gaming establishment in which the server is located and forward the validation information to an EGM. As an example of a communication with a gaming regulator, one of the servers 508 can be configured to communicate with a gaming regulator to notify the regulator of a regulated change to a gaming machine, such as a change in regulated gaming software on one of the EGMs.

Gaming operators can allow third-parties affiliated with a gaming establishment to provide promotional opportunities and other services to players on the EGMs coupled to 506. The one of the servers 508 can be configured to communicate with an EGM to provide a third party promotional opportunity. As an example, via one of the servers 508 and the gaming network 506, a ticket can be printed at the gaming machine that allows a discount on a merchandise item or a service provided by the third party. In some embodiments, the tickets can be customized using a format selected by the third party and approved by the gaming operator.

The one or more servers 508 can be configured to allow a remote server to communicate highly regulated or less regulated gaming software to a gaming device. One difference between highly regulated and less regulated software can be the amount of testing and approval time required before the software is allowed to be used in a gaming environment. Highly regulated gaming software typically includes logic related to generating a wager-based game on the gaming machine, such as determining an outcome and an associated award. This software and any other software executed by a game controller on an EGM that provides this functionality is typically not changed once an EGM leaves the manufacturer and is deployed to the field.

An example of less regulated gaming software may include firmware used by a peripheral device, such as firmware used by a bill validator or printer to report information used for health monitoring, firmware used by a bill validator to detect fraudulent currency or firmware used by a printer to print customized tickets. If the bill validator accepts a bill or an instrument that is later determined to be counterfeit, then new software can be downloaded to the bill validator to detect other bills or instruments with similar characteristics so that additional counterfeit bills or instruments are not accepted. One of the servers 508 can be configured to transmit and receive verification information that allows a remote server to verify that authentic software has been installed on a gaming device, such as gaming machine.

Each gaming machine can be connected to a different combination of gaming system servers, such as but not limited to a player tracking server, a wide area progressive server, a link progressive server, and the TITO Server which can be included in the internal servers 508. For instance, a first gaming machine, such as 450*a*, can be connected to only the casino back-room server while a second gaming machine can be connected to the player tracking server and the TITO server. The one or more internal servers in conjunction with a secondary gaming device on the EGM, as described above, can be configured to allow different EGMs to receive different data streams depending on an external device configuration in the secondary device and the external device configuration in the EGM controller where the external device configuration in the secondary device can be different from the external device configuration in the EGM controller which communicates to external devices via the secondary gaming device.

In general, the gaming network 506 can include a plurality of EGMs each with a native or legacy external device configuration interface under control of an EGM game controller. The external device configuration interface specifies the hardware and software used by the EGM game controller for communications. All or a portion of the EGMs can communicate via a secondary gaming device, such as described above. The secondary gaming device can implement the EGM external device configuration for communications with the EGM. However, the secondary gaming device can implement a secondary external device configuration which differs from the EGM external device configuration. The EGM external device configuration and the secondary external device configuration can vary from EGM to EGM and secondary gaming device to secondary gaming device.

In particular embodiments, a current secondary external device configuration for an EGM, such as adding a new connection to a server or removing a current connection to a server can be implemented via operator communications with the secondary gaming device. Because the secondary gaming device can be configured to emulate EGM hardware and software communications including the native EGM external device configuration, the connections in the secondary external device configuration may be modified without modifying the EGM software. For example, via the secondary external device configuration and software executed on a secondary gaming device coupled to the EGM, an EGM originally not configured to provide progressive jackpot capabilities can be modified to communicate with a wide area progressive server or a link progressive server without modifying the EGM software. As another example, an EGM originally configured to communicate to a first wide area progressive server in a first communication protocol can be configured to communicate with a second wide area progressive server in a second communication protocol without modifying the EGM software.

One or more devices in network 506 can be configured to provide the multiplexing of the data streams from the gaming system servers and then encrypt the resultant data stream before transmitting. The data streams can be encrypted to prevent tampering and misuse of any data sent in the data streams. The wireless gaming network 506 may use one or more common wireless technologies such as Zigbee, 802.11a/b/g/n, and 3G/4G. Also, optical transmission technologies, such as IR and laser, can be utilized alone or in combination with other transmission technologies. In other embodiments, power-line transmission technologies or other wired communication technologies can also be utilized alone or in combination with one or more different wireless technologies as part of a gaming network.

Existing gaming systems typically may use some form of a protocol stack. There are standard gaming protocols, such as S2S, G2S developed by the Gaming Standards Association (GSA) and SAS developed by IGT as well as many other proprietary protocols used in the gaming industry. The protocols are used by gaming systems, such as a player tracking system or a TITO system, to communicate data between the gaming machine and servers across a network. The gaming systems may also use encryption to protect data in transit. All of the gaming system's protocols and encryption techniques must be tested and approved by a gaming test lab and/or gaming control board to operate in their jurisdictions. In order to maintain integrity and security it is important not to tamper with or change the data streams of these gaming systems. The gaming system can be configured to provide a non-intrusive technique to transmit and receive the data provided by the various systems, i.e., without a modification to an existing protocol that would require additional testing and approval.

In yet another embodiment, one or more of the internal servers 508 can be configured to communicate with gaming tables, such as 512, or the EGMs, such as 450*a* and 450*b* and other devices, such as gaming kiosks, signage and machines for redeeming cashless tickets for cash. The gaming tables can include an embodiment of one of the secondary gaming devices described herein (e.g., see FIGS. 4 and 5). The one or more servers 508 can be used to provide some of the real time changes to the entertainment, informational and promotional opportunities available on a gaming machine, such as 450*a* or 450*b*, or on one of the gaming tables 512. For instance, promotional tickets can be printed at gaming tables and gaming machines in a dynamic manner using one or more of the internal servers 508. As another example, tournaments or other group games can be provided using one or more of the internal servers 508. In yet another example, promotional activities can involve a combination of game play at a gaming table and an EGM. For example, a promotion and/or bonus can be triggered at an EGM based upon previous game play on other EGMs and/or gaming tables. Further, a promotion and/or bonus can be triggered at a gaming table based upon previous game play at other gaming tables and/or EGMs.

Figure 11:
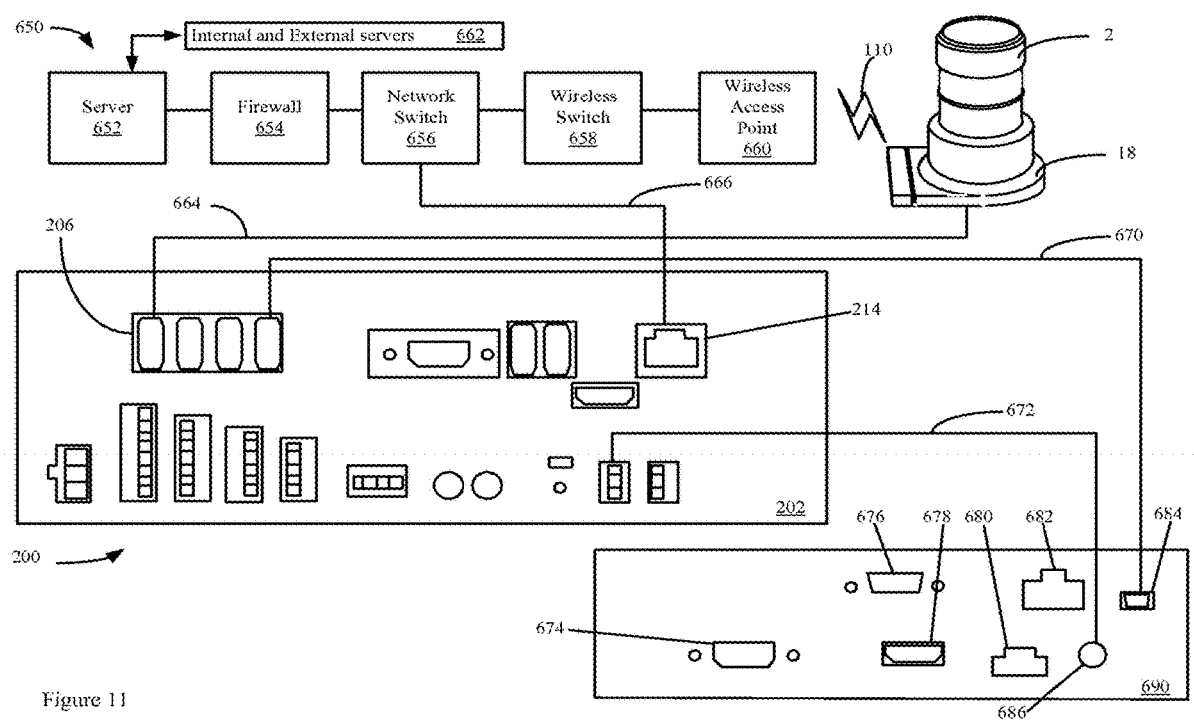
FIG. 11 is a diagram of gaming system configured to provide picture in a picture gaming services on electronic gaming machines in accordance with the described embodiments.

FIG. 11 is a diagram of gaming system configured to provide picture in a picture (PIP) gaming services on EGMs. In FIG. 11, the secondary gaming device 200 is shown connected to a network switch 656 via a wired communication connection 666 from port 214. In addition, via one of the USB ports 206, the radio candle mount 18 can be used to establish wireless communications 110 between the secondary gaming device 200 and a remote server, such as 602. The wireless communications 110 are received via wireless access point 660. In a casino environment, numerous wireless access points can be provided.

The wireless access point 600 is coupled to a wireless switch 658, which is coupled to the network switch 656. Communications from the network switch 656 pass through a firewall 654 to server 652. In one embodiment, server 652 can be used to monitor information from different gaming devices, which reside on numerous different EGMs. Further, the server 652 can be configured to send commands to and provide various services to a plurality of different secondary gaming device. In one embodiment, access to various internal external servers 662 can be provided via server 652.

In a retrofit situation where an EGM is retrofit with a secondary gaming device, the EGM controller can execute software which specifies communications with a first set of servers. EGM software can specify what information is transmitted to each server, what communication channel is to be utilized, what communication protocol is to be utilized and what information can be received. The secondary gaming devices, such as 200, can act as an intermediary device which is configured to receive the communications in the manner proscribed by the EGM hardware and software and respond to the communications as expected by the EGM controller. Thus, the secondary gaming device 200 emulates the external communications and functions expected by the EGM controller on the EGM, i.e., the EGM external device configuration is emulated. The external communications that are emulated can vary from EGM to EGM.

The secondary gaming device 200 can receive communications from an external gaming device and the EGM and modify it in different ways. For example, an upgraded player tracking system may use a communication protocol between an external device and the secondary gaming device which is different than an older communication protocol that the EGM controller utilizes. The secondary gaming device can be configured to convert communications from the EGM controller to be compatible with the new communication protocol and convert communications from an external device to the EGM in the new communication to the communication protocol which the EGM accepts.

The external device configuration of the EGM controller emulated on the secondary gaming device 200 allows the actual external device configuration to be different than the configuration for which the EGM hardware and software is configured. For example, the EGM can include two hardware communication connections and software for communicating in two different protocols with two separate servers. The portion of the secondary gaming device facing the EGM can be configured to communicate with the EGM via the hardware interfaces and software protocols native to the EGM and the EGM controller. However, on the portion of the secondary gaming device facing the external devices. The actual external device configuration may be different than the native EGM configuration. For example, rather than communicating with two separate servers, the secondary gaming device may communicate with a single server using communication protocols different than what the EGM is configured to use.

Ad described above, the secondary gaming device 200 can be used to support picture in picture (PIP) functions on an EGM. In one embodiment, the secondary gaming device 200 can be coupled to another secondary gaming device 690, which supports some of the PIP functions. For example, device 690 can be used to support receiving and modifying EGM controller generated audio, video and touch screen data under control of the secondary gaming device, alone or in combination with a remote server. For example, device 690 can be used to shrink a size of the EGM video data and output it with video data received from the secondary gaming device, such as in the PIP mode described in FIG. 7.

Further, device 690 can be used to route touches detected from a touch screen on the EGM to the secondary gaming device 200. The touches may correspond to touch screen buttons output in the video data received from the secondary gaming device. In addition, the device 690 can be configured to interpolate touch screen data associated with the EGM video data when the data has been shrunk to a native resolution expected by the EGM controller.

The EGM controller can be configured to respond to or ignore touches from different locations on a touch screen. When the EGM controller video data is scaled, such as shrunk in size, the touch locations which are active change positions on the display. Thus, the interpolation can involve translating touch locations associated with video data with a first resolution to touch locations associated with video data with a second resolution, such as the native resolution of the video data generated by the EGM controller.

In FIG. 11, device 690 is configured to receive power from device 200 via connection 672 to power port 686. The device 200 can be configured to send video data to device 690 via one of the USB ports 206. In this example, connection 670 is used to transfer video data from a USB port to a mini-USB port 684. In an alternate embodiment, port 678, which is an HDMI compatible port, can be used to receive video and/or audio data from device 200.

Ports 676 and 682 can be used to send touch screen data to an EGM controller. Port 676 supports an RS-232C serial format. Ports 682 supports a communication format associated with some IGT machines. Additional ports (not shown) are used to receive touch screen data from a touch screen display in the formats associated with ports 676 and 682. Other touch screen formats are possible. Thus, these examples are provided for the purposes of illustration only.

Port 674 can be used to receive video data generated under control of an EGM controller and sent to a touch screen display. An additional port (not shown) is used to output video data from device 690 to the touch screen display. The video data from device 690 can include only the video content received from the EGM, only the video content received from the device 200 or a combination of the video content received from the EGM and the device 200. For example, the video data from device 200 and the EGM can be combined in a PIP format as described above. In one embodiment, in a retrofit, the video and touch screen data modifications as well as any functions performed by device 200 can be performed without modifying the gaming software existing on and executed by the EGM controller prior to the retrofit.

Dual Port Devices and Configurations

Figure 12:
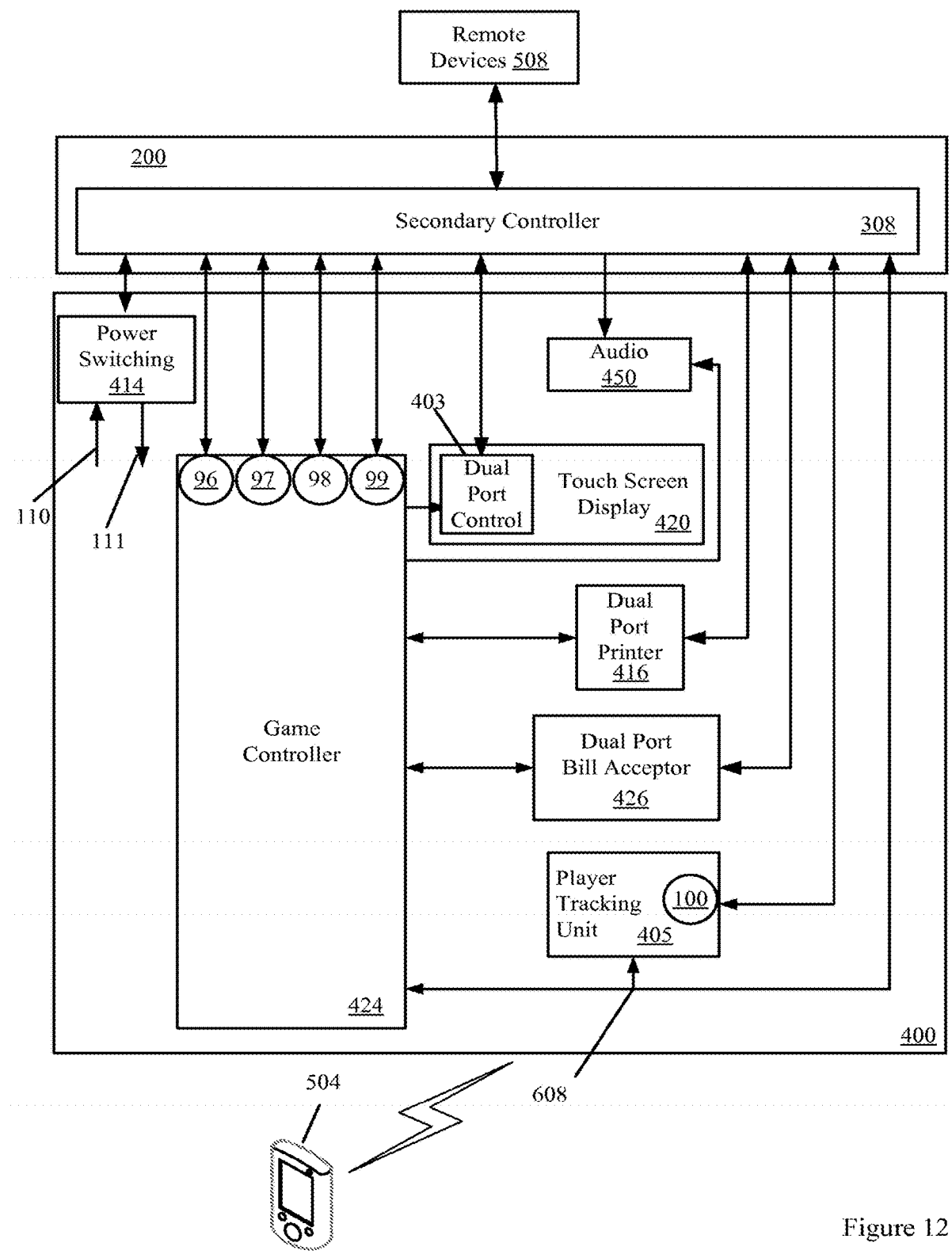
FIG. 12 is a block diagram of a gaming machine including dual port devices communicatively coupled to a secondary gaming device in accordance with the described embodiments.

FIG. 12 is a block diagram of a gaming machine 400 including dual port devices communicatively coupled to a secondary gaming device 200 in accordance with the described embodiments. The embodiment in the block diagram of FIG. 12 shows the optional elements of a dual-port bill acceptor 426, a dual-port printer 416, a touch screen display 420 with dual port control 403, a dual port audio system 418, and a monitoring connection 608 of the player tracking panel 405. Dual port capability can be used to provide a non-intrusive method of maintaining system integrity and provide additional gaming features. In some embodiments, one or more of the dual-port devices can be added to an EGM as part of a retrofit process.

In a dual port device, a first port can be used to provide the existing communication peripheral interface from the gaming machine to the dual port device. The game controller 424 and the peripheral device can communicate via the first port in a manner fixed by the use of regulated gaming software executed by the game controller and regulated software and/or firmware used by the peripheral device. The second port can be used to provide an enhanced interface with the controller 308. The second port on the dual port devices may be connected to the controller 308 via an appropriate interface, such as one of the interfaces associated with the wiring harness shown in FIG. 4 or the secondary gaming device 200 show in FIG. 5. In particular embodiments, the controller 308 can be configured to receive commands and/or data from remote devices 508 that are sent to the dual port devices via the second port. The controller 308 can also initiate and send commands and/or data to the dual port devices via the second port. Further, the controller 308 can be configured to receive data from the dual port devices.

The dual port touch screen display 420 can be configured to receive video content from each of the game controller 424 and the secondary gaming device 200. In one embodiment, the dual port control 403 on the display 420 can be configured to receive sizing, scaling and positioning commands that allow content received from multiple sources to be displayed in different portions of the display. The sizing, positioning and scaling commands can result in content sent to the display 420 to be output in a stretched or a compressed format relative to the native resolution in which content the content is generated The dual port control 403 can be configured to generate translation functions for the video input and for the touch screen output that interpolates the video input to fit within a designated display area and interpolates the touch screen output to account for positioning and scaling commands received from an external device. In alternate embodiments, the controller 308 can be configured to perform the translation functions.

The touch screen display 420 can be the main display the gaming machine 400 where video content associated with a wager-based game generated by the game controller 424 is displayed. The game controller 424 can be configured to output the video content in a native resolution, such as 640 by 480. The video content can include indications of locations where a touch detected by a touch screen can cause the game controller 424 to perform an action in response. For instance, in response to a detected touch, the game controller can change the video content output to the touch screen display 424. In one embodiment, described in more detail below, the video content is associated with providing a lottery game.

In one embodiment, the touch screen display 420 can be a replacement display such that it replaces the display installed in the gaming machine during manufacture. When used as replacement display, the touch screen display 420 can have a resolution that is greater than the native resolution in which the video content output by the game controller 424 is generated. For instance, the touch screen display 424 can have resolution of 1280 by 960 while the native resolution of the content output by the game controller 424 is 640 by 480. When a display technology with a fixed pixel size, such as an LCD, is used as the replacement display, interpolation and/or smoothing can be utilized to scale the content output from the gaming controller 424 to fit the resolution size of the display.

As described above, the dual port controller 403 can be configured to receive sizing, positioning and scaling related commands. In one embodiment, only the controller 308 is configured to generate these sizing, positioning and scaling related commands and not the game controller 424. For instance, the controller 308 can be configured to select picture in a picture modes that allows the video content output from game controller 308 to be displayed on different portions of the touch screen display 420 at different resolutions where the native resolution output by the game controller 424 and sent to the touch screen display 420 is constant.

The sizing, scaling and positioning commands can be associated with picture-in-picture (PIP) capability of the display 420. Using the PIP capability, video content can be transmitted from the candle and displayed as a PIP mode on the display 420. In one embodiment, the video can be transmitted via a USB interface. Via the secondary gaming device 200, the PIP capability can be used to output real-time or stored video for the player.

In one embodiment, the secondary gaming device 200 can control the PIP independently from the game controller 424. Thus, the game controller 424 is not aware that the video content that it is outputting is affected by PIP commands issued by the secondary gaming device 200 or that the secondary gaming device 200 is sending control commands to the display 420. In contrast, controller 308 may be aware of a state of the EGM 400 via information generated from the game controller 424. The state information associated with the EGM 400 may affect operation of the controller 308. For example, the controller 308 may control output of certain types of video content at certain times based upon the current status of the EGM 400.

In another embodiment, the game controller 424 can transfer or allow control of the display by the secondary gaming device 200. As an example, the game controller 424 can be configured to hand over control to the secondary gaming device 200 to allow it to display a bonus game presentation on all or a portion of the touch screen display 420. Thus, game controller 424 can engage in bi-directional communications with the secondary gaming device 200 to indicate when the display is available and the secondary gaming device 200 can communicate when it is finished using the display. When the secondary gaming device 200 indicates it has completed displaying the bonus game presentation, the game controller can reassume control of the display. When the game controller 424 controls the display, it may prevent the controller 308 from outputting content to the display 420. Further details of the control of the dual port touch screen display 420 coupled to a game controller 424 and a controller 308 are described below with respect to FIGS. 13A and 13B.

Communication links, which can be wired or wireless, are shown between communication interfaces TITO (Ticket-In/Ticket-Out) 97, link progressive 98, WAP 99, and player tracking 100 and associated communication interfaces on the controller 308. In this example, the communication interfaces are associated with the controller 308. In general, a gaming machine deployed in the field can be configured to interface with one or more external systems where the number of systems varies from gaming machine to gaming machine. For instance, a first gaming machine can be configured to interface with a wide area progressive system, a player tracking system and a cashless system while a second gaming machine can be configured to communicate with only a cashless system. The secondary gaming device 200 can include multiple ports to provide communication support for gaming machines configured to communicate with different numbers of external systems.

The controller 308 can be configured to provide the multiplexing of the data streams received from the gaming machine 400. The resultant data stream can then be encrypted and sent to one or more remote devices 508. Further, the secondary gaming device 200 can be configured to receive communications from one or more remote devices where a portion of the communications is in an encrypted format and decrypt the encrypted portions of the communications. The decrypted data can be sent to the respective communication interfaces of the gaming machine 400, such as 97, 98, 99 and 100.

Power switching 414 can receive power via interface 110 and output power via interface 111. One or more of the game controller 420, the audio device 418, the display 420, the dual port printer 416, the dual port bill acceptor 426 and the player tracking panel 405 can be connected to the power switching 414. The power switching 414 can be controlled in response to commands received from the controller 308 to interrupt power to the one or more devices connected to the power switching 414 as part of a power cycling event. In one embodiment, the controller 308 can configured to cycle all of the devices on a gaming machine including or except for itself. A power cycling event may be initiated to clear an error condition on one of the devices. In one embodiment, the controller 308 can be configured to initiate the power cycling in response to a command received from one of the remote devices 508.

The dual-port bill acceptor 426 can be configured to read tickets (TITO) and paper currency and communicate this information on the first port, which is controlled by the regulated game program. JCM Global (Las Vegas, Nev.) is one example of a manufacturer that provides dual-port bill acceptors. In another embodiment, the dual-port bill acceptor 426 can be configured to read lottery tickets, such as lottery tickets associated with a state lottery. The dual-port bill acceptor 426 can also be configured to read special promotional tickets and communicate this information on the second port to the secondary gaming device 200. In addition, the dual-port bill acceptor 426 can provide cash and operational information to the casino operator on the second port to the secondary gaming device 200. The controller 308 can be configured to send this information received from the bill acceptor to a remote device.

In one embodiment, the dual-port bill acceptor can be configured to perform electronic transactions involving a mobile device, such as 504. The electronic transactions can involve a mobile wallet application where the information received from the mobile device is used to initiate a transfer of funds to the gaming machine 500 from one of the remote devices 508. The controller 308 can be configured to provide communication services that allow the mobile wallet transaction to be processed. Further, the controller 308 can be configured to generate an interface on display 420 that allows data associated with the transaction to be input, output and verified.

The dual-port printer 416 can be configured to print tickets (TITO) provided by data on a first port, which is controlled by the regulated game program, or special promotional tickets provided by data on a second port. The promotional tickets can be customized and regularly updated. In one embodiment, the tickets can be personalized based upon an identification of a player at the gaming machine. In addition, the dual-port printer can be configured to provide operational information to the casino operator on a second port. FutureLogic (Glendale, Calif.) is one example of a manufacturer of dual port printers.

The audio channel on the dual port audio system 450 can be used to provide the ability to use the existing game machine audio speakers 418 to provide voice and audio for the player that is not part of the game program. Further, the second port can be used to provide audio that is part of a bonus game presentation that is generated by the secondary gaming device 200. The player tracking monitoring port can be used to provide non-intrusive monitoring of the player tracking data to provide player ID information for the casino operator. In one embodiment, this data can be utilized by the secondary gaming device 200 to provide custom content to a player. For instance, the player ID data can be used to target a personalized promotional opportunity selected based upon known information about the player. The personalized promotional opportunity can include a custom ticket that is printed by the printer. The customized ticket can include custom graphics and player identification information, such as the player's name.

In particular embodiments, when a dual port device, such as the bill acceptor 426 includes regulated software, such as regulated firmware, the regulated software can be decoupled from other software on the peripheral device. The regulated portion of the software may govern interactions between the peripheral device and the game controller 424. Changing the regulated portion of the peripheral software typically requires a lengthy approval process.

The non-regulated portion may involve interactions that do not involve the game controller 424 and thus, a gaming control board may allow this portion of the software to be updated without regulatory approval or under a much less stringent approval process. In various embodiments, the unregulated or less regulated portion of the peripheral software can be updated via the controller 308. For instance, if a new fraud detection algorithm is needed, such as to detect a new type of counterfeit currency, then the new detection algorithm can be downloaded to the bill acceptor via the second port of the dual port bill acceptor. If necessary, the power on the dual port bill acceptor can be cycled to allow the bill acceptor to restart using the new software or firmware. In another embodiment, new software or firmware can be downloaded to allow the bill validator to recognize and arbitrate the acceptance of lottery tickets as is described in more detail below.

Next, methods and apparatus for generating the display interfaces on a gaming machine are described with respect to FIGS. 13A and 13B. In a particular embodiment, a dual port touch screen display device described above with respect to FIG. 12 can be coupled to a game controller and a controller 308 allowing the display to receive and to display simultaneously content from both the game controller and the controller 308. To provide a display interface, the controller 308 can be configured to respond to touch screen data associated with selectable buttons (active areas) in the content output by the controller 308 to the display as is described in more details as follows.

FIG. 13A is block diagram of a gaming machine 400 including a dual port touch screen display 420 communicatively coupled to a secondary gaming device 200. The dual port touch screen display 420 can include a number of display modes that allow video content from the game controller 424 and the controller 308 to be simultaneously output from the display 420. Some examples of display modes are illustrated in FIG. 7B. In a particular embodiment, the touch screen display 420 can include at least two video inputs, 52 and 54, for receiving video data. In one embodiment, the game controller 424 can be configured to send video content to the touch screen display 420 via the video input interface 52 and the controller 308 can be configured to send video output to the touch screen display 420 via the video input interface 54.

In one example, the touch screen display 420 can be EST model manufactured by Digitech Systems co. LTD (Korea). Examples of screen sizes include fifteen, seventeen, nineteen and twenty three inch models. The controller 60 can also be provided by Digitech Systems (e.g., a DTC-01N or the DTC-02S-02). The controller 60 can support a proprietary serial communication protocol, such as Netplex or an open protocol, such as USB.

In particular embodiments, the first video input interface 52 can be a VGA or DVI compatible interface. As examples, resolution from about 640×480 up to 1920×1080 can supported. The 1920×1080 can support an HD signal. The aspect ratios of the input from the game controller can be one of 4:3, 16:9, 16:10 and 5:4. The second input interface 54 can also be a VGA or DVI compatible interface. For instance, the controller 308 can provide a DVI signal at 1280×1024 resolution.

The touch screen display 420 has a native resolution, such as U by V pixels. For instance, the resolution of the touch screen display 420 can be about 1280 by 960 pixels where U=1280 and V=960. The touch screen display 420 can include a controller 60 that is configured to receive commands that allocate a portion of the display 420 to video content provided from the game controller 424 and video content provided by the controller 308. In FIG. 13A, the portion of the display 420 allocated to content from the game controller 424 is referred to the game portion 76 and the portion of the display 420 allocated to content from the controller 308 is referred to as the PIP (picture in a picture) portion 78.

The content output to the display by the game controller 424 or the controller 308 can include active areas where a touch input detected by the touch screen can result in response by the game controller 424 or the controller 308. The game controller 424 can be configured to receive touchscreen output 70a from a controller 60 associated with the display 420. Based upon the touchscreen output 70a received from controller 60, the game controller 424 can determine whether any active areas of the touch screen have been selected. The controller 308 can also be configured to receive touch screen output 70b from the controller 60. Based upon the touch screen output 70b, the controller 308 can determine whether any active areas of the touch screen have been selected.

In one embodiment, the video input, touch screen output and control commands 68 can be communicated via separate interfaces. For instance, video content from the controller 31 can be sent to the display 420 via a first interface, such as 54, control commands 68 can be sent to the display 420 via a second interface and touch screen output can sent to the controller 31 via a third interface. In other embodiment, a common interface can be used to communicate video content, control commands and touch screen output between a particular device, such as the game controller 424 and the controller 308, and the display 420. For instance, a first USB interface can be used to communicate video content, control commands 68 and touch screen output 70b between the controller 31 and the display 420.

In particular embodiments, the display 420 can utilize a display technology, such as a LCD technology, where a pixel size associated with the display is fixed. The native resolution of a LCD, LCoS or other flat panel display refers to its single fixed resolution. As an LCD display consists of a fixed raster, it cannot change resolution to match the signal being displayed as a CRT monitor can. Thus, optimal display quality can be reached only when the signal input matches the native resolution of the display 420. An image where the number of pixels is the same as in the image source and where the pixels are perfectly aligned to the pixels in the source is said to be pixel perfect. For instance, a 640×480 image mapped to a 640×480 portion of an LCD can be considered pixel perfect.

When the signal input doesn't match the native resolution of the display interpolation is used. Interpolation (scaling of the image) causes a loss of image quality. When the resolution of the video content received by the display 420 is smaller than the native resolution of the display it can be scaled up. When the resolution of the video content received by the display is larger than the native resolution of the display it can be scaled down. In one embodiment, the interpolation can be performed by the video scaling 56 in the controller 60. In another embodiment, the controller 308 can be configured to receive video content from the game controller 424, scale it to fit a resolution on the display to which it is to be output and then send the scaled video content to the display 420.

The display 420 can include a controller 60 configured to receive control commands that affect a size and a position of the game portion 76 and the PIP portion 78. In a particular embodiment, only the controller 308 and not the game controller 424 is configured to generate and send control commands 68 to the controller 60 that affect the size and the position of the game portion 76 and the PIP portion 78. In one embodiment, the display 420 can be configured to only receive control commands from one device. In the controller 308, the display control 62 can be configured to determine the size and the position of the game portion 76 and the size and the position of the PIP portion 78. Unless a size selected for the game portion 76 is pixel perfect, the size of the game portion 76 selected by the controller 308 can affect how the video content from the game controller 424 is interpolated onto the display 420 and hence, a quality of the subsequent image that is displayed.

The image quality that is displayed after interpolation on the display 420 can be affected by the resolution of the video content generated by the game controller 424 and the size of the game portion 76 selected by the controller 308 where some sizes selected for the game portion 76 can produce better interpolation results and hence, a higher output image quality than other sizes. In particular embodiments, the controller 308 can be configured to determine the resolution of the video content output from the game controller 424 and select a size for the game portion 76 to produce better interpolation results.

In various embodiments, the controller 308 can determine the resolution of the video content output from the game controller 424 in a number of different manners. For instance, it can retrieve the information from a memory location on the controller 308 where it was previously stored, it can request the information directly from the game controller 424 or it can request the information from a remote server. The controller 308 may receive information from the game controller 424 and/or a remote server, such as information that identifies the model of the gaming machine 1, which allows the candle to determine the resolution of the video content generated by the game controller 424. Based upon the determined resolution of the content output by the game controller 424, the controller 308 can determine parameters for scaling up and/or down the content on the display 420.

The touch screen display 420 can be configured to generate different a number of different display modes that affect a size of the game portion 76 and the PIP portion 78. As described above, in one embodiment, only the controller 308 can be configured to provide commands that select a display mode to utilize on the display 420. As examples, the display 420 can be configured to provide all or a portion of the display modes 80a-80m illustrated in FIG. 7B where the controller 308 determines which of these display modes to use at a particular time. These display modes are described as follows.

In display mode 80a, all of the display 420 is allocated to the game portion 76 whereas in display mode 80m, all of the display 420 can be allocated to the PIP portion 78. In display mode 80b, a top portion of the display 420 is allocated to the game portion 76 and a bottom horizontal strip is dedicated to the PIP portion 78. In 80c, a top horizontal strip is allocated to the PIP portion 78 and a bottom portion is allocated to the game portion 78. In 80d, a top and a bottom horizontal strip are allocated to the PIP portion 78 and a center portion is allocated to the game portion 76. In 80h a left vertical strip is allocated to the PIP portion 78 and the remaining portion is the game portion 76. In 80i, a right vertical strip is allocated to PIP portion 78 and the remaining portion is the game portion 86. In 80j, left and right vertical strips are allocated to the PIP portion 78 and the center portion is allocated to the game portion 76.

The controller 308 can be configured to select a thickness for the left and/or right vertical strips or the top and/or bottom horizontal strips. In one embodiment, when two or more strips are selected, such as a top and a bottom horizontal strip, the controller 308 can select the strips to be of the same thickness (horizontal strip) or width (vertical strip). In another embodiment, the controller 308 can select the thickness/width of the strips to be different sizes.

In 80e, a top and a bottom horizontal strip and a left vertical strip are allocated to the PIP portion 78 and remaining portion is allocated to the game portion. In 80f, a top and a bottom strip and a right vertical strip are allocated to the PIP portion 78 and the remaining portion is allocated to the game portion. In 80k, a left and a right vertical strip and a top horizontal strip are allocated to the PIP portion 78 and a remaining portion is allocated to the game portion 76. In 80l, a left and right vertical strip and a bottom horizontal strip are allocated to the PIP portion 78 and a remaining portion is allocated to the game portion 76. In 80g, a top and bottom horizontal strip and a left and right vertical strip are allocated to the PIP portion 78 and a center portion is allocated to the gaming portion.

In 80m, the PIP portion 78 is rectangular and allocated the entire display such that none of the video content from the game controller 424 is visible on display 420. In alternate embodiments, a smaller rectangle can be used for the PIP portion 78 such that the game portion 76 is only partially obscured by the PIP portion 78. A disadvantage of this approach is that the PIP portion 78 needs to be positioned and placed such that it doesn't obscure any important information associated with the game portion 76 such as the outcome of a wager-based game displayed in the game portion 76. Thus, using this type of picture in a picture mode, the controller 308 may need to determine at any given time the content that is displayed in the game portion 76 to avoid obscuring it with an overlapping PIP portion 78.

In one embodiment, the controller 308 can be configured to utilize only display modes that never overlap and obscure the game portion 76. For instance, the controller 308 can be configured to utilize display modes 80a-80l in FIG. 13B where the game portion 76 is rectangles of different sizes. The video content associated with the game portion 76 can be scaled to fit the different size rectangles but is never partially covered by the PIP portion 78. Further, the controller 308 can select the scaling parameters such that the content displayed in the game portion 76 is an acceptable quality after scaling to allow information associated with the content, such as a game outcome, to be adequately displayed to a player. An advantage of this approach is that the controller 308 doesn't have to determine the current content of the game portion 76 when selecting a display mode that allows video content associated with the PIP portion 78 to be displayed, such as display modes 80b-80l.

As described above, the touch screen display 420 can be a retrofit display that replaces the original display that was installed during manufacture of the gaming machine where the touch screen display 420 can have a different resolution than the resolution of the video content generated by the game controller 424. For example, the resolution of the video content can be 640×480 while the resolution of the replacement display can be 1280×960. In a particular embodiment, the resolution of the replacement display can be larger than the resolution of the video content and the controller 308 can be configured to select a display mode where the resolution of the game portion 76 for the display is always greater than or equal to the resolution of the video content generated by the game controller 424. Thus, the content is displayed pixel perfect or in a scaled up format. For instance, if the resolution of the video content generated by the game controller is 640×480 then the minimum U dimension selected by the controller 308 is greater than or equal to 640 and the minimum V dimension selected by the controller 308 is greater than or equal to 480. In one embodiment, the controller 308 can be configured to only select a picture perfect (no scaling) for the content from the game controller 424.

When the U an V dimensions are selected as described in the previous paragraph, the video content generated by the game controller 31 can be stretched (interpolated) in the U, V or both U and V directions when it is displayed in the game portion 76. However, the video content generated by the game controller 424 is never shrunk below the resolution output by the game controller 424 in the U and V directions. It may not be desirable to scale down the video content generated by the game controller 31 below the resolution in which it is output from the game controller 424 because shrinking causes data to be removed from the image and hence information to be lost.

Returning to FIG. 13A, the game controller 424 can include software 50 for generating the video content sent to the display 420. In one embodiment, the output resolution of the software 50 can be fixed such that video content with the same resolution is sent independent of the size of the game portion 76 selected by the controller 308. The video content which is sent from the controller 308 to the display 420 can be generated by the video software 64. In particular embodiments, the controller 308 can be configured to generate video content with different resolutions depending on a size and a format of the PIP portion 78 selected by the controller 308. For instance, the controller 308 can be configured to select a size of the PIP portion 78 and then generate content that is pixel perfect with the size of the PIP portion 78.

In one embodiment, the controller 308 can be configured with a maximum resolution for the content output. For instance, the maximum dimension of a strip can be 120×1024. The controller 308 can select a strip with smaller dimensions, 60×1024. However, the controller 308 will not select a strip with larger dimensions, such as 150×1024. When the smaller dimensions are selected, the content sent to the display 420 will be the maximum resolution, such as 120×1024. After receiving the content, controller 60 can be configured to scale down the content to a smaller resolution, such as 60×1024.

In one embodiment, the secondary gaming device 200 can receive video signals 72 including audio from a remote device. For instance, the video signals can be associated with a live sports event or live broadcast television. In addition, the video signals can be associated with pre-recorded content, such as previously aired television shows, theater movies, music videos or Internet content (e.g., YouTube videos). The video software 64 can be configured to integrate video signals from one or more video feeds into the video content output in the PIP portion 78.

Sounds can be associated with the video content output from the controller 308. For instance, a video feed for a live sporting event displayed in the PIP portion 78 can include commentary associated with the sporting event. The sound control 65 associated with the controller 308 can be configured to output the sounds associated with the video content. In one embodiment, the sounds can be output via an audio device associated with a gaming machine, such as a dual port audio device (e.g., see FIG. 12). In yet another embodiment, the secondary gaming device 200 can be configured to output the sounds via a device carried by a player such as a Bluetooth™ headset or via headphones coupled by wire to an audio output jack on their cell phone. In one embodiment, the controller 308 can generate an interface in the PIP portion 78 that allows a player to choose a method for outputting sounds associated with the video content form the controller 308, change the volume of the sound and/or mute the sound.

As described above, the video content associated with the game controller 424 and the controller 308 can include a number of active areas where in response to touch screen input received in the active areas, the game controller 424 or the controller 308 can generate a response. The touch input associated with an active area is received when the touch screen is activated above a location where the active area is output on the display 420. To respond properly to a touch, the active areas displayed in the video content need to be mapped to corresponding locations on the touch screen, i.e., the receiving devices determines that a touch input received at a particular location and detected by the touch sensor corresponds to an active area displayed at the location on the display 420.

Typically, the game controller 424 will expect to receive touch screen output that corresponds to a game portion 76 filling the entire display screen (e.g., display mode 80a). The game controller 424 may not be aware of changes in size and position of the game portion on display 420 that can affect the locations where the touch sensor detects input for a particular active area that is output to the display 420. Thus, when the video content associated with the game portion 76 is output in window size and with a location different from a full screen mode, the touch screen output 70a sent to the game controller 424 may no longer match the locations of active areas expected by the game controller 424. To account for changes in position and size of the game portion, a transformation operation can be performed that interpolates the input received by the touch screen on display 420 for a particular size and position of the game portion to an input expected by the game controller 424. These transformation operations are discussed in more detail in the following paragraphs.

The controller 60 can be configured to scale the touch screen output 70a sent to the game controller 424. For instance, the controller 308 can be configured to provide a resolution of the video input 52 from the game controller 424 and a resolution of the game portion 76 to the controller 60 where the resolution of the game portion 76 can be different from the resolution of the video content from the game controller 424. Using this input, the controller 60 can be configured to interpolate the touch screen results to match the resolution of the video content of the game controller 424. As an example, the resolution of the game portion 76 can be 960×720 and the resolution of the video content from the game controller 424 can be 640×480 and the controller 60 can be configured to scale touch inputs received in the 960×720 game portion 76 to the 640×480 size. After scaling, the touch screen output 70a can be sent to the game controller 424 in the 640×480 size. As shown in FIG. 13B, the game portion 76 can be positioned at different locations on the display 420. The controller 60 can be configured to account for the position of the display portion 76 when performing the scaling. For instance, the game controller 424 can expect the touch screen input to start in the lower left hand corner of the display 420 and the controller 60 can be configured to scale the touch screen output so that it appears to start from this location. In alternate embodiments, the secondary gaming device can be configured to perform this scaling and then send the scaled results to the game controller 424.

In one embodiment, the secondary gaming device 200 can be configured to receive the touch screen output 70b for the entire display including the game portion 76 and the PIP portion 78 while the game controller 424 only receives the touch screen output 70 from the game portion 76 scaled to the resolution of the video content from the game controller 424. The controller 308 can be configured to determine if any of the touch screen input corresponds to active areas associated with video content generated and output to the display in the PIP portion 78. When controller 308 detects that a location on the touch screen sensor has been activated that corresponds to an active area in the video content generated by the controller 308, the controller 308 can perform an action in response. For instance, in response to detecting touch sensor data that corresponds to an active area, the controller 308 can generate new video content in the PIP portion 78 and/or rearrange the content in the PIP portion 78.

In particular embodiments, the secondary gaming device 2 can be configured to save and/or send touch input associated with the game portion 76 to a remote device. The touch input associated with the game portion 76 can be in the scaled or non-scaled format. The remote device can be configured to determine whether the touch screen input is associated with any active areas generated by the display when the touch screen data was received. To make this determination, the secondary gaming device 200 can also be configured to send information related to a state of the wager-based game generated by the game controller 424 to the remote device, such as whether the gaming machine is in an idle state, displaying an outcome to a game, between games or in a bonus state. Further, the secondary gaming device can be configured to send to the remote device information regarding details of the game output by the game controller, such as a particular version of a video slot game by a particular manufacturer. The state information can be used by the remote device to determine what content is associated with the touch input and whether any active areas have been selected.

In response to determining an active area has been selected in the game portion, the remote device can send commands to the candle that cause the controller 308 to alter the content output to the PIP portion 78. For instance, in response to detecting a see pays button being activated in the game portion 76, the remote device can be configured to send commands to the controller 308 to output additional video content in the PIP portion 78 for a supplementary bonus game generated by the controller 308. In another embodiment, when remote device determines a selection of a particular symbol in a bonus game generated by the game controller 31 has been selected, the remote device can send commands to alter the content displayed in the PIP portion 78. For instance, in response to detecting the selection, the remote device can command the controller 308 to output video content associated with a supplementary bonus game that can include an additional award being provided to the player that is separate from the award associated with the bonus game generated by the game controller 424.

In another example, the remote device can command the controller 308 to generate a bonus presentation that augments the bonus presentation provided by the game controller 424. The supplementary bonus game presentation generated by the controller 308 can include time relevant information. For instance, if the bonus game from the game controller is triggered during a super bowl weekend or Saint Patrick's Day, then the bonus game from the controller 308 can include a super bowl theme or a Saint Patrick's Day theme that complements the bonus game output by the game controller 424.

In alternate embodiments, the functions performed by the remote device can be performed by the controller 308. Thus, the controller 308 may not have to send the touch screen output associated with the game portion 76 to the remote device. For instance, the controller 308 can be configured to determine that a bonus game has been triggered, is displayed in the game portion 76 and that a particular symbol selection associated with the bonus game has been made. In response to the determination, the controller 308 can be configured to generate and output a supplementary bonus game presentation to the PIP portion 78.

In one embodiment, the touch screen display can support a multi-touch capability. For instance, the controller can be configured to detect and report two touch inputs on the touch screen moving towards one another or moving away from one another. The controller 308 can be configured to respond to the multi-touch output. For instance, in response to the detection of two touch inputs moving together, the controller 308 can be configured to reduce the size of or close the PIP portion 78 or close a menu in the PIP portion 78. Whereas, in response to the detection of two touch inputs moving away from one another, the controller 308 can be configured to open the PIP portion 78 or open/expand a menu in the PIP portion 78.

Lottery Gaming Services

Figure 26:
Figure 27A:
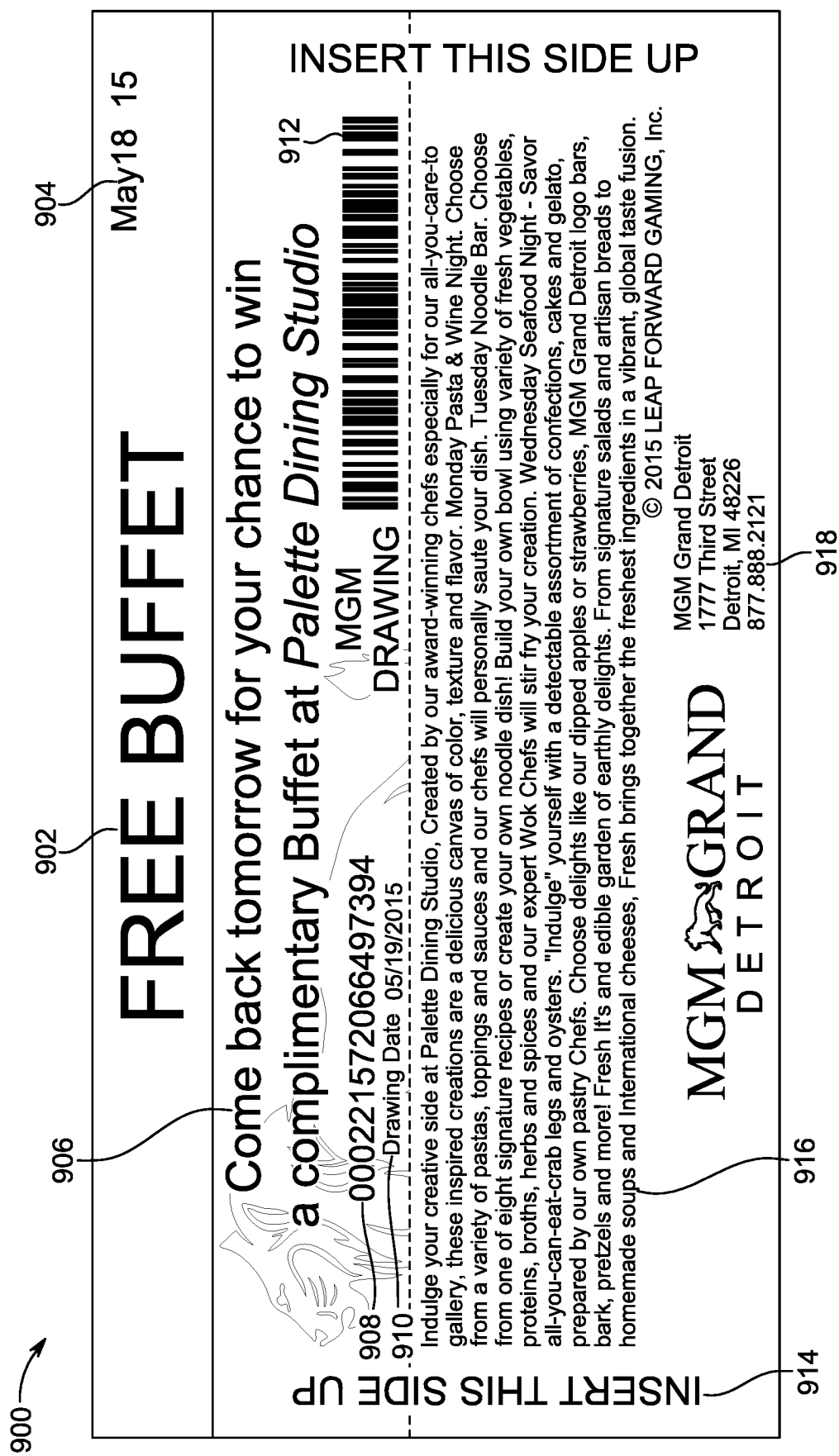
FIGS. 27A-27C are examples of secondary tickets in accordance with the described embodiments.
Figure 27B:
Figure 27C:
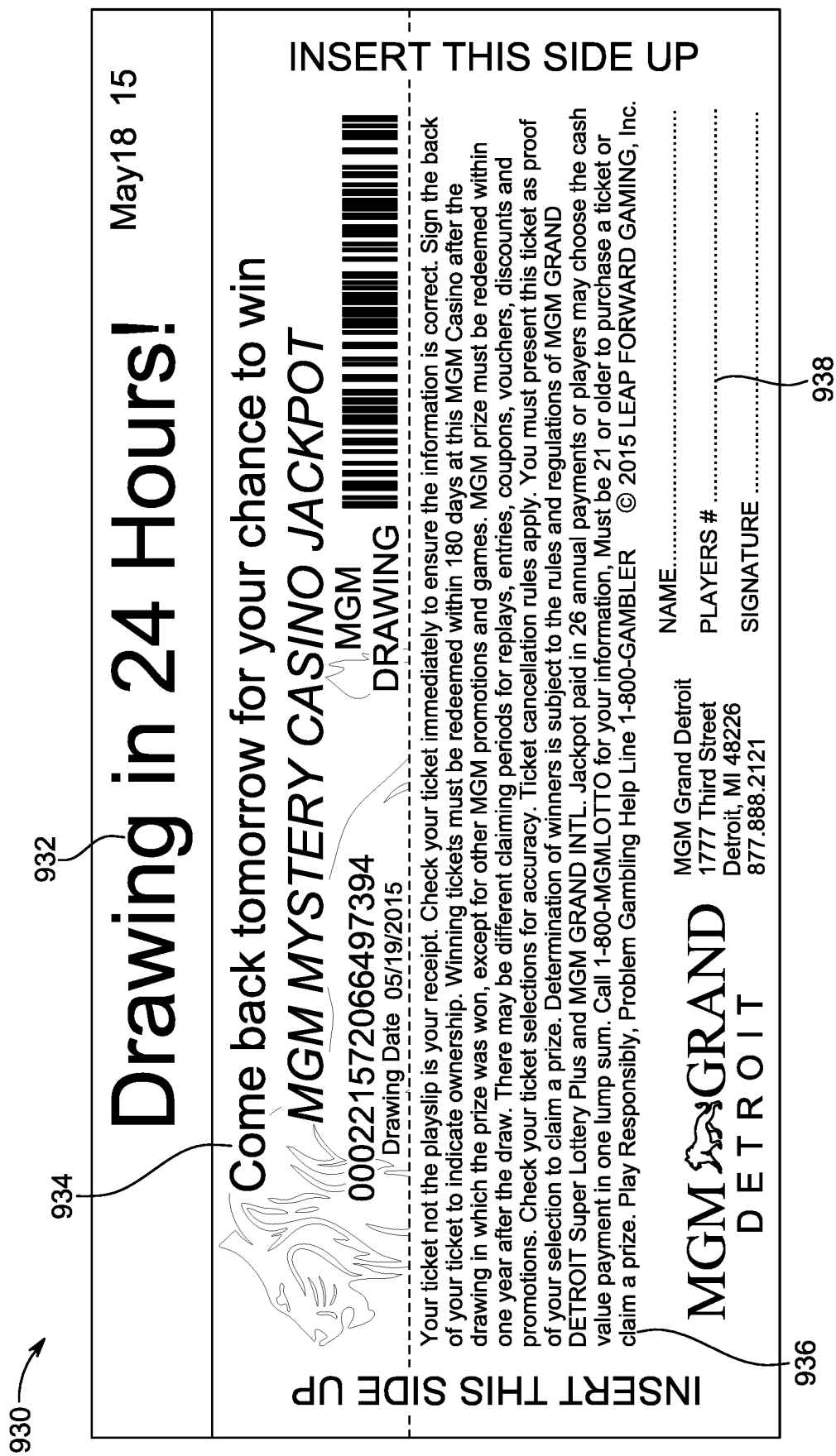

Next, lottery gaming services including retrofitting a deployed EGM to provide these capabilities are described with respect to FIGS. 14-27C. FIGS. 14-26 include screen shots from a display on a video gaming machine. FIGS. 27A-27C include examples of secondary tickets. The lottery gaming services can be deployed to different gaming devices, such as hand-held gaming devices, mobile phones, tablets, lottery terminals, bingo terminals, slot machines, electronic gaming tables, sports book terminals, keno terminals, cash machines, kiosks or any other type of device including a display. Thus, the example of implementing the methods and apparatus on an EGM where the primary game is output to a video display is for the purposes of illustration only and is not meant to be limiting.

Figure 14:
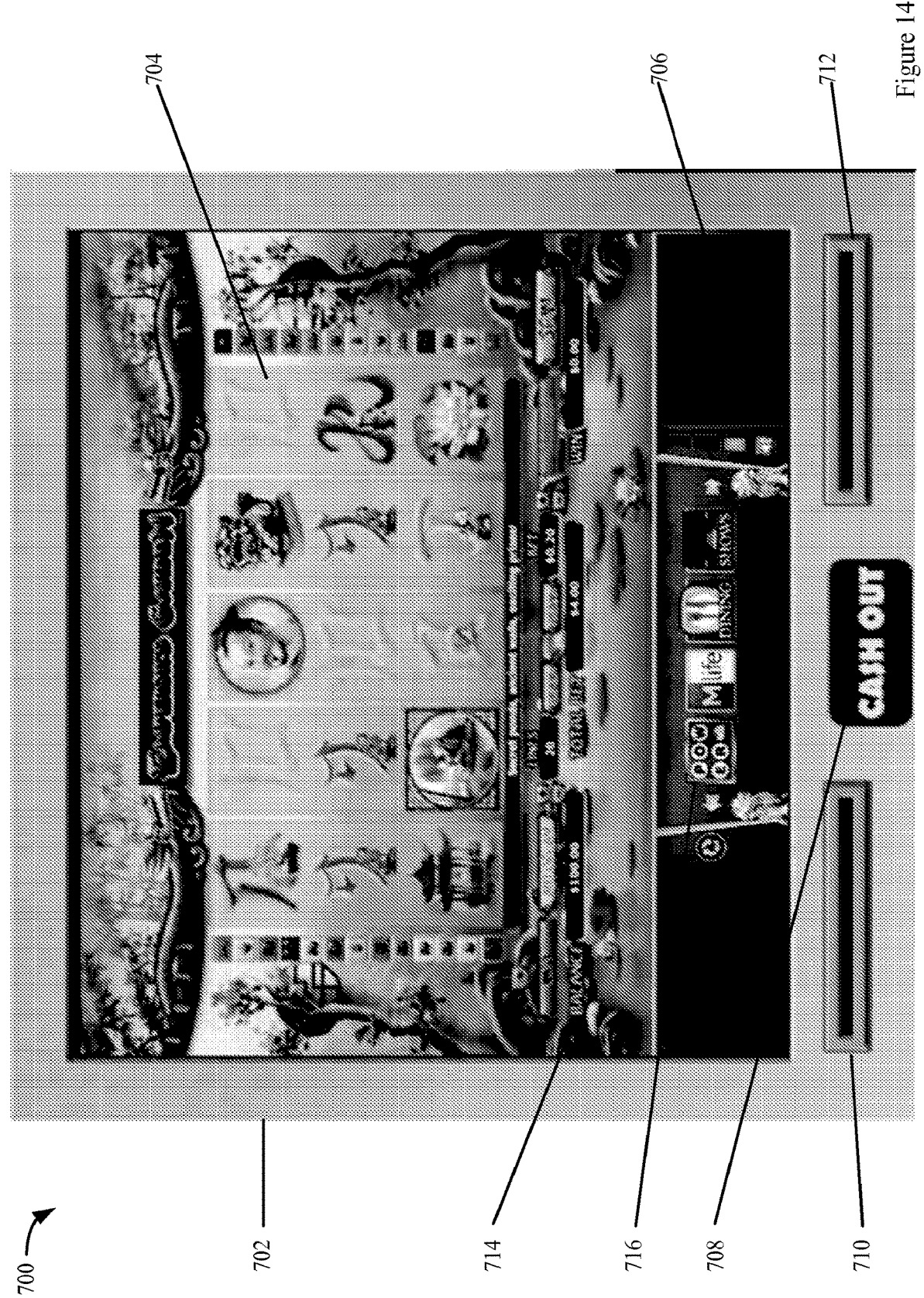
FIGS. 14-26 are screen shots including video content associated with lottery gaming services in accordance with the described embodiments.

FIG. 14 shows a portion of a player interface 700 including a touch screen display 702, a printer 710, a bill/ticket acceptor 712 and a mechanical cash out button 708. Additional details of the player interface are described above with respect to FIGS. 7 and 8. A wager-based game is output on a top portion 704 of the display 702. Selectable items associated with different activities are output on a lower portion 706 of the display 702. In one embodiment, a selectable item 716 associated with a lottery gaming services is output.

The balance 714 on the EGM is shown as one hundred dollars. The one hundred dollars may have resulted from play of a wager-based game and/or value transferred to the EGM. For example, a ticket associated with a value may have been inserted in the bill/ticket acceptor 712 and value associated with the ticket may have been deposited on the EGM.

Figure 15:
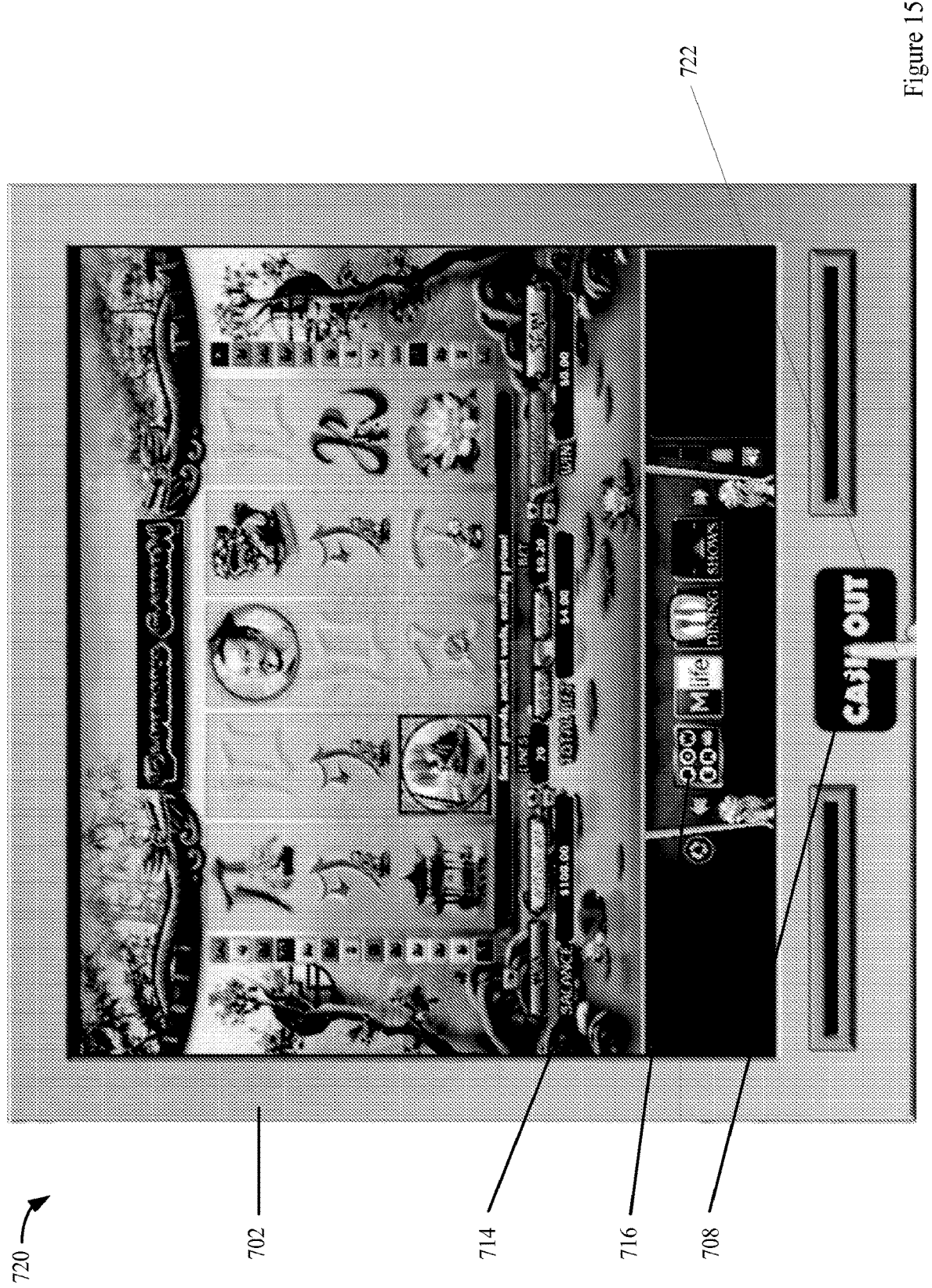
Figure 16:
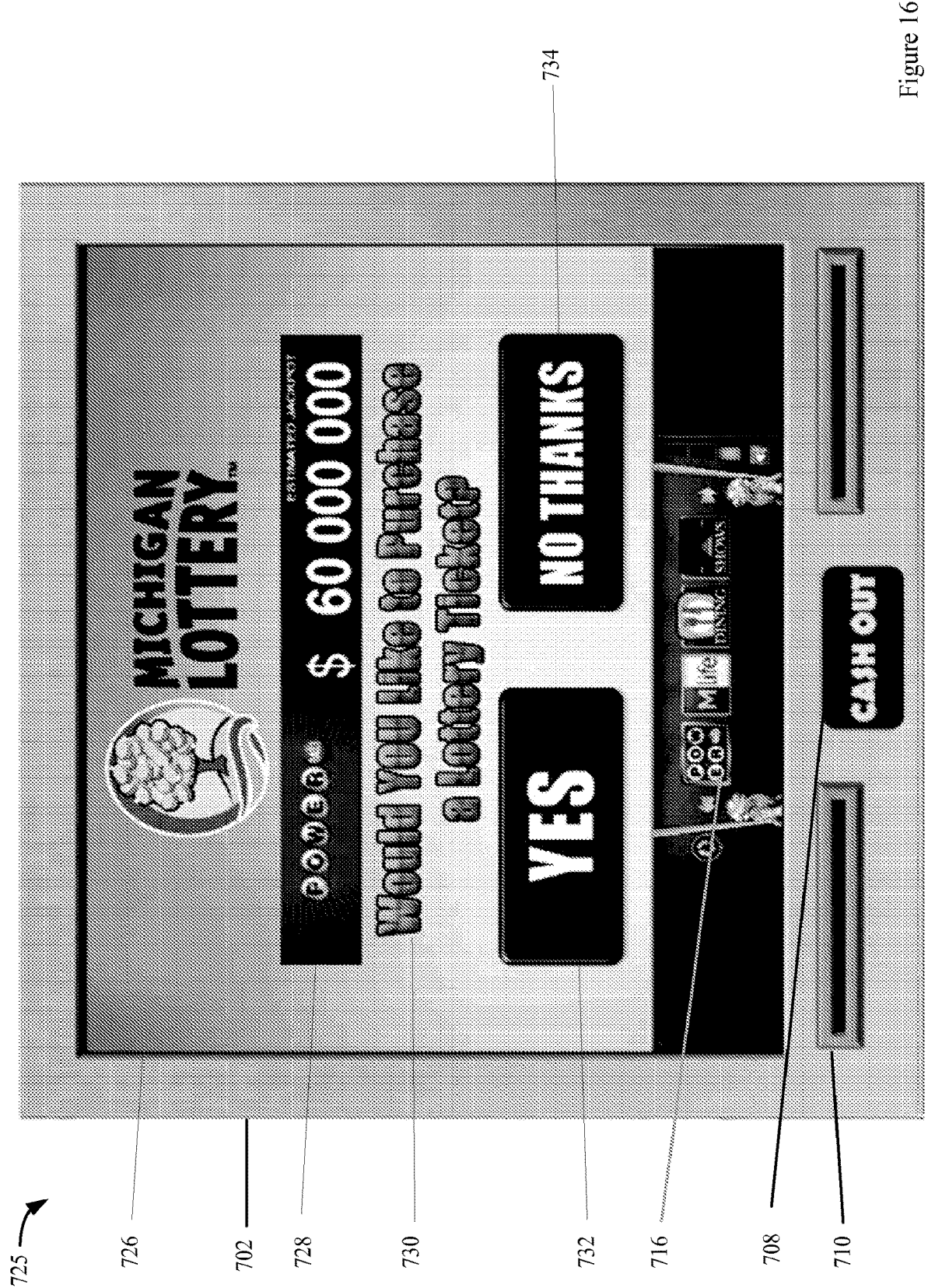
Figure 17:

In FIG. 15, a selection of the cash out button 708, indicated by finger 722, is shown. The cash out button is shown as a mechanical button. In another embodiment, the cash out button can also be implemented as a touch screen button on display 702. As shown in FIG. 16, the selection of the cash out button can cause a touch screen interface which allows a lottery ticket to be purchased to be output to the player interface 725.

In FIG. 16, in response to the selection of cash out button 708, the lottery interface 726 is output in the upper portion of the display 702 on the player interface 725. In this example, the lottery interface is output over the top of wager-based game which was previously shown. In other embodiments, the lottery interface 726 can be displayed on other portions of the display where all or a portion of the graphics associated with the wager-based game may be concurrently visible with the lottery interface 726.

The lottery interface 726 includes information about a state lottery and a jackpot associated with the lottery. Other types of lotteries are possible, such as a casino sponsored lottery, and the example of a state lottery is provided for the purposes of illustration only. The interface includes an offer to purchase a lottery ticket and selectable buttons 732 and 734, to indicate an acceptance of the offer or a rejection of the offer, respectively. In one embodiment, when the "no thanks" button 734 is selected the lottery interface 726 can be removed from the display 702 and the cash out process may continue. For example, a ticket redeemable for one hundred dollars can be output from the printer 710.

The lottery interface 726 can be generated in response to other events besides a selection of the cash out button. For example, in one embodiment, a selection of button 716 can cause the lottery interface to be generated or can cause a menu to be displayed which leads to an option that causes the lottery interface 726 to be displayed. In one embodiment, an offer to purchase a lottery ticket can be triggered from a game event, such as certain combination of symbols being output as part of a wager-based.

In another embodiment, lottery tickets can be offered as an award associated with the play of a wager-based game. For example, one or more lottery tickets can be dispensed when a bonus event occurs, which is associated with the play of a wager-based game, i.e., instead of free spins, free lottery tickets are offered. The player may have the option of selecting the numbers for the lottery tickets which are awarded or the numbers can be selected by the system without player input. In one embodiment, the system can store numbers which a player likes to select for lottery tickets. The system can be configured to retrieve and use these numbers when generating lottery tickets for a player.

In another embodiment, as part of an award, the player can be offered a certain amount of credits or a certain amount of lottery tickets. The conversion between the value of the lottery ticket and the value of the credits may not be one to one. For example, an offer can be made to print a ticket with a first cash value or take lottery tickets with a purchase value greater than the first cash value. For instance, an offer can be made to receive a ticket redeemable for one hundred dollars or a lottery tickets with a purchase value of one hundred and ten dollars for one hundred dollars.

Returning to FIG. 15, in one embodiment, a selection of the cash out button 708 only causes the lottery interface to be output when there are sufficient funds available on the EGM to purchase a minimum value lottery ticket. For example, when the minimum value of the lottery ticket which can be purchased is one dollar and cash out value is less than a dollar a selection of the cash out signal may not cause the lottery interface to be output.

In another embodiment, when the minimum value of the lottery ticket is greater than the current cash out value, the player can be offered a lottery ticket purchase with the caveat that additional funds need to be deposited on the gaming device before the lottery ticket can be issued. The capability to transfer additional credits to the EGM may also apply if the credits allow some fraction of a lottery ticket to be purchased. For example, if the credits on the EGM allow four and one half lottery tickets to be purchased, the lottery interface may allow a user to transfer additional funds to the EGM to purchase five lottery tickets.

In one embodiment, the capability to purchase lottery tickets may only be made available after funds are transferred to the EGM. In another embodiment, the system may allow a user to select a button, such as button 716. In response, an offer to purchase lottery tickets can be output to the display 702 for some time period. In response to the offer, the player can deposit credits on the EGM and purchase the lottery tickets. If the offer is not acted upon within some time period then the lottery interface can be removed from the display 702.

As described above, the lottery gaming services may be implemented as part of a retrofit process where the software on the game controller is not modified. In a typical EGM, prior to a retrofit, when a cash out button is depressed and there are credits remaining on the EGM, a signal is sent to the game controller. In response, the game controller sends a value amount and a request for a validation number to a remote server (e.g., a TITO server), which the remote server associates with the value amount. Then, the game controller sends a command to a printer to print a ticket including the validation number to a printer. After the ticket is printed, meters on the EGM record that the value amount which has been dispensed from the EGM.

In one embodiment, hardware can be installed in the retrofit which allows the signal from the cash out device to be intercepted before it reaches the game controller. The signal interception can be done under control of the secondary gaming device. For instance, in response to detecting the cash out signal, the offer for the lottery ticket can be made where the cash out signal is intercepted and doesn't reach the game controller. In response to receiving the cash out signal, the lottery interface 726 in FIG. 16 can be generated under control of the secondary gaming device, under control of a remote device, such as a server, or under control of both the secondary gaming device and the remote device.

In general, functions associated with the secondary gaming device may also be alternately performed by a remote device. For example, information indicating a detection of the cash out signal can be sent to a remote device which can control a generation of the lottery interface 726 in FIG. 16. Thus, the example of functions performed under control of the secondary gaming device is for the purpose of illustration only and is not meant to be limiting.

When the lottery offer is accepted, a command can be sent to the game controller using an appropriate communication protocol to subtract the value of the offer from the credits on the EGM. Many game controllers support a protocol which allows credits to be removed or added to the EGM via these types of commands. Further, under control of the secondary gaming device, a printer can output one or more lottery tickets associated with the accepted offer. A record of the transaction can be stored to a power-hit tolerant memory on the secondary gaming device. In one embodiment, the secondary gaming device can include meters which are updated in response to the lottery transaction.

Next, a cash out signal can be generated and sent to the game controller. For example, the cash out signal can be generated under control of the secondary gaming device and then inserted into the communication path between the game controller and the cash out button. Then, the game controller can proceed, as it is programmed, to control printing of a ticket associated with the remaining value after the value of the lottery offer has been subtracted off the credit meter of the EGM.

In another embodiment, a secondary cash out button can be output to the display 702 under control of the secondary gaming device. In response to receiving a signal from the secondary cash out button, the secondary gaming device can generate the lottery interface 726 in FIG. 16. If the lottery offer is accepted, then a command can be sent to the game controller to subtract the value of the lottery offer from the EGM and lottery tickets can be output from the printer. In this example, it is not necessary to intercept and block the cash out signal using a hardware device.

Next, in one embodiment, the cash out signal can be generated and inserted in the communication path between game controller and the hardware cash out button. If it is possible to send a cash out command directly to the game controller, then the cash out signal can be generated in this manner. Then, the game controller can proceed to transfer the remaining value off the machine, such as via printing of a ticket or via an electronic fund transfer to a remote account. In another embodiment, after the lottery ticket is purchased, the remaining value may not be transferred off the EGM, until the cash out button is hit again, such as, after the hardware cash out button native to the EGM is depressed. In this instance, when a lottery offer has already been made, it is not repeated in response to one of the cash out buttons being pressed a second time.

Next, further details of the lottery transaction are discussed. In response to detecting a selection of button 732, such as by a finger on hand 722 on player interface 740, a state of the lottery interface 726 can change. One example of the lottery interface 726 after a selection of button 732 is shown in FIG. 18.

Figure 18:
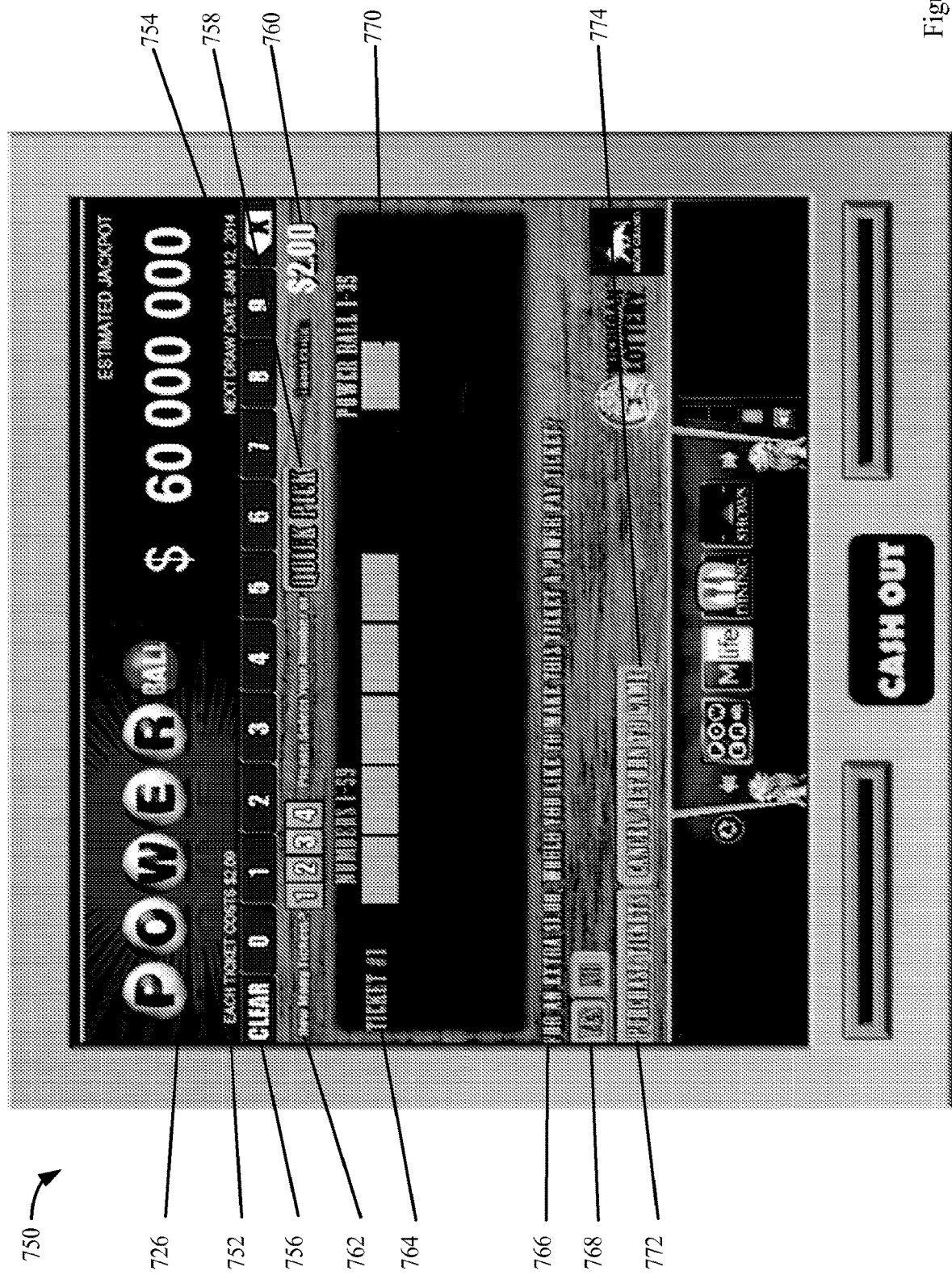

In FIG. 18, in the lottery interface 726 of the player interface 750, the cost of each ticket 752 or a value associated with the ticket and the draw date of the lottery 754 is shown. If the tickets have been offered as part of an award, then the value of the ticket can be output. However, it will not cost an additional amount to purchase the ticket. Thus, value can be displayed instead of cost.

An interface 756 for entering values associated with the lottery ticket is generated. In this example, numbers can be selected and removed if necessary. The numbers will typically be within some specified range, such as 1-59 as shown in FIG. 18. In other embodiments, other types of symbols can be utilized, such as letters, pictures, etc., and the example of numbers is provided for the purpose of illustration only. In one embodiment, a quick pick button 758 is provided. When the quick pick button 758 is selected, numbers used with the lottery ticket can be randomly selected and output to the display in the spaces associated with ticket 764. A selection of the clear button can cause the numbers associated with one or all of the quick pick selections to be removed. The clear button can also cause user selected numbers to be cleared.

An option is provided to allow a purchase of multiple tickets. In this example, up to four tickets 762 can be purchased at a time. Other amounts are possible and four is provided for the purpose of illustration only. An option 766 is provided which allows a player to convert the ticket to a power pay ticket. This option raises the purchase cost of the ticket and also requires a selection of an additional number, i.e., the power ball number. The selected value of the power ball number, which can be between 1-35, in this example, is output to box 770. When the ticket is not a power ball ticket, then box 770 may not be displayed. A selection of the yes button 768 causes the ticket to be converted to a power pay ticket.

In 772, when the selection process for the ticket is complete, a purchase can be made via a selection of button 772. A selection of button 774 can cause the lottery interface 726 to be collapsed and the underlying game to be again output as shown in FIG. 14. As described above, the value of the purchase can be deducted from credits on the EGM. In one embodiment, the lottery interface 726 may allow a designation of a purchase which is greater than amount currently on the EGM. Thus, to complete the purchase, an additional value amount may have to be transferred to the EGM, such as via an insertion of cash or a ticket redeemable for some amount value.

In another embodiment, the lottery interface 726 may not allow a selection of a purchase amount greater than the value of the credits on the EGM. For example, if each ticket costs two dollars and the credits on the EGM is five dollars, then the lottery interface may be configured to allow purchases of one or two tickets. To purchase more tickets with a total greater value, more value would first need to be transferred to the EGM.

Figure 19:
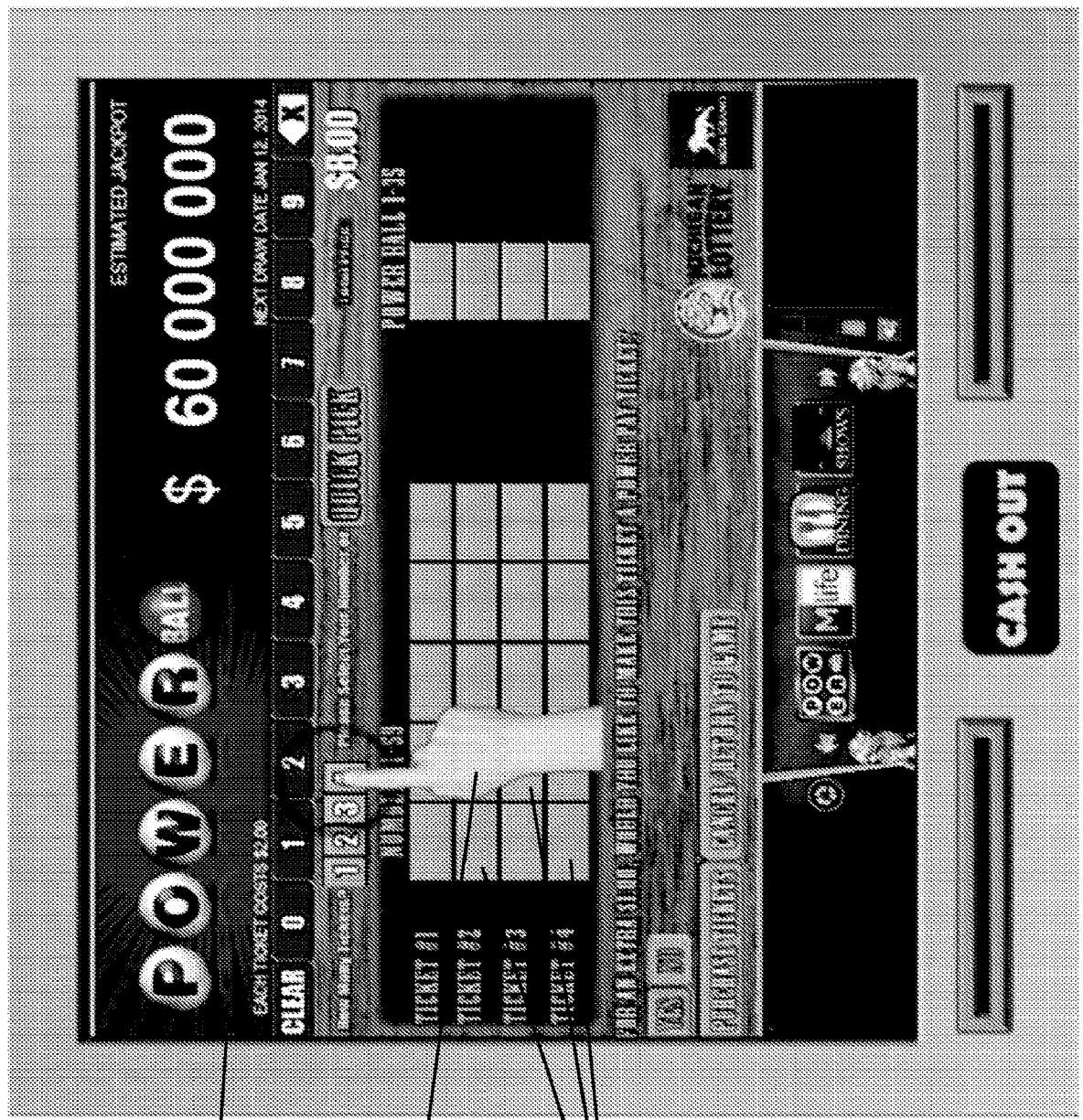

In FIG. 19, the hand 722 is used to show a selection of a number of lottery tickets to purchase in the lottery interface 726 on player interface 780. In response, to receiving the selection, a state of the lottery interface 726 is changed to show spaces, such as 782 for selecting numbers for the ticket. The spaces include places for five numbers with a range of one to fifty nine and one number with a range of one to thirty five. The format, i.e., required information for each ticket is the same. In other embodiments, the interface 726 can be configured to allow a purchase of tickets of different types with different types of required inputs, such as tickets requiring a selection of three, four or five numbers of varying ranges. Further, as described below, the interface 726 can be configured to offer a purchase of "scratch-off" type tickets. As described above, the state of the lottery interface 726 can be controlled by a secondary processor on a secondary gaming device installed on the EGM, a secondary processor on a remote device or combinations thereof.

Figure 20:
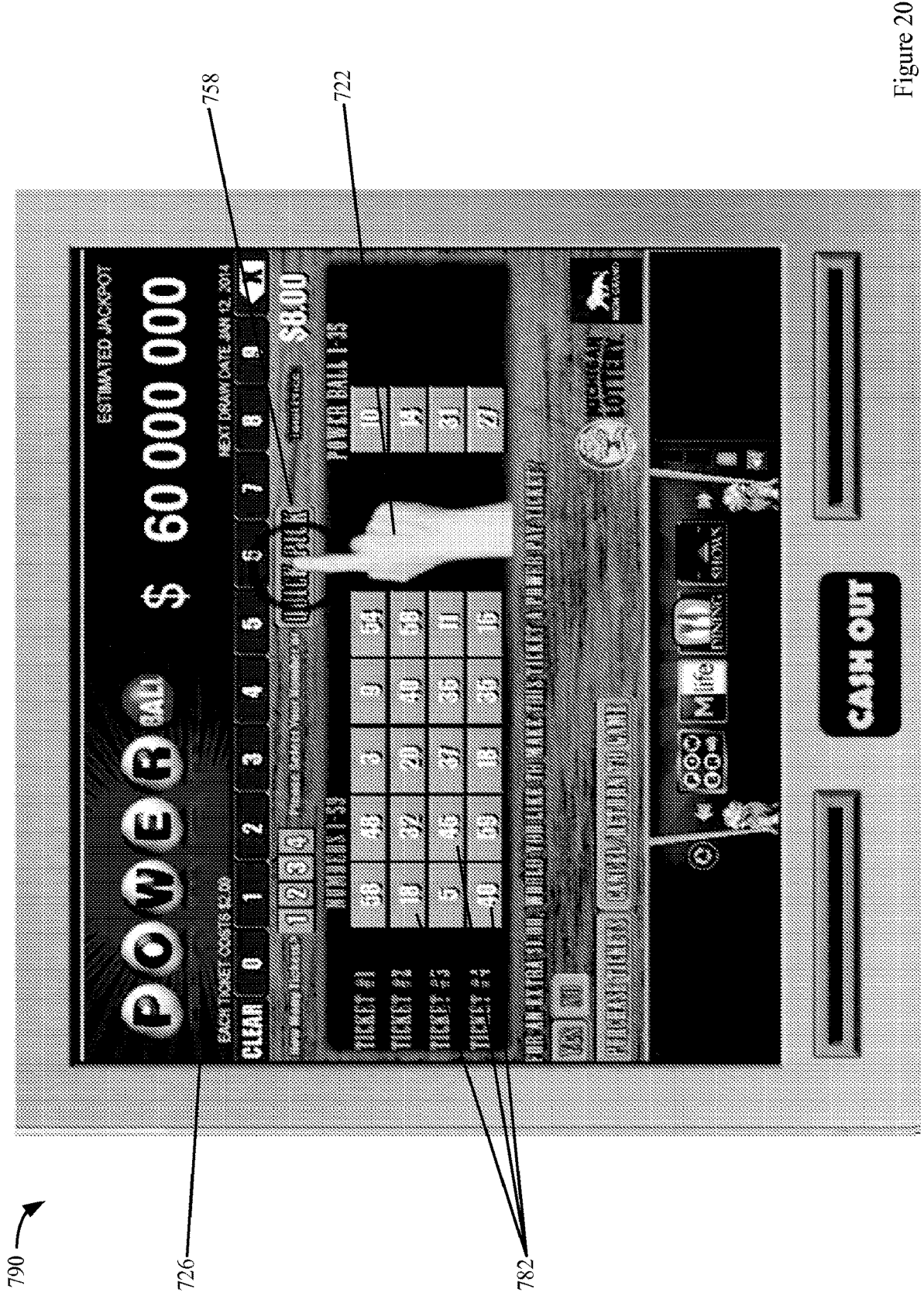

In FIG. 20, the hand 722 is used to indicate a selection of the quick pick button 758 on the lottery interface 726 on player interface 790. In response to activation of the quick pick button 722, the spaces 782 are populated with numbers. In some embodiments, the system can be configured to allow an input which clears one or more of the selected numbers. Then, the cleared numbers can be manually specified. The random numbers can be generated via a hardware or software module located on a secondary gaming device installed on the EGM or located on a remote server. The amount of random numbers generated will depend on the number of tickets selected and the type of ticket, i.e., numbers required per ticket.

In one embodiment, the system can be configured to store, to a power-hit tolerant memory, input for the ticket, such as numbers, as they are specified. For example, the random numbers shown in FIG. 20 can be stored to a power-hit tolerant memory. As another example, as each number is specified via manual input, such as through the lottery interface 726, the manual input can be stored to the power-hit memory.

In the event of a power-failure, the secondary gaming device can be configured to know whether a lottery interface was being displayed. When the lottery interface was being displayed prior to a power issue, the secondary gaming device can be configured to restore the lottery interface to a state prior to the power issue. This state can include any lottery numbers which have been manually selected or randomly selected and output to the interface 726.

Power-hit tolerant memory can be located on the secondary gaming device, a remote server or both. For example, if numbers are randomly generated by a remote server, the server can store the numbers to a power-hit tolerant memory and then send the numbers to a secondary gaming device. The secondary gaming device can receive the numbers, store them to a power-hit tolerant memory and then output them to the lottery interface. If the secondary gaming device generated the numbers, then it can store them to the power-hit memory prior to outputting the numbers. Then, in the instance of a power failure or some other failure which causes the lottery interface to cease being output, the numbers stored in the power-hit memory can be used to restore the lottery interface to a state including numbers designated prior to the failure.

Figure 21:
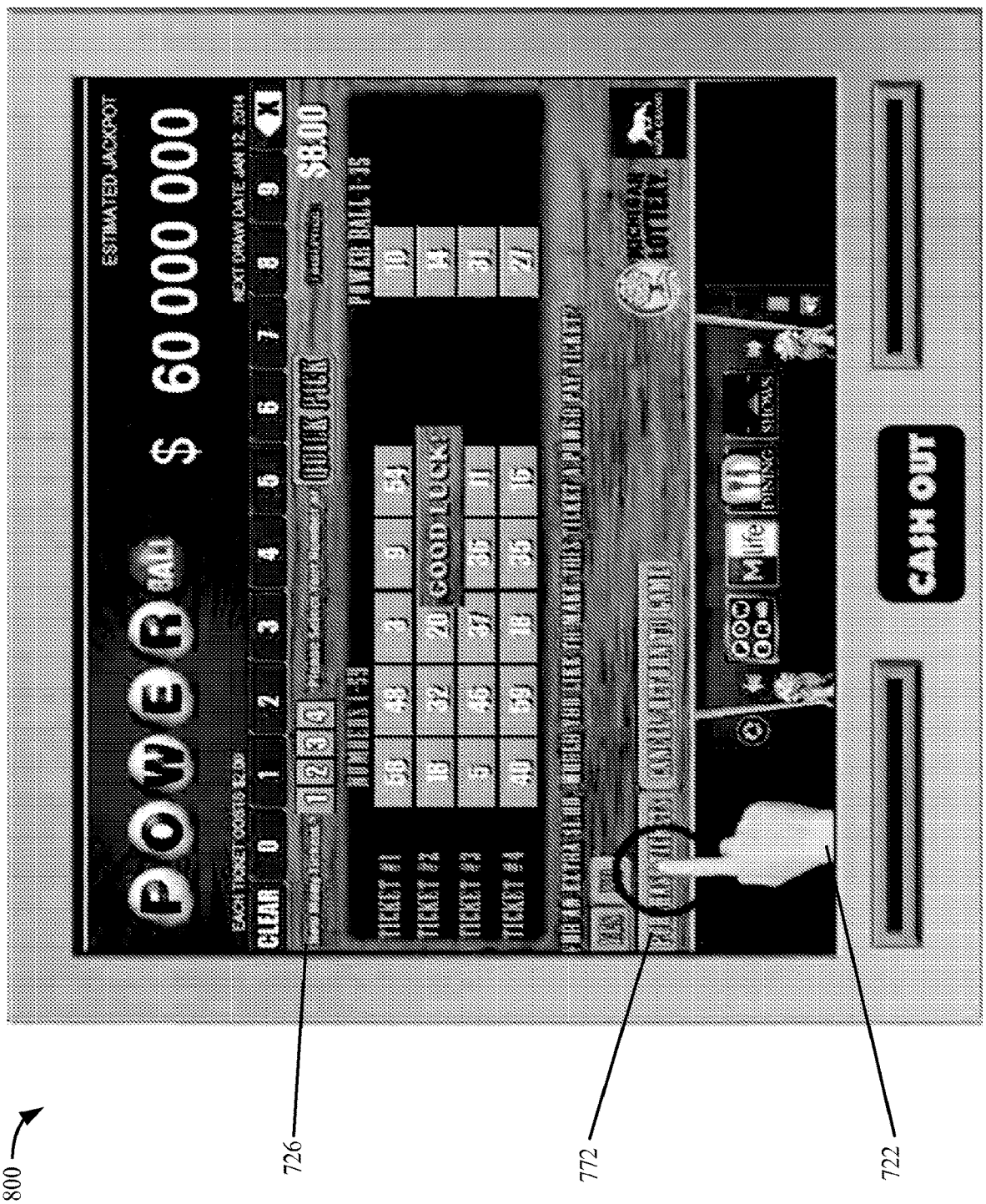

In FIG. 21, via hand 722, a selection of the purchase button 772 in lottery interface 726 on player interface 800 is shown. In response to detecting an activation of the purchase button 772, a request can be sent to remote server including but not limited to the numbers selected for each ticket, the value of each ticket, information about the drawing, where the ticket was purchased and identification information of the gaming device on which the purchase was made. For example, the secondary device can send a request to back-end server which includes the numbers shown for each ticket, the draw date, the two dollar cost for each ticket, device identification information, such as a device serial number, a name of a casino where the device is located, etc. This information can also be stored to a power hit tolerant memory as part of a pending transaction. In response, the back-end server may store and then forward this information to a lottery server, such as a state lottery server or a local casino lottery server. In another embodiment, the secondary gaming device may be able to communicate directly with the lottery server.

In response, the lottery server can receive the information in the request, store the information and generate an identifier, such as a number or combination of numbers, letters or symbols. Further, the lottery server and the back-end server can communicate information which allows for an electric funds transfer associated with the ticket purchase to be made. The unique identifier can be received directly at the secondary device or via one or more intermediary devices, such as back-end server. In one embodiment, a unique identifier can be generated for each ticket which is printed where a printed ticket can be associated with multiple purchased tickets, such as the four tickets shown in FIG. 21. In another embodiment, a unique identifier can be generated for each ticket which is purchased. For example, a unique identifier can be generated for each of the four tickets shown in FIG. 21.

When the secondary gaming device receives the identifiers from the remote lottery server, a command to deduct the funds from the credit meters on the EGM can be generated and commands to print the ticket can be generated. Further, a command can be generated which triggers a cash out of the remaining value on the EGM after the lottery ticket purchase. For example, the secondary gaming device can generate a cash out signal which is inserted in the communication pathway between the game controller and the cash out button which causes the game controller to complete the cash out transaction. In addition, a record of the transaction can be stored to a power hit memory on the secondary gaming device.

If no identifiers are received within some time specified time period, then the secondary gaming device may cancel the transaction and output a message on the player interface 800 which indicates the transaction was not completed. In addition, the secondary gaming device can generate a cash out signal which causes the game controller to perform a cash out transaction. In one embodiment, the secondary gaming device can store a record of the cancelled transaction including a reason as to why it was not completed, such as it was not able to receive the unique identifiers to print on the lottery ticket or tickets.

As described above, after the unique identifiers are received, a command can be sent to print the purchased lottery tickets and the lottery interface can be collapsed from the display 702 on the player interface 810 such that the wager-based game is again visible. The print process can involve sending commands including information to the printer which allows a valid and redeemable lottery ticket to be dispensed. The information can include details about the type of ticket printed, numbers selected, one or more unique identifiers, etc. A portion of the information can be encoded in an optically readable format, such as a bar-code. For example, a unique identifier can be encoded as a bar-code.

Figure 22:
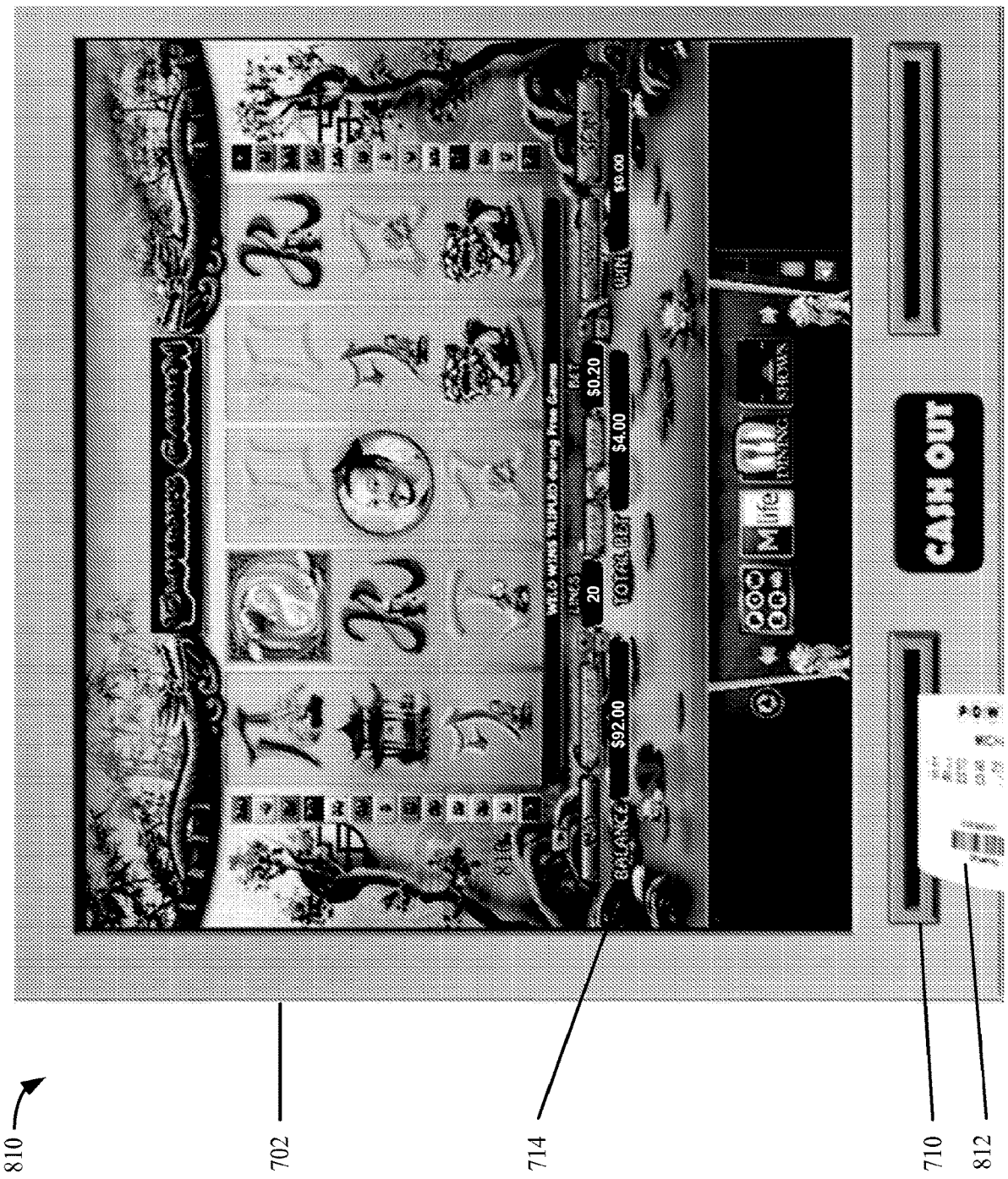

In FIG. 22, a lottery ticket 812 is shown being dispensed from printer 710 on the player interface 810. A command has been sent to the game controller to deduct the eight dollar cost of the lottery tickets from the credit balance. Thus, the new credit balance 714 is ninety two dollars.

In one embodiment, the secondary gaming device can be configured to generate games and maintain a credit meter separate from the credit meter managed by the EGM. In this instance, the lottery tickets may be purchased using the credits on the credit meter maintained by the game controller, using the credits on the credit meter maintained by the secondary gaming device or combination thereof. When the secondary gaming device is controlling the lottery interface and credits from the credit meter maintained by the secondary gaming device are used to obtain a lottery ticket, the secondary gaming device can perform the transaction internally without sending a command to another device, such as the game controller to deduct the credits used in the transaction.

In another embodiment, a credit meter can be also maintained on a remote device, such as a remote server. For example, in a player tracking server, promotional credits can be maintained for a player. In one embodiment, the secondary gaming device can be configured to allow a conversion of promotional credits award to a player through a player tracking system into lottery tickets.

In a retrofit, the software on the printer may have to be modified to allow it to receive commands to print the lottery ticket and then actually print it in some specified format. Some lottery authorities require a special kind of paper to be used for printing lottery tickets. This feature may require replacing an existing printer head, paper feed trays and possibly the entire printer to make the printer compatible with lottery paper requirement. Further, a communication port upgrade may have to be added to the printer. For example, an existing printer may have two communication ports where one is coupled to the game controller. The second communication port may use a serial communication protocol, such as RS-232 which may be converted to some other protocol, such as USB or Ethernet to enable communications with the secondary gaming device.

In one embodiment, both lottery tickets and cash out tickets can be printed on the lottery ticket printing media. In another embodiment, a separate printer may be added, such that the player interface 810 includes printer 710 and another printer (not shown). One of the printers can be used to print lottery tickets, while the second printer can be used to print cash out (TITO) tickets. Thus, in a retrofit, a second printer and associated paper tray can be installed on the EGM and coupled to the secondary gaming device.

Figure 23A:
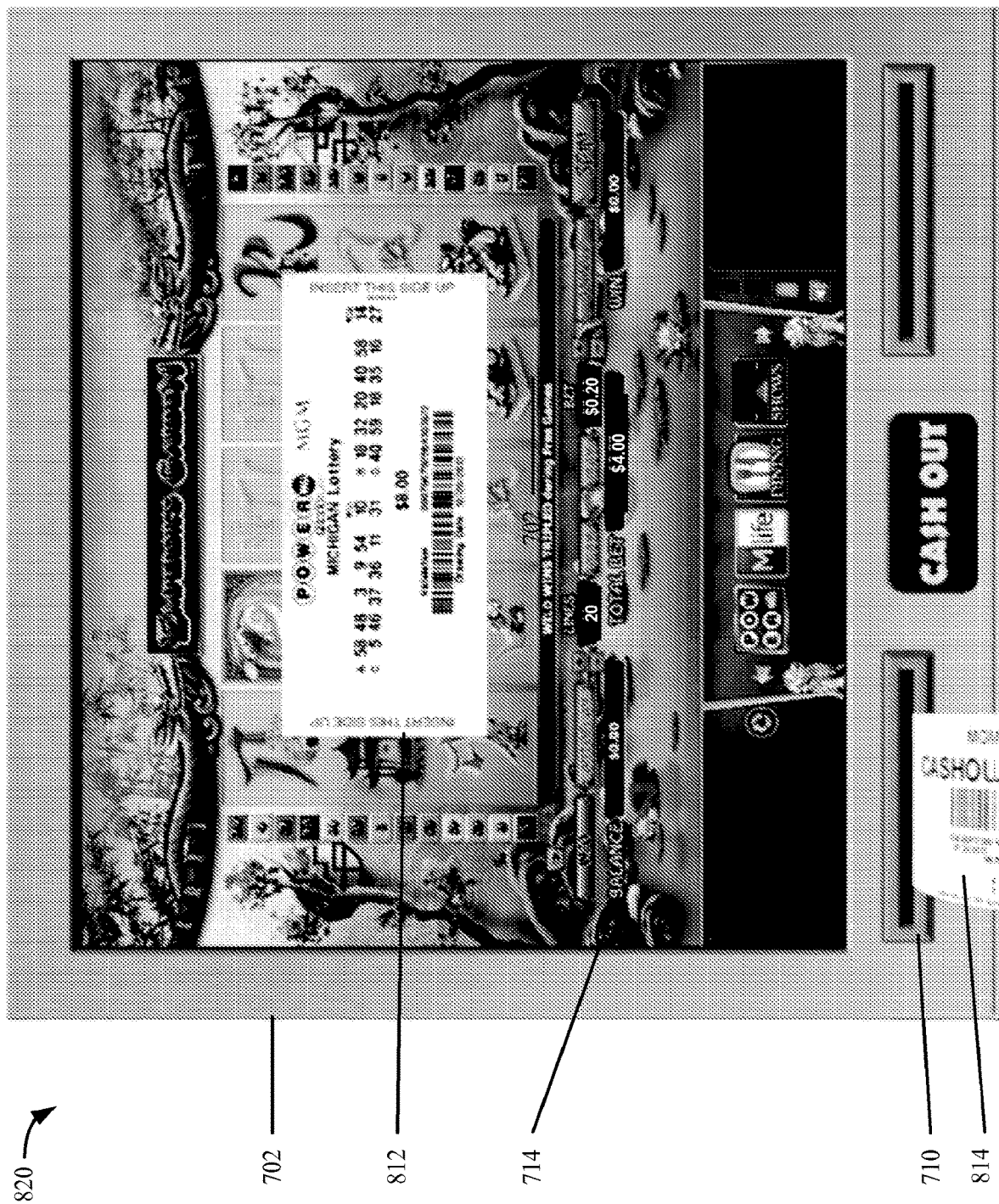

In FIG. 23A, an example of the dispensed lottery ticket 816 is shown. The lottery ticket 812, as shown, can be the tangible printed copy of the ticket. In one embodiment, a graphical version of the printed ticket may also be output to the display 702, which can output as ticket 812. After the ticket 812 is dispensed, information indicating the ticket has been dispensed can be stored to power hit tolerant memory. Also, in FIG. 23, a second ticket, the cash out ticket 814 is shown being dispensed from printer 710 on the player interface 820. The balance 714 has been adjusted to zero to reflect the remaining balance has been transferred from the EGM.

To generate the cash out ticket, a device, such as the game controller, may send a request to a TITO server to print a ticket of a particular value and receive a unique identifier. Then, the game controller can instruct the printer 710 to print out the cash out ticket. In another embodiment, the secondary gaming device alone or in conjunction with a remote server can be configured to send a request to a TITO server to request a cash out ticket and control printing of the cash out ticket on printer 814.

In FIG. 23B, information which can appear on the back of the lottery ticket is shown. The information included on the back of the lottery ticket can vary depending on the lottery jurisdiction in which it is issued. Further, the information can be different from what is on the back of the cash out ticket.

In one embodiment, the information can be pre-printed on the back of tickets which are used for lottery tickets. When lottery tickets are issued, the information on the front of the ticket can be printed on the tickets with the pre-printed lottery information. In this example, when one printer is used, cash out tickets can be printed from tickets stored in a separate tray which don't include the lottery rules. In another embodiment, the lottery tickets and cash out tickets can be printed using separate printers. In another embodiment, the front and back of the lottery ticket can be printed on the fly where rules are printed on the back. Thus, cash out tickets and lottery tickets can be printed on a common ticket.

In yet another embodiment, a double ticket can be issued for the lottery ticket. On the front of the first ticket, the lottery information, such as the picked numbers shown in FIG. 23A, can be printed. On the front of the second ticket, the rules and other information shown on FIG. 23B can be printed. Thus, double tickets can be issued for some applications, such as lottery. Whereas, single tickets can be issued for other applications, such as cash out tickets. It is possible to print cash out tickets as a double ticket. Further, triple or more tickets can be issued and this example is provided for the purposes of illustration only.

As an example, in one embodiment, a casino can offer a parallel lottery, which uses the numbers selected for a lottery ticket. The casino lottery can have different rules than a state lottery. In particular, the casino lottery can involve selecting a first amount of numbers in the range of the state lottery numbers where the first amount of numbers is greater or less than the numbers selected for the state lottery ticket. For example, the casino lottery might involve just selecting a number in the same range or a different range from which the power ball number is selected. If power ball number selected on the state lottery ticket matches the number selected by the casino, then the ticket holder may win a prize.

In another example, the casino lottery may involve selecting three numbers in the range of the five numbers selected on a state lottery ticket. If the three numbers are matched from among the five selected numbers, then the ticket holder may win a prize. In yet another example, the casino lottery may involve selecting ten numbers where if four out of five of the numbers selected for the state lottery match, a prize is won. Many such combinations are possible and these examples are provided for the purposes of illustration only.

In one embodiment, a purchase of the first lottery ticket (e.g., the state lottery ticket) can cause an entry into a second lottery (e.g., a casino lottery) where the player doesn't have to provide any additional funds. For example, a purchase is made for the state lottery ticket and an entry is automatically made in a casino lottery. In another embodiment, an additional value may be required to enter the second lottery upon purchase of a ticket for the first lottery. For example, additional credits or loyal points from a player tracking account may be required to obtain an entry in the second lottery. When additional value is required, the system can be configured to allow a purchaser of the first lottery ticket to decline a purchase of the second lottery ticket.

Video content associated with the second lottery (not shown) can be displayed to the player interface 820. For example, the fact that the person is entered into the second lottery, the rules of the second lottery and how a player can check the outcome of the second lottery can be displayed to the display 702. In one embodiment, a separate ticket may be issued for the second lottery which includes information about the second lottery. In another embodiment, a separate ticket for the second lottery may not be issued. When an entry is generated for the second lottery, then information associated with the entry, such as selected numbers, can be sent to a server on which the lottery is maintained. Further, like the first lottery entry, a unique identifier can be generated and associated with the second lottery entry. In one embodiment, the same unique identifier can be used for entries in both the first lottery and the second lottery whereas one system associates first information with the unique identifier and a second system associates second information with the unique identifier. The first and the second information can be associated with an entry in a first lottery and a second lottery respectively.

In one embodiment, lottery ticket purchase can be linked to a player tracking account. Thus, when a ticket is purchase, information about the ticket can be saved to a player's player tracking account. The player tracking system can be configured to automatically check the entry for the player after the drawing for the lottery is held. The player can then be notified whether they won or not using contact information in the player tracking account. The player can then go to a valid redemption site to claim their winnings.

In one embodiment, the player can be automatically credited the winnings to their player tracking account, which could then be later accessed on an EGM. The player can be notified using contact information in their account that they have won including the amount. When the entry information is automatically stored to a player tracking account, it may not be necessary to print out a lottery ticket. Thus, the lottery entry may only be stored electronically.

This feature can be implemented for a state lottery or a secondary lottery offered by the casino. In this embodiment, if the redemption of a winning lottery ticket is carried out by the casino, such as via the player tracking system. Then, when the ticket holder goes to redeem the ticket, the lottery system can send a message that the ticket is already validated. If the ticket holder has managed to redeem the ticket prior to it being redeemed by the casino, then the casino will be notified that the ticket is already redeemed and then the winnings associated with the ticket may not be deposited into the ticket holder's player tracking account.

In one embodiment, for a state lottery purchase, the casino may provide a promotion where they match all or a portion of the lottery winnings, such as if the player agrees to deposit it into their player tracking account. The match amount can be deposited into the player's player tracking account. A match amount can be in the form of credits which can be used for game play or taken as cash by the player, restricted credits which can only be used for game play, player tracking points, goods, services, discount coupons or combinations thereof. Winnings from a secondary lottery can also be distributed in this manner.

Figure 24:

In FIG. 24, the dispensed lottery ticket 812 and the cash out ticket 814 are shown side by side in front of the player interface 830. The lottery ticket 812 and cash out ticket 814 may also be output in a graphical format to the player interface 830. The two tickets are in different formats and include different information. The format and information which is included may be governed according to rules enforced by different regulatory authorities. For example, the lottery ticket requirements can be specified by a lottery gaming authority while the cash out ticket 814 requirements can be specified by a regulatory authority associated with casino gaming.

Figure 25:
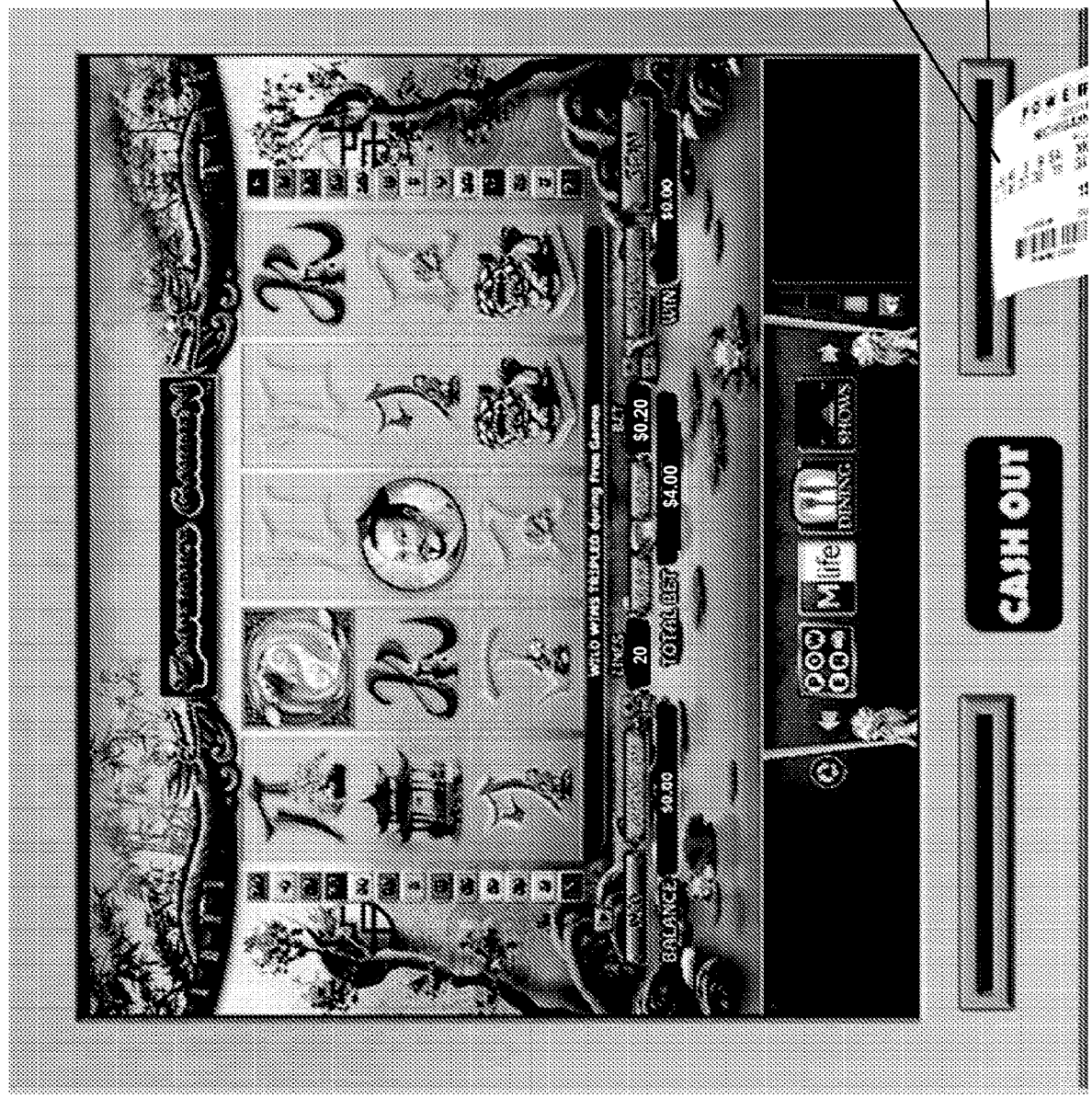

At a later time, a dispensed lottery ticket can be inserted into a bill/ticket acceptor and checked to determine whether an award is associated with a ticket. Similarly, the cash out ticket can be validated in this manner, i.e., it can inserted into the bill/ticket acceptor and then a TITO server can be contacted to determine whether it is valid. In FIG. 25, the lottery ticket 812, which was previously dispensed, is shown being inserted into bill/ticket acceptor 712 on player interface 840. In FIG. 26, the ticket has been validated for five dollars and the balance 714 on player interface 850 has been updated to reflect the award. After it is credited to the EGM, the award can be used for additional game play, to purchase additional lottery tickets or it can be dispensed from the EGM as a cash out ticket.

In another embodiment, the player interface can include a separate scanner used to scan a bar-code from a lottery ticket. For example, a scanner can be retrofitted to a component, such as card reader or bill validator bezel. The lottery ticket can be presented, such as the ticket information is read, and then a redemption process can be implemented.

Besides EGM's, it may be possible to validate a lottery ticket at other within or outside the casino. For example, a lottery ticket can be validated at a kiosk within the casino. In another example, it may be possible to validate the lottery ticket dispensed from the EGM at a store at which lottery tickets are sold which is away from the casino.

When the lottery ticket is accepted, it needs to be recognized as a lottery ticket. If the bill/ticket acceptor has not been upgraded, then it may send a message to the game controller that an invalid ticket has been inserted and the ticket has been ejected. For the lottery ticket to be recognized, the bill ticket/acceptor may need to be upgraded, such as with a new reader head, to recognize the print media associated with the lottery ticket and the information printed on the lottery ticket using this print media. Further, communication ports on the bill/ticket acceptor may need to be upgraded or the entire bill ticket/acceptor may need to be replaced. For example, a single port bill/ticket acceptor may be replaced with a dual port bill/ticket acceptor with the necessary software.

After the bill/ticket acceptor accepts a ticket, it needs to distinguish whether it is a lottery ticket or cash out ticket. Information read from a cash out ticket can be directed to the game controller whereas information read from a lottery ticket can be directed to the secondary gaming device or a remote server. For example, cash out ticket information may be output via a first port on the bill/ticket acceptor whereas lottery ticket information may be output via the second port on the bill/ticket acceptor. When the lottery ticket information is received, a first check may be made to determine whether a drawing with the lottery ticket has occurred at the secondary gaming device. If the drawing has not occurred, then this information can be output to the display as well as a message that the drawing has not occurred and when it will occur.

In another embodiment, information read from the lottery ticket can be sent to a lottery server directly or via one or more intermediary devices, such as directly from the secondary gaming device to a lottery server or from the secondary gaming device to a back-end server and then to the lottery server. The lottery server can determine whether the ticket is valid or not, whether a drawing associated with a ticket has occurred, whether an award is associated with the ticket or whether the ticket has been redeemed or not and send information associated with these determinations back to the secondary gaming device.

When the ticket is valid, the lottery ticket server can send information to the server indicating whether an award is associated with the ticket. This information can be output on the player interface 850, such as via message 854. If the amount is below a certain value, the lottery server can mark the ticket as being redeemed and the award amount can be credited to the EGM. For example, the secondary gaming device can send a command to the game controller to add an award amount to the credit meter on the EGM, a message to the bill/ticket acceptor to store the ticket and store information about the transaction.

If the lottery ticket is above a certain value, the value which is used may depend on regulations associated with lottery authority, regulations associated with casino game authority and limits of the EGM. For example, the lottery game authority may allow the EGM to redeem a ticket for a value which is greater than the limit which is allowed for the EGM. In this instance, a message can be displayed indicating the award amount and where the ticket may be redeemed. Similarly, the limit allowed for the EGM to redeem may be greater than the value to which the lottery authority allows. In this case, if the amount exceeds the allowable amount from the lottery authority, the EGM can display a message indicating the award amount and where the ticket may be redeemed and then a command can be generated to dispense the ticket. Thus, in general, a gaming device, such as the secondary gaming device may have to keep track of limits which determine whether a lottery ticket can be redeemed on the EGM, which may vary from EGM to EGM and location to location, and then redeem or not redeem the lottery ticket based upon limits imposed for each EGM.

As described above, the lottery interface can be configured to allow a purchase and a play of scratch off lottery tickets (not shown). For a scratch off game, an offer to generate a scratch ticket can be output and then paid via credits on the EGM. After the scratch off game is purchased, a request for a scratch off ticket can be sent to a lottery ticket server. The lottery ticket server can send information which uniquely identifies the scratch off ticket, its value and information related to how the information on the ticket is to be displayed to the lottery interface. This information can be stored to a power hit tolerant memory on the secondary gaming device.

Next, a scratch type lottery ticket can be displayed to the lottery interface. The player can use the touch screen display to remove material covering the award amounts on the display. Then, the award can be revealed to the player. If the award is below some limit, it can be added to the credit meter on the EGM. If the award is above a certain limit, then the secondary gaming device can be configured to communicate with the lottery ticket server to request a validation number to associate with the award. Then, a ticket redeemable for the award can be dispensed and locations where the ticket can be redeemed may be specified.

As described above, after a lottery ticket is printed, such as a state lottery ticket, an accompanying secondary ticket can be printed which describes the rules of lottery on a first side of the ticket. In one embodiment, the second side of the accompanying ticket opposite the first side may be left blank. In other embodiments, additional information associated with a promotional offer or secondary game can be printed on the accompanying ticket on the second side of the ticket opposite the rules. In alternate embodiments, the promotional offers or secondary game tickets can be generated independent of the lottery ticket and hence, may not accompany the lottery ticket.

FIGS. 27A-27C show a few examples of secondary games which can be generated on the second side of a ticket accompanying a lottery ticket. In FIG. 27A, the ticket 900 can include one or more of 1) an indication 902 of an award associated with the secondary game, 2) a date the ticket is generated 904, a brief description 906 of how a person can partake in the secondary game, a unique ticket number 908, a date on which the secondary game is going to take place 910, machine readable optically encoded information 912 associated with the ticket 900 (e.g., a bar-code), a more detailed description of the secondary game, the award and rules of the secondary game 916, an indicator 914 of how the ticket 900 can be inserted into a ticket reader and an address 918 associated with the secondary game.

To generate a ticket, such as 900, a secondary gaming device with a secondary processor, separate from a primary processor used to generate a game of chance on an EGM, can be configured to generate or contact or remote server to receive information which is printed on the ticket 900. For example, the secondary gaming device can receive all or a portion of the information printed on ticket 900 from the remote server, such as the unique ticket number 908, the brief description of the offer 906 or the detailed description of the offer 916.

In an alternate embodiment, the secondary gaming device can generate a portion of the information which is generated on the ticket 900 and send it to the remote server. For example, the secondary gaming device can generate all or a portion of the unique ticket number or the date printed on the ticket. The secondary gaming device can control printing of the ticket 900. In addition, it may send information associated with the printed ticket 900 to a remote sever, such as when the ticket was printed and the other information about the ticket. After receiving this information, the remote server can be configured to enter the ticket 900 in the secondary game, such as in the drawing for the complimentary buffet. In another embodiment, the remote server can control printing of the ticket using the secondary gaming device as a communication intermediary.

In one embodiment, to learn if the ticket 900 is associated with an award and to receive an award, the ticket 918 may have to be presented at a location where the ticket was issued after the secondary game has been implemented. For example, to learn if the ticket is a winner, the ticket 918 may have to be presented after the drawing date 910. The address 918 can be used to indicate one or more locations where the ticket 900 can be presented. In this example, the location is a casino in Detroit, Mich.

When a state lottery ticket is issued, the state lottery ticket may be checked at the location where it was issued or any other locations where that support state lottery services. For example, a state lottery ticket issued at a convenience store may be inserted into an EGM to determine whether it is a winner. However, it may not be possible to check a secondary ticket, such as 900, issued with a state lottery ticket at a casino at the convenience store. Thus, the locations where ticket 900 can be checked and/or redeemed may differ from the locations where the state lottery ticket can be checked and/or redeemed.

In one embodiment, the ticket 900 may only be redeemed when the ticket is presented on-site at the locations indicated in 918. For example, the ticket can be read at an Electronic Gaming Machine (EGM) or on an electronic device, separate from an EGM, configured to read information from the ticket. The EGM or the electronic gaming device can be configured to read information from the ticket 900, transmit information to a remote device read from the ticket and receive from the remote device and indication of the outcome to the secondary game, such as an award or no award. The EGM or electronic device can be configured to output an indication of the award, such as to a display screen. In a particular embodiment, only EGMs, such as slot machines, video gaming machines or gaming tables, which generate or are used to generate a game of chance and accept money for wagering on the game of chance, may be configured to process the tickets. The EGMs can include the secondary gaming devices, described herein, configured to control the issuance and redemption of the tickets.

When a particular ticket is received in a gaming device, such as an EGM, prior to the secondary game associated with the ticket being played, the EGM can be configure to indicate that the secondary game has not occurred yet and when the secondary game will occur. For example, if 900, is issued from a printer, after a lottery ticket is printed, and then immediately reinserted into a ticket reader on an EGM, a message can be output to a video display that the drawing for the award 902 has not taken place yet and the ticket 900 needs to be inserted into an EGM or other suitable devices after the drawing date 910, which is printed on the ticket. In some embodiment, the drawing date can be on the same day, such on the same day at a later time. In this instance, a primary and/or secondary processor can control output of a message, which indicates the time of the drawing and encourages the person to become after this time.

A time period can be associated with a secondary game during which a prize associated with a ticket 900 can be claimed. For example, for state lotteries, this time period is typically a year. The time period can be hours, days, weeks, months, etc. and can vary from secondary game to secondary game. When a particular ticket is received in a gaming device, such as an EGM, after the time period associated with secondary game has expired, then a message can be output indicating this fact.

In yet another embodiment, an award or offer can be printed on the ticket 900, which can be redeemed in the future. For example, an award for five dollars in free game play or a 50% discount on the buffet can be printed on ticket 900 with an indication of when the award can be redeemed, such as tomorrow or within the next week. When the ticket is presented within the designated time period, the award or offer may be redeemed.

In one embodiment, when a ticket is associated with an award is received and validated, an additional ticket may be printed which allows the award to be redeemed. For example, an additional ticket can be printed which is used as a voucher to receive the free buffet. In another embodiment, it may be possible to redeem to the award directly on an EGM. For example, when the award is free game play, then the free game play amount associated with the ticket can be directly credited to the EGM.

In various embodiments, tickets, such as 900, can be generated using a pre-printed ticket. For example, the lottery rules can already be pre-printed on a first side of ticket 900 when the tickets are loaded into the printer. Then, the information shown in FIG. 27A, can be added to the ticket at the time of issuance. In another embodiment, the information on both sides of the ticket 900 can be printed at issuance. For example, a dual-headed printer can be used to simultaneously print information on the first side and the second side of ticket 900.

In FIGS. 27B and 27C, one side of tickets 920 and 930 are shown. Ticket 920 includes an indication of an award 922 for free game play, a message 924 indicating when the secondary game with the award 922 will occur and details of the secondary game 926. Ticket 930 includes a first message 932 describing a secondary game, which is a drawing, a second message 934 indicating the drawing is a casino jackpot and a third message 936 with a more detailed description of the drawing.

The hardware, methods and interfaces described above are not limited for use on wager-based gaming machines. In alternative embodiments, hardware, methods and/or interfaces can be implemented in a kiosk, table top gaming machine or a game table, such as a black jack table. The various aspects, embodiments, implementations or features of the described embodiments can be used separately or in any combination. Various aspects of the described embodiments can be implemented by software, hardware or a combination of hardware and software.

The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, DVDs, flash memory, memory sticks, magnetic tape, and optical data storage devices. The computer readable medium can also be distributed over network-coupled computer systems so that the computer readable code is stored and executed in a distributed fashion.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

The invention is claimed as follows:

1. A system comprising:
   an electronic gaming machine comprising:
      a housing including a door;
      a security sensor supported by the housing;
      an input device supported by the housing and configured to receive an input to purchase a lottery ticket;
      a display device supported by the housing and configured to display a notification of the purchase of the lottery ticket responsive to a completion of a purchase of the lottery ticket;
      a slot accounting system port; and
      a processor programmed to, responsive to a detection, via the security sensor, of an opening of the door, cause data associated with the opening of the door to be stored, and disable any receipt of any inputs to purchase any lottery tickets until an operator intervention event occurs;
   a slot machine interface board supported by the housing of the electronic gaming machine and in communication with a gaming establishment player tracking server; and
   a device comprising a communication interface having a first slot accounting system protocol interface connected to the slot accounting system port of the electronic gaming machine and a second slot accounting system protocol interface connected to the slot machine interface board, and
      responsive to a receipt, from a remote server, of data associated with the completion of the purchase of the lottery ticket, the device is programmed to:
         communicate, to the slot machine interface board and via the second slot accounting system protocol interface data which results in the player tracking server storing data of the purchased lottery ticket in association with a gaming establishment player tracking account of an identified user.

2. The system of claim 1, wherein responsive to a receipt, via the slot machine interface board and from the gaming establishment player tracking server, of data that the purchased lottery ticket comprises a winning lottery ticket, a credit balance of the electronic gaming machine is caused to be increased in association with the winning lottery ticket.

3. The system of claim 2, wherein the increase of the credit balance of the electronic gaming machine occurs independent of any inputs received via the input device of the electronic gaming machine.

4. The system of claim 1, wherein responsive to a receipt, via the slot machine interface board and from the gaming establishment player tracking server, of data that the purchased lottery ticket comprises a winning lottery ticket, a notification of a deposit of an amount of funds associated with the winning lottery ticket into an account associated with the identified player is caused to be displayed by the display device of the electronic gaming machine.

5. The system of claim 4, wherein the deposit of the amount of funds occurs independent of any inputs received via the input device of the electronic gaming machine.

6. The system of claim 1, wherein the lottery ticket is associated with one of a state lottery and a gaming establishment lottery.

7. The system of claim 1, wherein an amount of funds to purchase the lottery ticket are stored in an account associated with the identified player.

8. The system of claim 7, wherein the amount of funds comprises an amount of promotional credits.

9. The system of claim 1, wherein responsive to the completion of the purchase of the lottery ticket, a printer is caused to print the lottery ticket.

10. A gaming establishment player tracking system server comprising:
    a processor; and
    a memory device that stores a plurality of instructions that, when executed by the processor, cause the processor to:
       maintain an amount of promotional credits in association with a gaming establishment player tracking account, and
       responsive to a receipt, from a slot machine interface board supported by a housing of an electronic gaming machine, of data associated with an attempted purchase of a lottery ticket by a player associated with the gaming establishment player tracking account, responsive to a determination that the amount of promotional credits is sufficient for the purchase of the lottery ticket, and responsive to a receipt, from a remote server and via a device comprising a communication interface having a first slot accounting system protocol interface connected to a slot accounting system port of the electronic gaming machine and a second slot accounting system protocol interface connected to the slot machine interface board, of a completion of the purchase of the lottery ticket:
          reduce, based on the purchase of the lottery ticket, the amount of promotional credits,
          store data associated with the purchased lottery ticket to the gaming establishment player tracking account, and
          cause a communication of data that results in a display, by a display device of the electronic gaming machine, of a notification of the purchase of the lottery ticket.

11. A method of operating a system, the method comprising:
    receiving, via an input device of an electronic gaming machine, an input to purchase a lottery ticket,
    responsive to a receipt, from a remote server and via a device comprising a communication interface having a first slot accounting system protocol interface connected to a slot accounting system port of the electronic gaming machine and a second slot accounting system protocol interface connected to a slot machine interface board in communication with a gaming establishment player tracking server, of data associated with a completion of the purchase of the lottery ticket:
       displaying, by a display device of the electronic gaming machine, a notification of the purchase of the lottery ticket, and
       communicating, to the slot machine interface board and via the second slot accounting system communication protocol interface, data which results in the player tracking server storing data of the purchased lottery ticket in association with a gaming establishment player tracking account of an identified user, and responsive to a detection, via a security sensor of the electronic gaming machine, of an opening of a door of the electronic gaming machine:
causing data associated with the opening of the door to be stored, and
disabling any receipt of any inputs to purchase any lottery tickets until an operator intervention event occurs.

12. The method of claim 11, further comprising, responsive to a receipt, via the slot machine interface board and from the gaming establishment player tracking server, of data that the purchased lottery ticket comprises a winning lottery ticket, causing an increase of a credit balance of the electronic gaming machine in association with the winning lottery ticket.

13. The method of claim 12, wherein the increase of the credit balance of the electronic gaming machine occurs independent of any inputs received via the input device of the electronic gaming machine.

14. The method of claim 11, further comprising, responsive to a receipt, via the slot machine interface board and from the gaming establishment player tracking server, of data that the purchased lottery ticket comprises a winning lottery ticket, displaying, by the display device of the electronic gaming machine, a notification of a deposit of an amount of funds associated with the winning lottery ticket into an account associated with the identified player.

15. The method of claim 14, wherein the deposit of the amount of funds occurs independent of any inputs received via the input device of the electronic gaming machine.

16. The method of claim 11, wherein the lottery ticket is associated with one of a state lottery and a gaming establishment lottery.

17. The method of claim 11, wherein an amount of funds to purchase the lottery ticket are stored in an account associated with the identified player.

18. The method of claim 17, wherein the amount of funds comprises an amount of promotional credits.

19. The method of claim 11, further comprising responsive to the completion of the purchase of the lottery ticket, causing, a printer to print the lottery ticket.

\* \* \* \* \*